US007014670B2

(12) United States Patent
Shutic et al.

(10) Patent No.: US 7,014,670 B2
(45) Date of Patent: Mar. 21, 2006

(54) CONTROLLING CYCLONE EFFICIENCY WITH A VACUUM INTERFACE

(75) Inventors: Jeffrey R. Shutic, Wakeman, OH (US); Kenneth A. Kreeger, Avon Lake, OH (US)

(73) Assignee: Nordson Corporation, Westlake, OH (US)

(*) Notice: Subject to any disclaimer, the term of this patent is extended or adjusted under 35 U.S.C. 154(b) by 118 days.

(21) Appl. No.: 10/476,602

(22) PCT Filed: May 10, 2002

(86) PCT No.: PCT/US02/14796

§ 371 (c)(1),
(2), (4) Date: Oct. 31, 2003

(87) PCT Pub. No.: WO02/092235

PCT Pub. Date: Nov. 21, 2002

(65) Prior Publication Data

US 2005/0022483 A1 Feb. 3, 2005

Related U.S. Application Data

(63) Continuation-in-part of application No. 09/888,679, filed on Jun. 25, 2001.

(60) Provisional application No. 60/290,447, filed on May 11, 2001, provisional application No. 60/277,149, filed on Mar. 19, 2001, provisional application No. 60/238,277, filed on Oct. 5, 2000.

(51) Int. Cl.
  *B01D 35/16* (2006.01)
  *B01D 45/12* (2006.01)

(52) U.S. Cl. ................ 55/315; 55/431; 55/DIG. 46

(58) Field of Classification Search .............. 95/271; 55/DIG. 46, 432, 431, 424, 315; 118/326
See application file for complete search history.

(56) References Cited

U.S. PATENT DOCUMENTS

| 3,266,226 A | * | 8/1966 | Gortz et al. ............ 96/422 |
| 4,647,298 A | | 3/1987 | Ribnitz |
| 5,107,756 A | | 4/1992 | Diaz |
| 5,256,201 A | * | 10/1993 | Gelain et al. ............ 118/326 |
| 5,275,634 A | | 1/1994 | Kramer |
| 5,288,324 A | | 2/1994 | Shaneyfelt |
| 5,421,885 A | | 6/1995 | Trevisan |

(Continued)

FOREIGN PATENT DOCUMENTS

CH  529590  7/1971

(Continued)

*Primary Examiner*—Robert A. Hopkins
(74) *Attorney, Agent, or Firm*—Calfee, Halter & Griswold LLP

(57) ABSTRACT

Powder overspray that is extracted from a spray booth is recovered back to a powder supply that is used to supply powder to the spray guns inside the spray booth. The powder overspray extracted from the booth is separated from the high flow air stream by a separator such as a cyclone separator. The powder falls into a transfer pan and a vacuum is used to convey the powder from the transfer pan to a vacuum receiver. The powder is then discharged to the feed hopper in the feed center. The use of a vacuum to convey powder from the cyclone to the feed center in effect permits substantially all of the powder overspray to be recovered from the spray booth directly to the feed hopper with minimal dwell or residence time within the cyclone or vacuum receiver subsystems during a spraying operation. The receiver can be rotated for easy cleaning, and the vacuum line cleaned by one or more cleaning elements drawn through the vacuum line.

27 Claims, 32 Drawing Sheets

U.S. PATENT DOCUMENTS

| | | |
|---|---|---|
| 5,690,995 A | 11/1997 | Fischli et al. |
| 5,743,958 A | 4/1998 | Shutic |
| 5,782,943 A | 7/1998 | O'Ryan |
| 5,788,728 A | 8/1998 | Solis et al. |
| 6,461,431 B1 * | 10/2002 | Ainsworth et al. ......... 118/326 |

FOREIGN PATENT DOCUMENTS

| | | |
|---|---|---|
| DE | 1910487 | 9/1970 |
| DE | 37 15470 A1 | 11/1988 |
| GB | 429028 | 5/1935 |

* cited by examiner

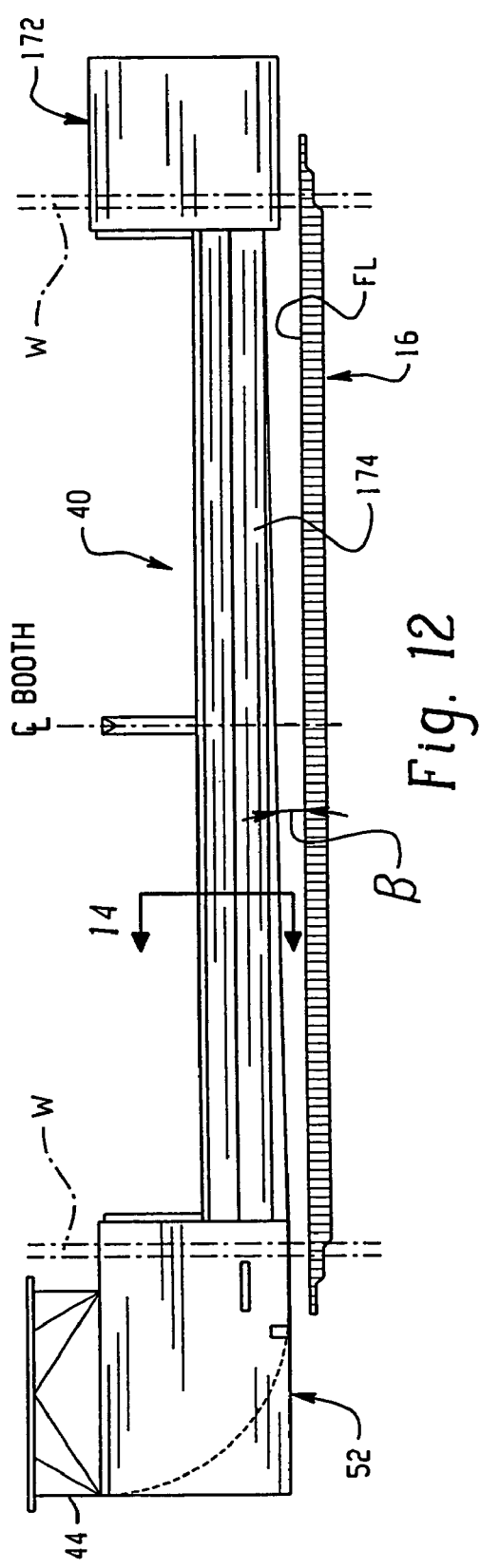
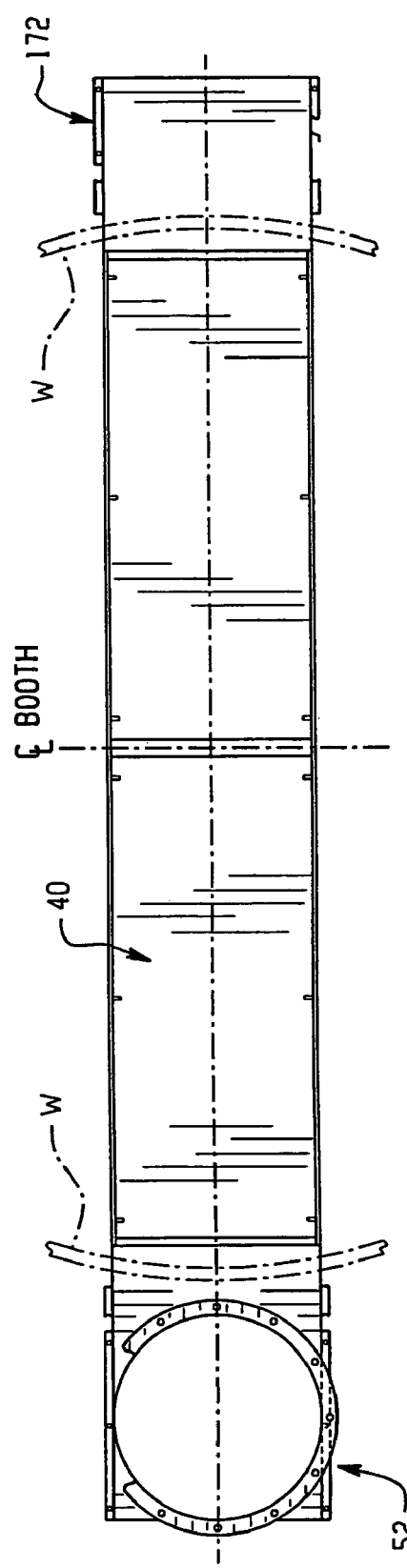

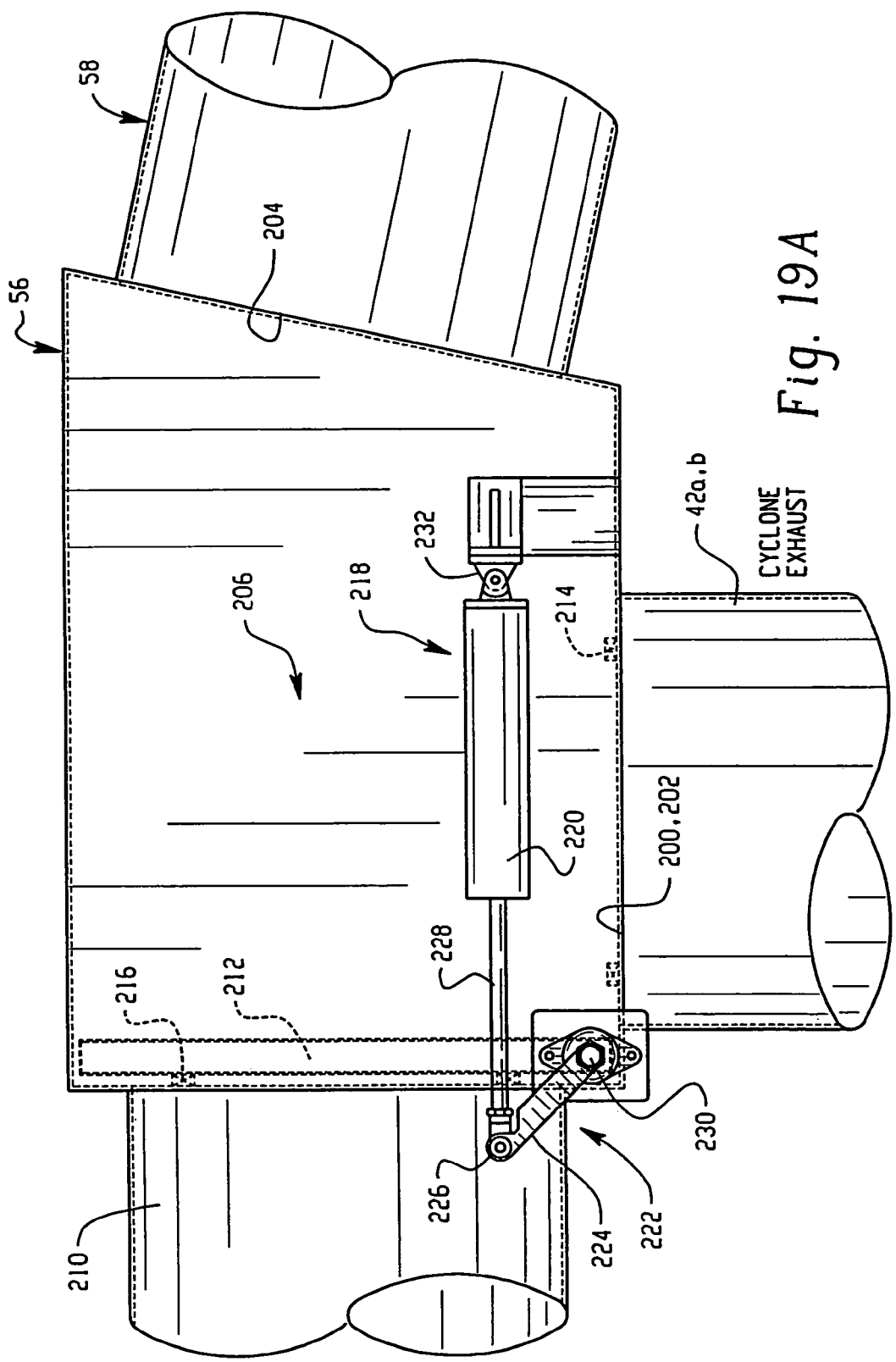

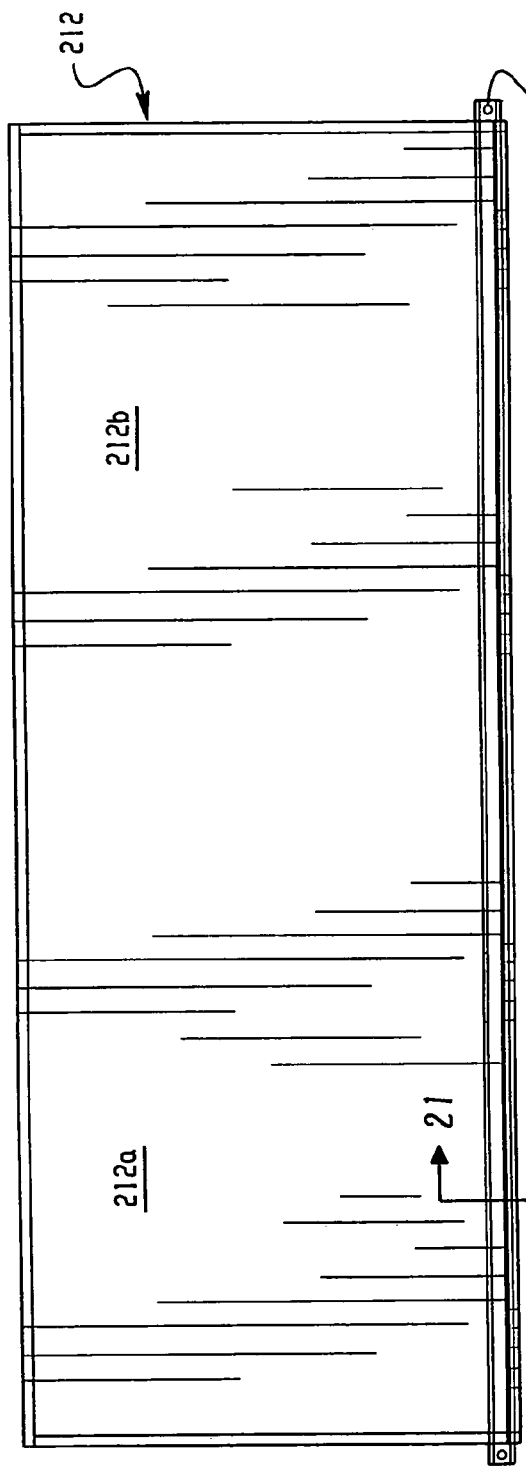
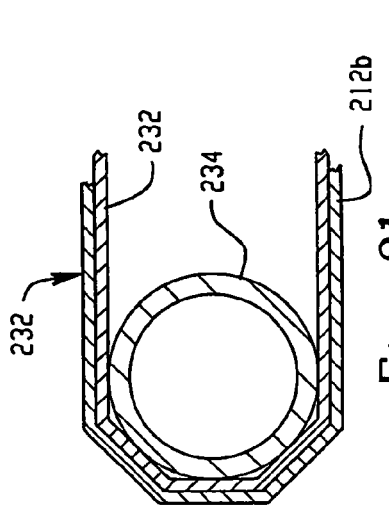
Fig. 20
Fig. 21

CONTROLLING CYCLONE EFFICIENCY WITH A VACUUM INTERFACE

RELATED APPLICATIONS

The present application claims the benefit of pending U.S. provisional patent application Ser. No. 60/290,447 filed on May 11, 2001 for CONTROLLING CYCLONE EFFICIENCY WITH A VACUUM INTERFACE the entire disclosure of which is fully incorporated herein by reference. The present application is a continuation-in-part of pending U.S. patent application Ser. No. 09/888,679 filed on Jun. 25, 2001 for QUICK CHANGE POWDER COATING SPRAY SYSTEM which claims the benefit of U.S. Provisional patent application Ser. Nos. 60/277,149 filed on Mar. 19, 2001, and 60/238,277 filed on Oct. 5, 2000, the entire disclosures of which are fully incorporated herein by reference.

FIELD OF THE INVENTION

The invention relates generally to powder coating spray systems which use powder containment spray booths and power overspray recovery apparatus. More particularly, the invention relates to a powder coating spray system that uses negative pressure to influence cyclone efficiency by increasing the yield of powder particles recovered from the cyclone.

BACKGROUND OF THE INVENTION

Powder coatings are commonly applied to objects by powder spray guns that may be manually operated or automatic. In an automatic system, one or more spray guns are controlled to spray powder onto the objects as the objects are conveyed past the guns. In a manual gun operation, typically the object is suspended or otherwise positioned near a spray gun and the operator controls when the gun starts and stops spraying. A powder spray gun may be selected from a wide variety of gun designs. Since a spraying operation is intended to coat an object evenly, a common technique for spraying powder is to apply an electrostatic charge to the powder particles which causes the powder to better adhere to the object and also results in a more uniform application. Electrostatic spray guns include corona guns and tribocharging guns. In a corona type spray gun, a high voltage electrode is positioned in or near the powder flow path, either within the gun itself or just outside the gun near or at the gun nozzle. In a tribocharging type gun, the powder flow path through the gun body is made of suitable materials that impart an electrostatic charge to the powder as it is forced through the gun body.

The object being sprayed is electrically grounded such that the charged powder is attracted to and adheres to the object. This electrostatic attraction increases the transfer efficiency by increasing the amount of powder that adheres to the object. Transfer efficiency refers to the relationship between the amount of powder that adheres to the object being sprayed versus the amount of powder sprayed from the gun.

In most electrostatic spray systems, the powder is ejected from the gun nozzle as a cloud. This permits the powder spray to envelope the object to coat all the surfaces of the object, even when the object is irregular in geometric shape. Multiple guns may be positioned on different sides of the object and/or directed at different angles to increase the uniformity of the powder applied thereto. However, due to the inherent nature of the powder spray pattern, there is a substantial amount of powder that does not adhere to the object and ends up either falling to the floor or collecting on other objects and structures in the immediate area. This non-adherent powder residue is generally referred to as powder overspray.

Known powder spray systems utilize a source of powder that feeds powder to the spray guns. The supply system is commonly referred to as a powder feed center and may include a number of powder pumps that transfer powder from a feed hopper through a series of power hoses to the spray guns inside the spray booth. In general, an "application system" includes, as the powder flow path, at least spray gun, a powder source such as a feed hopper, a powder pump and a powder feed hose that connects the pump to the gun. In a known feed center, a suction tube or lance extends down into the feed hopper at one end and is connected to a powder pump at an opposite end. The pump draws powder from the hopper and the powder then flows from the pump through the powder feed hose to the spray gun. In such known systems, the powder flow path typically includes one or more turns, of about ninety degrees or so for example, and these non-straight paths can inhibit thorough cleaning during a color change operation. The known feed centers also require substantial time to purge and clean as part of a color change operation.

The presence of powder overspray necessarily dictates that there must be more powder passing through the spray system than is actually used to coat the target object. In other words, a substantial amount of powder is cycled through a spray system in the form powder that collects in the booth and in various filter and collection systems, and this amount of powder is far greater than the actual amount of powder that adheres to a target object. This excess powder is subject to contamination and in general adds to the problem of purging and cleaning the spray system in preparation for a color changeover.

Because powder overspray is generated during each spraying operation, spraying operations typically are performed within a spray booth. The spray booth is used for powder containment and may only be partially enclosed. Most spray booths have an air flow system that contains the powder overspray within the structure of the booth by producing a negative pressure zone that draws air from the powder booth along with powder overspray that is entrained in the air flow. The powder laden air is then transferred to a cartridge filter system or cyclone separator system outside the spray booth to recover the powder. However, in known spray booth systems, the powder overspray still tends to collect on the booth walls, ceiling and the booth floor. In electrostatic systems especially, the powder overspray will also tend to be attracted to and collect on any structure that is electrically grounded. The powder particles tend to be very small and well dispersed and therefore can collect in the smallest of recesses, seams and crevices and irregular spray booth wall structures.

Powder overspray presents a two-fold challenge. First, if possible it is usually desirable to try to reclaim or recover powder overspray so that the powder can be re-used during subsequent spraying operations. Known powder recovery systems typically work on the basis of a large air volume that entrains the powder overspray. These air flow volumes are routinely generated by conventional high volume exhaust fans. The powder laden air is then filtered, such as for example using cartridge type air filters or cyclone separators. The separated powder is then sieved to remove impurities and returned to a hopper or powder feed center where it is supplied once again to the spray guns. In known systems, the actual reintroduction of recovered powder to the powder spray application system is usually accomplished by a positive air pressure conveyance system back to a powder feed center through a series of hoses, valves and pumps. These additional components significantly increase the complexity of cleaning out the spray system for a color changeover.

Besides the challenge of recovering powder overspray for subsequent use or disposal, powder overspray that collects within the spray booth must be removed from the booth when changing over the powder coating color. In order to switch from one color to another the guns, booth and powder recovery system must be as completely purged of the previous colored powder as possible to prevent contamination of the subsequent colored powder. The operation of changing from one color to another is generally known as a "color change" operation and it is an ongoing challenge in the art to make spraying systems that are "quick color change" meaning that the goal is to keep reducing the down time when the spraying system is off line in order to clean the spraying apparatus and system. Thus, the amount of in-process powder, as well as the amount of powder overspray that remains in the spray booth, have a significant impact on the amount of time and effort it takes to perform a color change operation.

In known systems, a significant problem with cleanability and color change is that the powder, once it is sprayed from the guns, is not continuously recycled back to the feed center, but rather becomes resident at various stages within the spray system. In some systems for example, powder overspray may reside within the spray booth until a separate cleaning operation is performed after spraying is completed. Even in systems in which overspray is collected during a spraying operation, substantial amounts of powder can remain in the spray booth. Furthermore in some systems, powder overspray that is removed from the spray booth goes to a cyclone separator and falls into and resides in a cyclone bin until it is transferred to the feed center. The cyclone bin can be time consuming to clean. The transferred powder may then pass through a mini-cyclone in the feed center (because the powder from the cyclone is transferred under positive air pressure to the feed center and therefore is entrained in an air flow) before being dumped back into the feed hopper. Again, in this stage the powder may still reside in the mini-cyclone or sieve for a time before being returned to the feed hopper. If a cartridge filter system is used instead of a cyclone separator, the powder resides in the filters themselves until pulse cleaning is applied, and in any case the cartridge filters must be completely replaced during a color changeover.

Cyclones used in powder overspray recovery systems tend to be very large, particularly in terms of height. In some manufacturing plants, ceiling height may be limited or the customer may simply not want such a high structure for the cyclones. In such cases, shorter cyclones may be used. However, cyclone efficiency is related in part to the aspect ratio of the cyclone, namely the height to diameter ratio. The lower the aspect ratio the less efficient the cyclone for a given exhaust. However, some customers are willing to sacrifice efficiency for a smaller cyclone installation. This applies to single, twin or multiple cyclone arrangements preferably with single yield extraction configurations.

A problem with the powder overspray residing in various stages of the spray system is that the powder will tend to find even the smallest nook and cranny and even cake up, and substantial time will need to be spent cleaning this powder out.

Thus, color changeover typically includes having to clean powder from three major subsystems: the spray booth, the powder separator, and the feed center. Each subsystem has its own unique challenges to reducing the time it takes to completely clean out one powder color to prepare the system for spraying another color. During the cleaning time the spray system is completely down or off-line which represents lost time and increased costs, in addition to the costs associated with the labor needed to clean the various system components.

Cleaning a powder coating spray booth can be a labor-intensive effort. Powder coating materials, in varying degrees, tend to coat all the internal surfaces of the spray booth during a powder coating spray operation, which directly impacts color change time. In a production powder coating environment, minimizing the system down time to change from one color of powder coating material to another is a critical element in controlling operational costs. Seams between booth panels and recessed ledges, such as where access doors or automatic or manual spray application devices may be located, are typically hard to clean areas and tend to hold concentrations of oversprayed powder coating material that could present a contamination risk after a color change. In addition to seams and ledges and other recesses within the booth, charged powder can adhere to booth interior surfaces.

In typical powder coating booth construction, an outer steel framework is provided for supporting individual panel members which form the roof, side and end walls of the booth. These panel members are known to be made of a fabricated or thermoformed plastic, such as polypropylene, polyvinyl chloride (PVC), polyvinyl carbonate or polycarbonate. The floor may also be of thermoformed plastic or stainless steel construction. In other known embodiments, powder coating spray booths can have metallic walls, ceilings and vestibule ends, as well a metallic floor and exterior support framework.

U.S. Pat. No. 5,833,751 to Tucker is an example of a powder coating spray booth intended to reduce powder particle adhesion to the interior surfaces of the booth during an electrostatic powder spray operation. Tucker discloses a booth chamber comprising a pair of thermoformed plastic shells with smooth curvilinear interior surfaces that are intended to inhibit oversprayed powder particle adhesion. Two identical ends connect with the shells and an external support frame is disclosed, but not shown. Possible booth materials disclosed include polycarbonate.

Known booth materials are available in limited sizes requiring some method of seaming to generate the overall size. These seams require much effort and cost to achieve a virtually uninterrupted, seamless surface.

In addition, known powder coating spray booths have numerous features that reduce operational efficiencies. These sub-optimal features are evidenced during powder coating color changes between successive runs of different coating colors and during assembly and maintenance of the booth itself. Known powder coating spray booths use metallic external support frames and stainless steel or thermoplastic, floors, walls and ceilings. During an electrostatic powder spray coating operation, oversprayed powder material can actually be attracted and adhere to these booth interior surfaces. Higher concentrations of oversprayed powder coating material are typically seen in the immediate vicinity of the highly conductive steel frame members, which are typically grounded. Although thermoformed plastics are typically thought of as insulators, their insulation properties vary and powder particle adhesion can vary with the conductance and resistance of these materials. With age, physical properties of the thermoformed plastic materials can change with corresponding increases in powder particle adhesion, as they can absorb moisture from the ambient air over time. Ultraviolet light is also known to change the physical properties of thermoplastics over time.

In addition, typical booths have numerous design features that act to increase accumulated oversprayed powder coating materials in the spray booth, thus increasing cleaning times during color change operations. In booths using panel members connected with each other and supported by an external frame, numerous seams exist throughout the booth interior that entrap oversprayed powder coating material, thereby making the booth harder to clean during a color change or routine booth maintenance. In addition to the seams, ledges are present in some powder coating spray booths on which spray gun application devices rest and are mounted, and where openings for doors and other access portals are reinforced and secured, for example. These ledges can either extend into the booth or, more typically, extend away from the inner surface of the booth. Even if otherwise angled or curved toward the floor from the typically vertical side walls, oversprayed powder coating material still tends to accumulate in these areas, thus making them more difficult to clean, as well.

Known prior systems for removing powder overspray from a spray booth include active systems in which floor sweepers and other mechanical devices are used to mechanically contact the powder and push it off the floor into a receiving device. These systems however tend to be cumbersome and are not thorough in the amount of powder removed from the booth. A substantial effort by one or more operators is still required to completely remove powder from the booth. Thus there can be a large amount of in-process powder and powder overspray on the booth structure.

In passive removal systems, powder is removed from the floor in a non-contact manner. In one known system, a rectangular floor in the form of a continuous linearly moving belt transports powder over to a collection device such as a vacuum system that removes powder from the belt. Such systems are very complicated mechanically and do not do an adequate job in removing powder from the belt, so much so that in some cases a color change requires a change of the belt itself.

It is desired therefore to provide a spray booth that is easy to clean as part of a color change operation and operates so as to minimize the amount of in-process powder and the amount of powder overspray remaining in the spray booth after a spraying operation is completed.

It is further desired to provide a powder coating spray system and associated subsystems including a powder recovery system that substantially reduce the residence time of powder overspray within the system between the spray gun nozzle and the feed hopper. The spray system should remove as much powder overspray as possible from the spray booth and transfer it back to the feed center during a spraying operation. Thus the amount of residual powder overspray needing to be manually cleaned from the subsystems will be largely eliminated. It is further desired to provide a powder feed center that is easier and faster to clean as part of a color change operation.

It is further desired to provide method and apparatus for influencing the efficiency of a cyclone separator used with a powder coating spraying system.

SUMMARY OF THE PRESENT INVENTION

The present invention is directed to a new powder coating spray system that is dramatically faster and easier to clean, thereby significantly reducing the time required for a color changeover. In accordance with one aspect of the invention, a powder coating spray system produces a region of high air flow through a spray booth to extract powder overspray from the booth. The high air flow is produced by a low pressure source outside the booth. In one embodiment, a suction duct is positioned above the booth floor and the air flow into and through the duct sucks up powder from the floor and transports it outside the booth to a collection device. Relative rotation between the floor and the duct permits the entire floor to be swept, and in one embodiment the booth is generally cylindrical and the floor is round rotates about a longitudinal axis of the booth. In another embodiment of the invention, the spray booth walls and floor are made of non-conductive composite materials.

In accordance with another aspect of the invention, powder overspray that is extracted from a spray booth is recovered back to a powder supply that is used to supply powder to the spray guns inside the spray booth. In one embodiment, the extracted powder overspray is separated from the high flow air stream by a cyclone separator. The powder falls into a transfer pan and a vacuum is used to convey the powder from the transfer pan to a vacuum receiver. The powder is then discharged to the feed hopper in the feed center. The use of a vacuum to convey powder from the cyclone to the feed center in effect permits substantially all of the powder overspray to be recovered from the spray booth directly to the feed hopper with minimal dwell or residence time within the cyclone or vacuum receiver subsystems during a spraying operation. What little powder remains from the powder recovery during spraying operations can be quickly and easily blown-off as part of a cleaning and color changeover procedure.

In accordance with another aspect of the invention, cyclone efficiency may be influenced and improved by applying a negative pressure at an outlet of the cyclone to convey powder to a container. In one embodiment, the container may be the feed hopper to support the application process. In one embodiment, a vacuum pump is coupled to the cyclone outlet. The vacuum pump produces an induced air volume that entrains powder from the cyclone outlet and conveys the entrained powder to the container. The coupling from the vacuum source to the cyclone outlet is air tight during recovery and conveyance. In accordance with another aspect of the invention, cyclone efficiency is influenced by maintaining a predetermined relationship between the static pressure of the cyclone and the induced air volume of the vacuum source. This allows for the negative pressure to entrain the powder located at the cyclone yield outlet and recover additional powder at the container that would otherwise be lost through the cyclone exhaust (sometimes referred to in the art as the tailings exhaust).

In accordance with another aspect of the invention, cleaning of the system is facilitated by a powder vacuum receiver in the powder feed center that can be rotated for easy powder blow-off, and that has a gravity controlled outlet door that periodically discharges recovered powder to the feed hopper. In one embodiment the receiver uses color specific filters that are easily replaced during a color changeover.

In accordance with another aspect of the invention, the powder feed center is designed to facilitate faster color change operations. In one embodiment, one or more powder pumps are used that have an in-line powder flow path that extends between the pump powder inlet from the suction tube to the pump powder outlet that is connected with the spray gun feed hose. This arrangement provides a straight through powder flow path without any ninety degree turns. In a further embodiment, a powder spray gun is used that also provides a straight through powder flow path. Thus, a powder application system is provided in which powder flows from the feed hopper to the spray gun nozzle along a smooth, continuous flow path without any sharp or severe bends in the flow path. When used in combination with a powder recovery system of the present invention, an application system is provided that is easy and fast to clean and perform a color change operation, since less in process powder is used, the overspray is substantially continuously returned to the feed center, and easy to clean/purge powder flow paths are provided.

In accordance with another aspect of the invention, a color changeover procedure is provided that substantially reduces system down time. In one embodiment, the spray booth and recovery system are cleaned during the same time period to significantly reduce color changeover time. In a specific embodiment of the spray booth, the rotatable floor can also be axially position into a sealed relationship with the booth walls. The spray guns are blown-off by air jets disposed near gun slots in the booth wall as the guns are retracted from the spray booth. The powder pumps, feed hoses and spray guns are then purged into the sealed spray booth. The sealed floor permits an operator to blow-off powder from the booth walls, ceiling and the extraction duct. Once the spray booth has been blown down, the floor is lowered and the extraction system operated to extract any remaining powder from the booth floor and seal to an after-filter system or waste.

In another embodiment, the vacuum line from the cyclone to the vacuum receiver is cleaned by drawing cleaning elements through the vacuum line into the receiver. In one version, the cleaning elements are oversize foam cylinders that wipe the vacuum line as they travel therethrough. In this embodiment, the vacuum receiver is blown off when rotated to a horizontal position and the color specific filters replaced. Other parts of the feed center are also cleaned at this time.

In another embodiment of the invention, a powder coating spray system with powder overspray recovery during a spraying operation includes a generally cylindrical spray booth with a rotatable floor that rotates under a powder extraction duct suspended just above the floor. Powder overspray on the floor is drawn up into the duct while the floor rotates thereunder. The extracted powder overspray laden air is then drawn into a cyclone separator, and a vacuum pump/receiver unit in the feed center is used to convey powder from the cyclone via a vacuum line to the vacuum receiver. The vacuum receiver accumulates the recovered powder and periodically opens and discharges the recovered powder to a feed hopper via a sieve. The receiver filter is reverse shock pulsed during the discharge cycle to knock powder off the filter. Use of the powder extraction device and rotating floor, in combination with the vacuum transfer from the cyclone to the feed center, results in very small quantities of powder overspray remaining in the spray system components, thus minimizing cleaning required for color changeover.

In accordance with another embodiment of the invention, a powder overspray recovery system uses a negative pressure high air flow to produce a suction within a spray booth to extract powder overspray to a first collection device during a spraying operation. A vacuum receiver in a powder feed center is used to transfer the powder overspray from the first collection device to the feed hopper in the feed center.

Thus the overspray powder is substantially maintained in a continuous transfer from the time it is sprayed from a spray gun until it returns to the feed hopper for re-use. The vacuum transfer significantly simplifies the powder clean process needed prior to a color changeover. The recovery system leaves a minimal amount of powder in the system components during a spraying operation so that clean-up time is substantially reduced, thus making for a very fast color changeover operation.

The present invention is also directed to improved spray booth designs that are particularly suited for electrostatic spraying operations, although the various aspects of the invention may be incorporated into spray booths that do not utilize electrostatic spraying apparatus. According to one aspect of the invention, a powder extraction system is contemplated in which powder overspray can be continuously extracted from the booth even during a spraying operation. In one embodiment of the invention, a powder spray booth includes a booth canopy wall and ceiling arrangement to contain powder during a spraying operation; and a booth floor that is rotatable relative to the booth wall during a spraying operation. The booth may be generally cylindrical in shape with a round floor. The floor can be rotated about a vertical axis that is also the longitudinal axis of the spray booth. The booth canopy and ceiling are supported on a base frame separately from the floor. By this arrangement, the floor can be rotated relative to the booth canopy. By continuously removing powder overspray in a real-time manner during a powder spraying operation, the amount of in-process powder is substantially reduced and the time and effort required to clean the booth as part of a color changeover is dramatically and significantly reduced.

In accordance with another aspect of the invention, a powder extraction mechanism is provided for removing powder overspray from the booth floor. In one embodiment, the extraction mechanism is a duct that extends across the booth floor and supported just off the floor. A negative pressure source is connected to the duct to cause a suction effect by which powder overspray is removed from the floor and transported via the extraction duct to a collection device that is disposed outside the booth. In a preferred form, the extraction mechanism is stationary with respect to the rotating floor and extends diametrically across the floor.

In accordance with another aspect of the invention, the booth floor can be translated as well as rotated. In one embodiment, the booth floor can be axially translated along the axis of rotation. The floor can be moved to a first axial position in which the floor is free to rotate during a spraying operation, and a second axial position where the floor sealingly contacts the bottom of the booth canopy or wall during a color change operation. A source of pressurized air is positioned to blow powder from the seal as part of a color change operation.

Still a further aspect of the invention concerns a mechanism for effecting the axial translation of the floor. In one embodiment the floor is moved by a floor lifter mechanism that moves the floor between the first and second axial positions. In one embodiment the lifter mechanism is a pneumatic actuator that acts on a rocker arm to raise and lower the booth floor.

In accordance with another aspect of the invention, a cyclone system is used to separate the powder overspray from the air drawn in by the extraction duct. A fan is connected to the cyclone system which in turn is connected to the extraction duct. The air flow that is pulled through the duct creates a negative air pressure flow that draws up powder that has collected on the booth floor into the extraction duct and also provides containment air flow within the booth canopy. In one embodiment, the cyclone system is provided with a by-pass valve for selecting between powder overspray reclaim and non-reclaim operating modes.

Still a further aspect of the invention relates to the use of composite materials for the spray booth and floor that are very low in conductivity to minimize powder adhering to the booth and floor, while possessing significant structural properties that enable the configuration to be mechanically sound. In one embodiment, the booth canopy is made of two composite half cylinders that are entirely self-supporting so that the canopy and ceiling can be suspended over an underlying rotatable floor. In this embodiment the floor is also made of very low conductivity composite materials with sufficient structural strength to permit a floor design whereby the floor can be rotated on a central hub.

These and other aspects and advantages of the invention will be readily appreciated by those skilled in the art from the following detailed description of exemplary embodiments of the invention with reference to the accompanying Figures.

BRIEF DESCRIPTION OF THE FIGURES

FIGS. 12 and 12A is an extraction duct shown in elevation and perspective respectively;

FIG. 13 is the extraction duct of FIG. 12 shown in plan;

FIGS. 19A and 19B illustrate in elevation the bypass plenum of FIG. 18 with a bypass valve and actuator arrangement shown in two positions corresponding to a reclaim and non-reclaim mode;

FIG. 20 illustrates an embodiment of the valve element of FIG. 19 in front elevation; and FIG. 21 is a cross-section of the valve element of FIG. 20 taken along the line 21—21;

DETAILED DESCRIPTION OF THE INVENTION

Introduction

Figure 1:
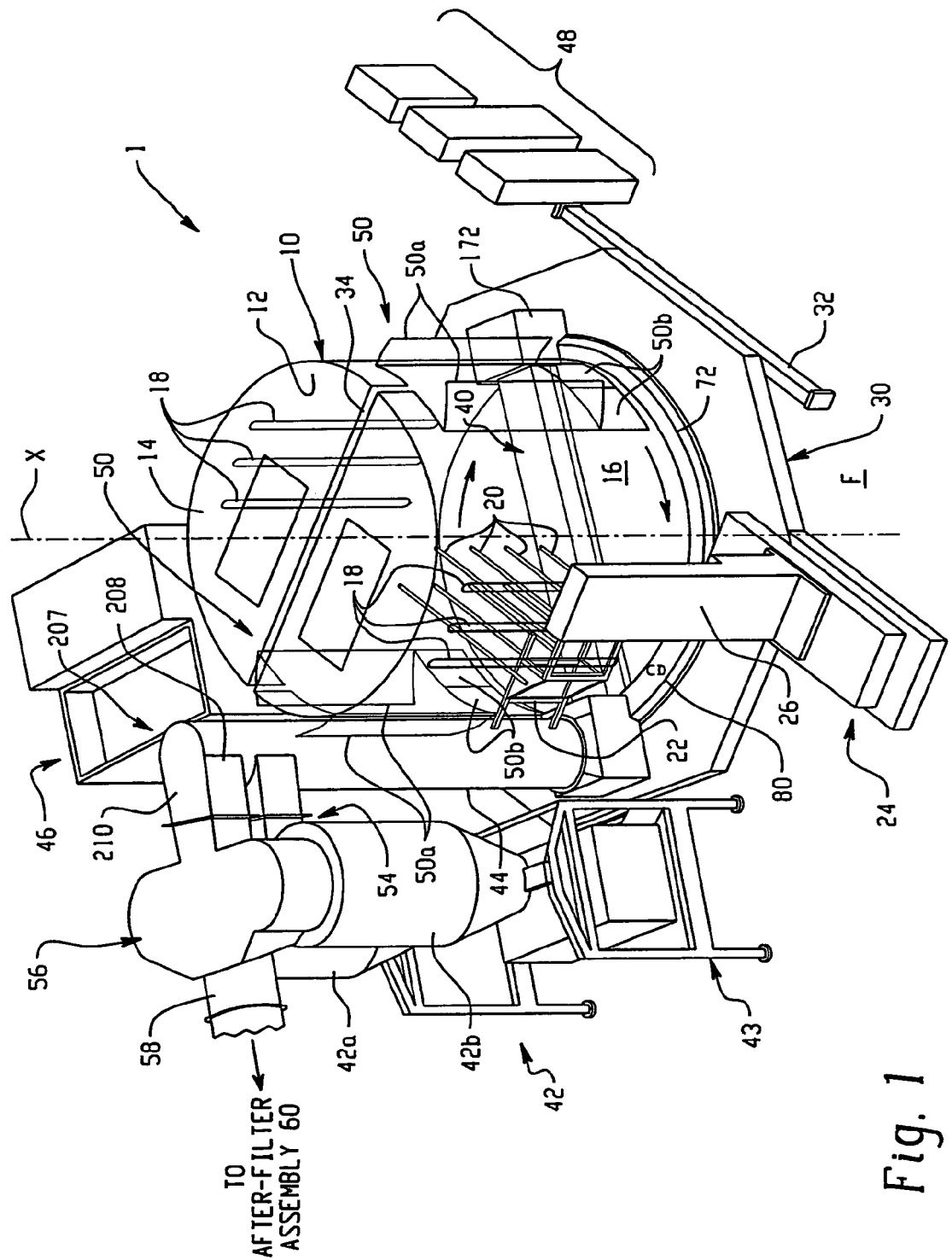
FIGS. 1 and 1A are isometric schematic representations of a powder spraying system in accordance with the invention, with FIG. 1A illustrating a manual spray booth or vestibule attached to the main spray booth.

By way of introduction, the present invention is directed to providing a powder recovery system that takes most of the powder overspray produced in a powder spray booth during a spraying operation and returns it on a real-time basis to the powder feed center. In one embodiment, a powder scavenging protocol is used to recover powder overspray from the spray booth on a continuous basis and return the scavenged powder to the application system on a nearly continuous basis. The powder overspray is also preferably removed from a cyclone separator and returned to the feed center on a continuous basis. By "scavenging" is simply meant the collection and transfer of powder from the time the powder is sprayed by a gun until the powder is returned to the feed center.

As used herein, the terms "powder recovery" and "powder collection" are used interchangeably. By effectively and continuously recovering most of the powder overspray, cleanup is greatly simplified thereby substantially reducing color changeover time as compared to prior systems. One embodiment of the recovery system in general includes a powder extraction system associated with the spray booth, a first powder collection/separation system, and a vacuum conveyance system in the feed center. Vacuum "convey" and "transfer" are also used interchangeably herein. It is important to note that although a complete recovery system is provided, various subsystem features may be used singly or in combination with other features disclosed herein. For example, the vacuum transfer system may be used with any powder spray booth powder extraction system, and also is not necessarily dependent on the design of the first collection/separation system. Exemplary embodiments including exemplary alternative embodiments are described here, however, such descriptions are not intended to be and should not be construed to be an exhaustive list. Those skilled in the art will readily understand that many alternatives are available for the specific embodiments described herein.

In addition to powder recovery during a spraying operation, the powder recovery system reduces the amount of residue powder in the spray system to such an extent that color changeover time is substantially reduced. Thus, the present invention also contemplates a color change procedure that is enhanced by various aspects of the recovery system itself. The color changeover procedure however may also be realized with alternative embodiments of the powder recovery system and is therefore not limited to being implemented by the exemplary embodiments of the recovery system described herein.

For ease of explanation, the various subsystems will be described herein, followed by a detailed description of the color changeover procedure.

With reference to the drawings, the present invention is directed to a powder coating spray system and a powder overspray recovery system and a color changeover procedure, as well as specific components within such a system, to improve the cleanability and reduce the time to effect color change operations, while at the same time minimizing impact on transfer efficiency while maximizing impact on containment and recovery of the powder overspray. Various aspects of the invention are described herein in an exemplary manner, and as part of an overall spraying system, but such descriptions are not to be construed in a limiting sense. The various aspects of the invention may be used individually or in any various combinations as required for a particular application. Furthermore, although the present invention is described with respect to the use of electrostatic spray technology, the invention is not limited to the use of electrostatic spraying apparatus.

Powder Coating Spray System and Powder Spray Booth

FIG. 1 illustrates a powder coating spraying system 1 with several of the main components illustrated in a schematic fashion for ease of illustration. Such components are generally referenced with letters rather than numbers, and are well known and need not be described in detail. Accordingly, the present invention is described in detail as to those elements that relate to the various aspects of the invention.

The system 1 generally includes a spray booth 10. Note in FIG. 1 that the spray booth 10 is represented in a "transparent" manner so that the basic arrangement of components within the booth 10 can be illustrated. In actual practice the booth 10 is made of non-conductive composite materials that are not necessarily transparent, although there is no specific limitation on the choice of materials used for the booth 10. In a preferred but not necessarily required embodiment of the spray booth 10, the booth is constructed from of materials that are very low in conductivity and are composite in nature. These materials render the booth 10 substantially self-supporting and seamless. A suitable manufacturing process and structure for the booth 10 out of such composite materials is fully described in co-pending U.S. patent application Ser. No. 09/550,353 filed on Apr. 14, 2000 for POWDER COATING BOOTH CONTAINMENT STRUCTURE, and also described in co-pending PCT Application No. PCT/US 01/40524 filed on Apr. 14, 2001 for POWDER COATING BOOTH CONTAINMENT STRUCTURE, which applications are owned in common by the assignee of the present invention, the entire disclosures of which are fully incorporated herein by reference. Although these structure and materials for the booth 10 are preferred for electrostatic applications, the present invention is not limited to the use of a booth with such structural and materials characteristics, particularly in systems that will not utilize electrostatic spraying devices.

In the illustrated embodiment, the booth 10 is generally cylindrical in shape, including a vertically extending canopy or wall structure 12, a ceiling, cover or top 14 and a floor 16. In this example, the canopy 12 is realized in the form of two generally hemispherical halves that are joined together by mating flanges (not shown). The halves can be joined by non-conductive fasteners or adhesive so that the basic cylindrical shell is non-conductive. It is preferred although not necessary that the ceiling 14 and the floor 16 also be seamless and made from the same non-conductive composite materials as the canopy. The above-cited patent application discloses a composite booth structure with sufficient strength to permit humans to walk on the floor 16. The canopy 12 is also self-supporting such that no exterior frame is needed to support the booth 10. The canopy 12 and the ceiling 14 may be integrally formed if so desired.

Although the booth 10 is generally cylindrical in shape, it is not a fully enclosed structure. Access doors and other openings are provided to facilitate a spraying operation. For example, a plurality of gun slots 18 are provided on opposite sides of the booth 10 to permit a corresponding plurality of spray guns 20 to extend into and be withdrawn from the spray booth 10. The guns 20 may be of any suitable design, including a gun design as disclosed in co-pending U.S. patent application Ser. No. 09/667,663 filed on Sep. 22, 2000 for POWDER SPRAY GUN, the entire disclosure of which is fully incorporated herein by reference.

Figure 1A:
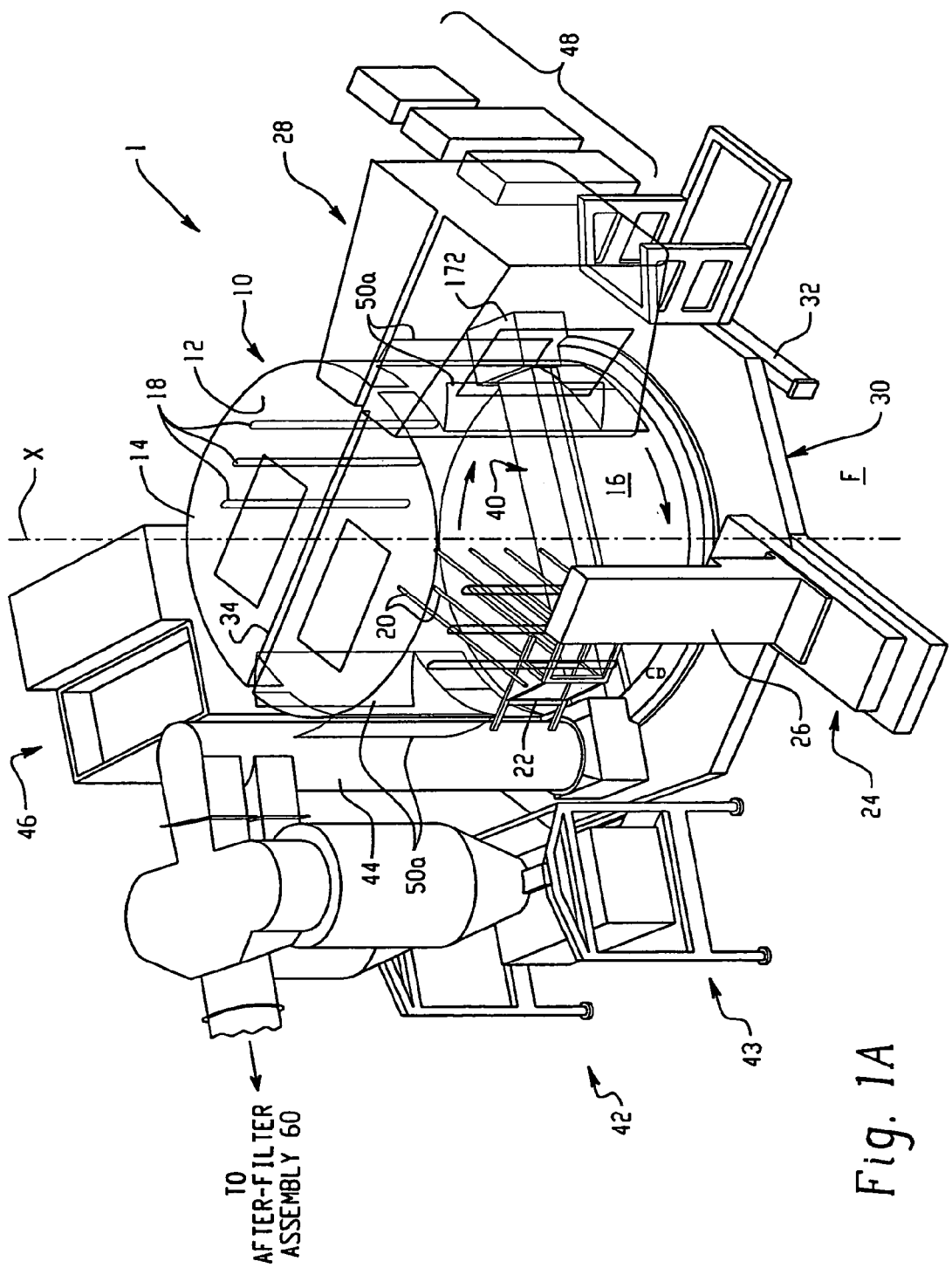

For clarity and ease of illustration, the spray guns 20 are only illustrated on one side of the booth 10 in FIGS. 1 and 1A, it being understood that second set of spray guns and a gun mover may be used on the opposite of the booth 10. The particular system 1 illustrated in FIG. 1 is an automatic system in which the spray guns 20 are mounted on a suitable support frame 22 that is installed on a gun mover 24. The gun mover 24 and the frame 22 are illustrated schematically since any of a number of gun mover and support designs may be used. In this example, the gun mover 24 includes an oscillator 26 that can raise and lower the spray guns 20 along the gun slots 18.

The spray booth 10 however may also be used for manual spraying operations, and therefore may be equipped with an optional vestibule assembly 28 (FIG. 1A only). Preferably the vestibule 28 is made of the same composite materials and structure as the canopy 12.

Continuing with the general description of the system 1, the booth 10 is supported off the shop floor F by a support frame or base 30. The base 30 is supported on the floor F by a pair of parallel rigid bars 32 (only one shown in FIG. 1) which are described in greater detail hereinafter. In accordance with one aspect of the invention, the booth 10 is fully supported on the frame 30 just off the shop floor F such that the entire booth/frame 10/30 assembly can be installed as a retrofit for a preexisting spray booth without the need to modify elevation of the shop floor F or part conveyor height. Thus there is no need to trench or lower the floor F to accommodate any portion of the spray booth 10 or frame 30. In the illustrated embodiment herein, for example, the booth floor 16 is installed a mere 12 inches or so above the shop floor F. This permits simple ductwork to be used to interconnect the various conventional components of the spraying system 1.

The upper portion of the canopy 12 and the ceiling 14 are provided with a conveyor slot 34 that extends diametrically across the entire booth 10. Objects that are to be sprayed are suspended (not shown) from the conveyor C (FIG. 2) in a conventional manner so that the objects can be passed into and through the booth 10 past the spray guns 20.

Figure 4:
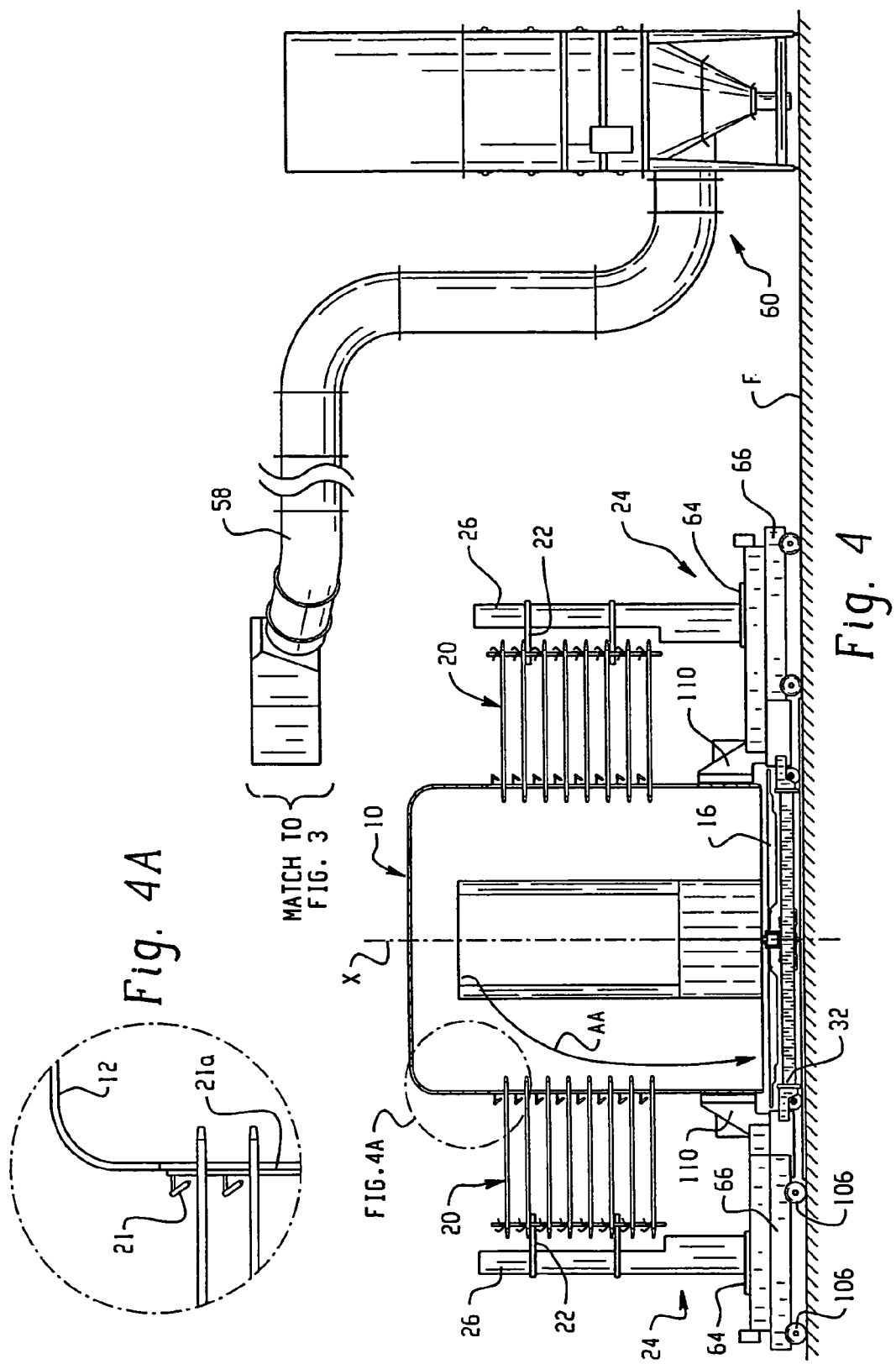

An extraction duct 40 is installed in the booth 10 in close proximity to the floor 16. This extraction duct 40 has a discharge end is in fluid communication with a dual or twin cyclone separator system 42. In accordance with one aspect of the invention, a substantial negative pressure is produced in the extraction duct 40 via air drawn by operation of the cyclone system 42 and an after-filter system assembly 60 (FIG. 4). A large blower in the after-filter system 60 produces a substantial air flow from the booth 10 interior into the extraction duct 40 in the nature of a vacuuming effect such that powder overspray on the floor 16 is drawn up into the duct 40 and entrained in the air flow therein. This powder laden air is drawn into the cyclone system 42 via appropriate ductwork 44 that connects through an opening in the canopy 12 to the discharge end of the extraction duct 40. The opposite end of the extraction duct 40 terminates at an access door duct (172). The cyclone system 42 exhaust air passes to the secondary after-filter system (60) or collection system (not shown in FIG. 1) for removal of fines. A dual cyclone arrangement 42a,b is preferably but not necessarily used in order to provide a substantial air flow through the extraction duct 40 to remove powder overspray from the floor 12.

In general, the present invention is described herein with reference to an embodiment in which powder overspray is removed from the booth 10 and fed to a powder collection system. In the described embodiments, the powder collection system includes either a powder reclaim system through operation of a cyclone system and apparatus for conveying powder from the cyclone back to the feed center. Alternatively, in the present application we describe a powder collection system in which the powder is not reclaimed but rather is diverted past the cyclone system directly to an after-filter or other arrangement for the powder to be disposed. The present invention therefore does not depend on the particular powder collection system used outside but rather is directed to extracting powder overspray from within the spray booth, and the term "powder collection" should be construed in its broadest sense to encompass any post-spraying disposition of the powder overspray outside the booth, whether the powder overspray is reclaimed or not.

In FIG. 1 the cyclone system 42 is illustrated as being supported on the shop floor F by a cyclone support frame 43. Alternatively, the cyclone system 42 may be supported directly on the booth support frame 30.

The air flow that is drawn through the extraction duct 40 also provides a containment air flow within the booth 10 interior. Substantial volume of air is drawn into the booth 10 via various openings and access doors provided in the canopy 12.

The extraction duct 40 is supported at each end by the base 30, not the booth floor 16. The canopy 12 and installed ceiling 14 are also supported by the base 30 and not the booth floor 16. In accordance with another aspect of the invention, the booth floor 16 is rotatable about the central longitudinal axis X of the booth 10. The extraction duct 40 in this case is stationary relative to the rotating floor 16 so as to provide a sweeping action between the extraction duct 40 and the floor 16 surface. In this manner, the floor is cleaned of powder overspray as it collects on the floor even during a spraying operation. Of particular note is that the overspray may be extracted during or after a spraying operation.

Completing the general description of the system 1, the cyclone system 42 may be conventional in design and separates the entrained powder from the drawn air. The system 1 also includes a powder feed center 46 that supplies powder to the spray guns 20 through an appropriate system of a feed hopper, feed hoses and powder pumps, as is well known to those skilled in the art. A control console or system 48 is also provided that controls the operation of the guns 20, the cyclone system 42, the gun movers 26, the conveyor C, floor 16 rotation and position, and the feed center 48. The control system 48 may be conventional in design. Suitable control systems are described in U.S. Pat. Nos. 5,454,256 and 5,718,767; a suitable cyclone system is disclosed in U.S. Pat. No. 5,788,728; and a suitable feed center is disclosed in U.S. provisional patent application Ser. No. 60/154,624 which corresponds to copending PCT application number 00/25383 filed on Sep. 15, 2000 for QUICK COLOR CHANGE POWDER COATING SYSTEM, the entire disclosures all of which are fully incorporated herein by reference. Powder that is separated by the cyclone system 42 may be returned to the feed center 46 for reuse (not shown in FIG. 1).

In accordance with another aspect of the invention, the floor 16 not only can rotate, but also can be axially translated along the axis of rotation X. This permits the floor 16 to have at least two axial positions, the first being a lowered position in which the floor 16 is free to rotate during a spray coating operation, and a second position in which the floor 16 is raised and is sealed against the lower edge of the canopy 12 walls during a color change operation. By moving the floor 16 into the sealed or raised position, an operator can use an air wand or other suitable device to blow down powder overspray that may have collected on the canopy 12, the ceiling 14 or the outside of the extraction duct 40, into the extraction duct 40. For example, the extraction duct 40 is preferably at least partly made of metal to act as an ion collector for electrostatic spraying systems. Consequently, powder will adhere and collect on the outer surface of the extraction duct 40, but this small amount of powder can quickly and easily be blown off and will be quickly swept up into the duct 40. The blower assembly 60 preferably remains on at all times during spraying and cleaning/color change operations.

In its raised position, the floor 16 is fully supported (as will be described herein) so that one or more operators may walk across the floor as required for air cleaning the booth 10, usually as part of a color change operation. The floor 16 is then lowered and rotated while operating the cyclone system 42, thereby removing the last remaining quantities of overspray. Color change therefore is a very fast and simple procedure in terms of cleaning out the spray booth 10. The preferred use of the composite materials for the booth 10 substantially eliminates powder collecting on the canopy 12 and ceiling 14, and permits the extraction duct 40 to easily and efficiently remove powder from the floor 16. The floor 16 is non-conductive except at the drive hub assembly (not shown in FIG. 1), but the drive hub assembly is located within the extraction duct 40 such that powder cannot collect at the hub due to the high air flow through the duct 40.

The outside surfaces of the housings or bodies of the guns 20 may be cleaned by air jets 21 (FIG. 4) that are positioned at the gun slots 18. As illustrated in the enlarged portion of FIG. 4, the air jets 21 (one for each gun body) are installed on a common air tube 21*a* that extends vertically along the length of its associated gun slot 18. In this embodiment there is an air tube/jet arrangement for each gun slot 18. The air jets 21 blow high pressure air across each gun body as the guns 20 are withdrawn from the booth 10 by the gun movers 24, thereby cleaning powder from the guns 20 and blowing powder off the gun bodies into the booth 10 where it is extracted via the extraction duct 40.

A significant aspect of the system 10 is that it can be realized as part of a retrofit on an existing system without the need for major changes to the shop area. For example, in the illustrated embodiment, the booth floor 16 is a mere 12 inches above the shop floor F. This permits the booth 10 to be interconnected if required with preexisting cyclone and feed systems, as well as fitting under existing conveyor systems.

Figure 2:
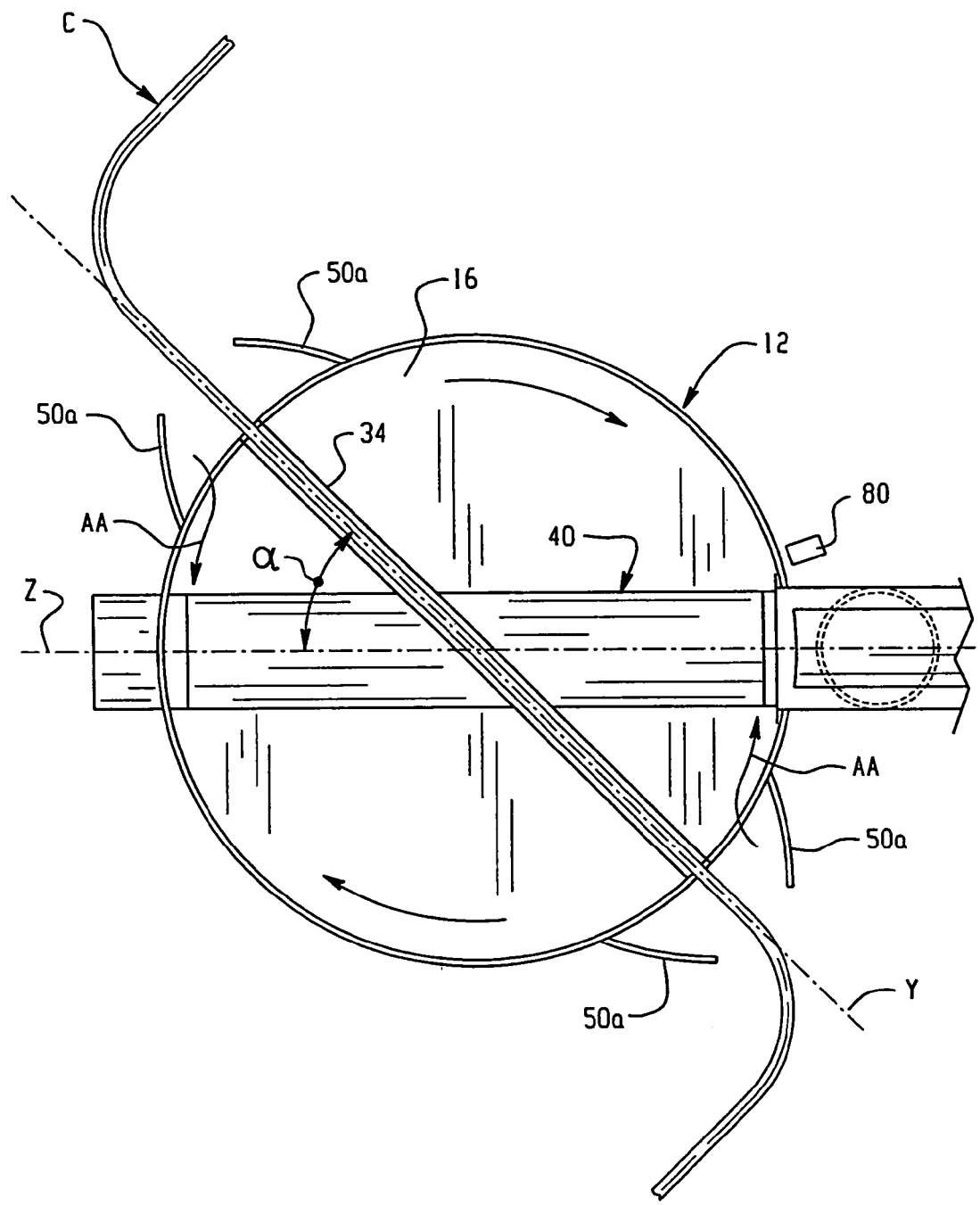
FIG. 2 is a simplified top view of the spray booth and cyclone system.

With reference to FIG. 2, the spray booth 10 is illustrated in a simplified manner from a top or plan view with the base 30 and the ceiling 14 omitted. The canopy 12 includes access doors 50 that permit larger objects to be conveyed into the spray booth 10. As illustrated in FIG. 1, the doors 50 may be similar to a "dutch" door arrangement in which there are upper doors 50*a* and lower doors 50*b*. The lower doors 50*b* are typically opened simply to permit an operator easy access to the booth 10 interior. These openings provide the major source of air that enters the booth 10 during a spraying operation when the cyclone system 42 is operating. This primary air flow pattern serves as containment air to keep the powder overspray within the booth 10. Although air flow will also be produced in other areas of the booth 10, for example at the conveyor slot 34, these secondary openings and gaps contribute much less to the overall containment air pattern than the air entering through the various door openings and any vestibule when vestibules are used. The diametric centerline Y of the primary air flow pattern, such as for example through the access doors 50, forms an angle α with the centerline Z of the extraction duct 40. Preferably the angle α is about 45 degrees. Thus the air flow (as indicated by directional arrows AA) into the booth 10 is not parallel with the extraction air flow into the duct 40. This causes air flowing into the booth 10 to have to turn and head downward (see also FIG. 4) in order to reach the low pressure zone near the extraction duct 40 along the floor 16, as represented by the directional arrow AA. This air flow pattern thus produces a descending outer air circulation around the booth 10 that results in a relatively low air flow in the central region of the spray booth 10, which central region is where the spray guns 20 are disposed to spray an object. This relatively calm central region means that the powder spray patterns are not adversely affected by the rather high volume of containment air flowing into the booth 10. Thus, excellent powder containment is effected without a significant effect on the transfer efficiency of the guns 20.

Figure 3:
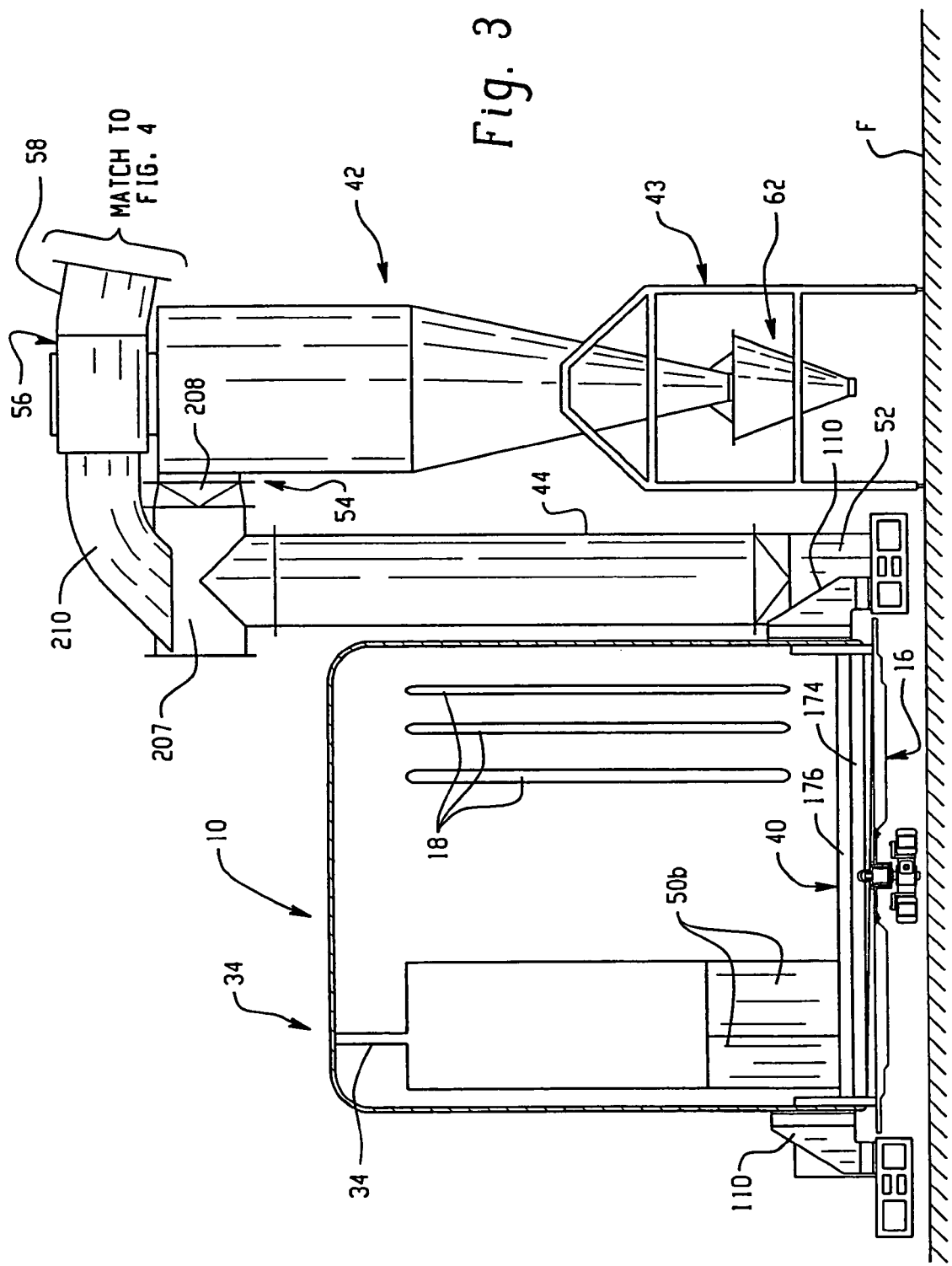
FIGS. 3 and 4 illustrate in elevation a typical powder coating system layout.

FIGS. 3 and 4 illustrate in plan a typical floor layout for the system 1 (the spray booth 10 is illustrated in vertical cross-section). Note that in FIG. 4 we illustrate the use of two gun movers 22. In this arrangement, the cyclone system 42 is connected to the outlet of the extraction duct 40 by a transition elbow duct 52. The powder laden air flows from the extraction duct 40, into the elbow 52 and up the vertical connecting ductwork 44 to the tangential inlet 54 of the cyclone 42. The cyclone system 42 includes a bypass plenum 56 that has a reclaim/non-reclaim bypass valve therein, which will be described further hereinafter. When the cyclone is in a "reclaim" mode of operation, the cyclone exhaust air, which typically still includes powder fines that were not removed by the cyclonic filtering action, passes through additional exhaust ductwork to a conventional after-filter assembly 60 (FIG. 4). Powder that is separated by the cyclone 42 falls into a cyclone hopper 62 (FIG. 3) from where it can be manually removed and returned to the feed center 46 main hopper (not shown) or can be automatically transferred to the feed center 46 by positive air pressure and appropriate ductwork, valves and filters. In prior art systems, a pinch valve assembly (not shown) has sometimes been installed below the cyclone hopper 62 to control the transfer of the reclaimed powder from the cyclone 42 to the feed center 46. In the non-reclaim mode of operation, the cyclone system 42 is in effect taken off line by operation of the bypass valve, so that the powder laden air from the extraction duct 40 passes through the ductwork 44 and straight through the plenum 56 to the exhaust duct 58 and from there into the after-filter assembly 60. Note that the main blower (not shown) for producing the needed air flow within the booth 10, the extraction duct 40, the cyclone system 42 and the interconnecting duct work is physically located in the after-filter assembly 60. The main blower can be conveniently located elsewhere in the overall system as required.

FIG. 4 shows schematically some additional detail of a suitable gun mover 24. Note that the view angle of FIG. 4 is rotated from the view angle of FIG. 3 to show additional details, and that in FIG. 4 the cyclone system 42 has been omitted for clarity. The guns 20 are mounted on a frame or gun mount 22 which typically includes a number of tube lengths arranged horizontally and vertically to allow the guns 20 to be positioned as required. The oscillator 26 is supported on a moveable platform 64 that can translate back and forth on a base 66. The platform 64 is moved pneumatically or but other suitable means by the control system 48 so as to move the guns 20 horizontally into and out of the booth 10. The oscillator 26 moves vertically to allow the guns to be raised and lowered during a spraying operation. Preferably but not necessarily the gun mover bases 66 are supported on wheel assemblies 106 (FIG. 6) that allow the gun movers 24 to be rolled across the shop floor (see FIG. 6). This allows the gun movers 24 to be part of an overall modular spraying system in that various main components can be added on and separately assembled to the booth 10 and frame 30 assembly as required.

Figure 5:
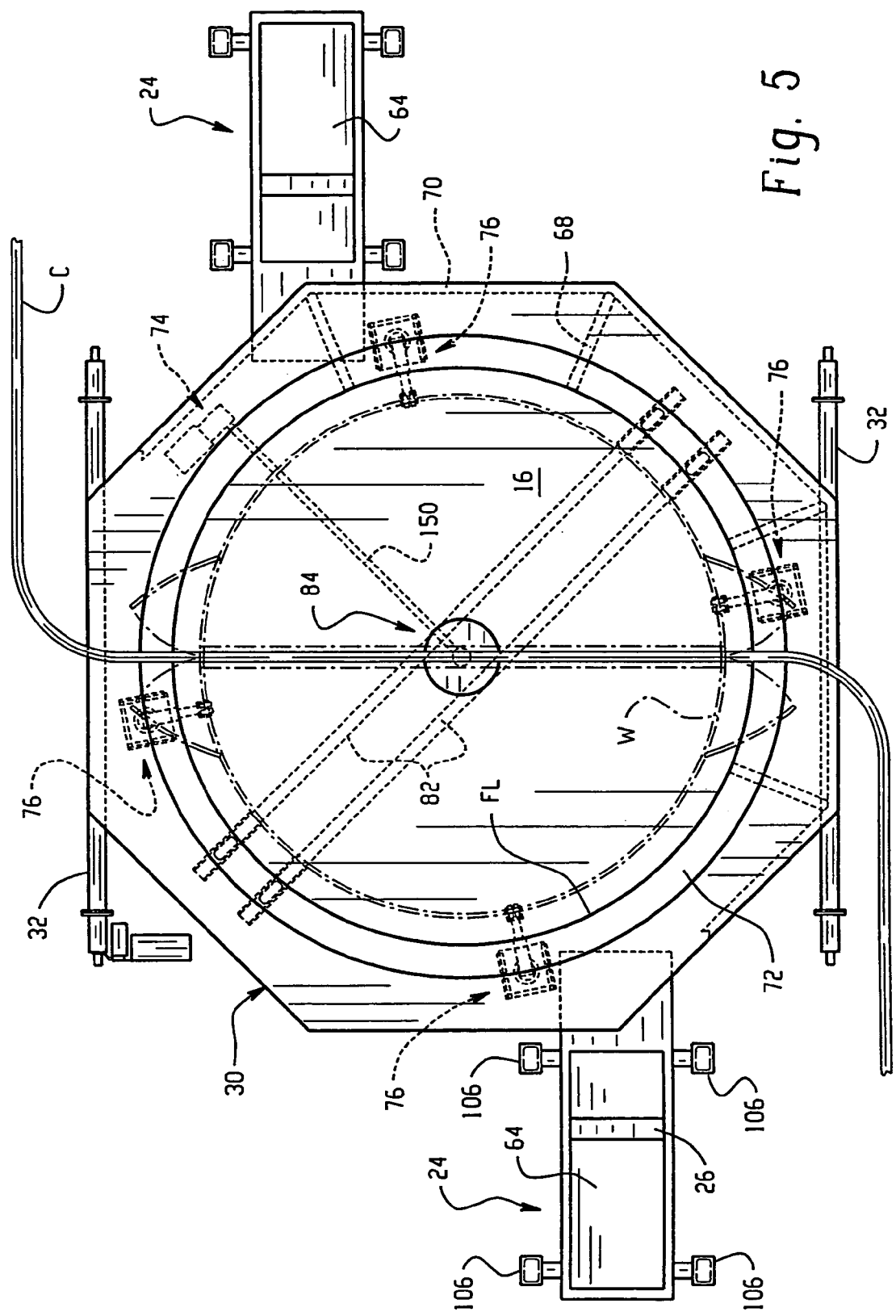
FIG. 5 is a plan view of a frame that supports a spray booth of the present invention.

With reference to FIG. 5, the support frame 30 is realized in the form of a octagonal framework although the actual geometry and configuration may be selected as required. The inner perimeter configuration of the frame 30 however is circular to accommodate the booth floor 16. The frame 30 includes a series of interconnected trusses 68 and frame bars or spars 70. A removable skirt or cover 72 is provided for aesthetics and to prevent accidental contact with the rotating floor 16. The frame 30 also supports various equipment such as a floor drive motor 74 and a series of four floor lifters 76. The bottom of the frame 30 rests on two parallel floor base support bars 32. As shown in greater detail in FIG. 6, the support bars 32 have wheels or casters 78 installed on each end. This permits the entire booth 10 and frame assembly 30 to be easily moved into position on the shop floor F.

The dashed lines W represent where the booth vertical canopy 12 walls align with the frame. The circle FL indicates the outer perimeter of the booth floor 16. Thus it is apparent that the floor 16 diameter is greater than the diameter of the canopy. In a typical booth, the canopy may be about 10 feet for example in diameter and the floor 16 may be about 11 feet in diameter. There is no practical restriction on the booth size however. The floor 16 extension past the canopy 12 wall acts as a fall-out pan so that powder that escapes through the gap between the floor 16 and the canopy 12 will alight on the extension. This amount of powder is typically going to be very small and consist mainly of fines and thus will tend to be drawn in by operation of the extraction duct 40, as well as a seal blow-off jet that will be described hereinafter.

A parallel pair of floor hub supports 82 extend across the inner perimeter of the frame 30. These hub supports are rigidly mounted to the frame 30. As will be further explained hereinafter, the floor 16 is mounted on the supports 82 via a hub assembly 84. Thus, the floor 16 is fully supported on the frame 30 as a unit separate from the canopy 12 to permit rotation and vertical movement of the floor 16 relative to the canopy 12.

The frame 30 supports a number of floor lifter units 76, which in this embodiment there are four lifters 76 evenly spaced around the frame 30. The basic function of the lifters 76 is to raise and lower the floor 16 vertically relative to the bottom edge of the canopy 12 walls. When the floor is raised, it is sealed against the bottom edge of the canopy 12. When in the lowered position, the floor 16 is free to rotate about the longitudinal axis X of the canopy, which is also the translation axis for the vertical movement of the floor 16.

As noted hereinbefore, the frame 30 also supports the ends of the extraction duct 40, and more specifically in this embodiment the transition duct to the cyclone system and the access door assembly at the opposite end. This permits the extraction duct to be supported in a position that is just above the top surface of the floor 16 when the floor 16 is rotating. The extraction duct 40 is not shown in FIG. 5.

Figure 6:
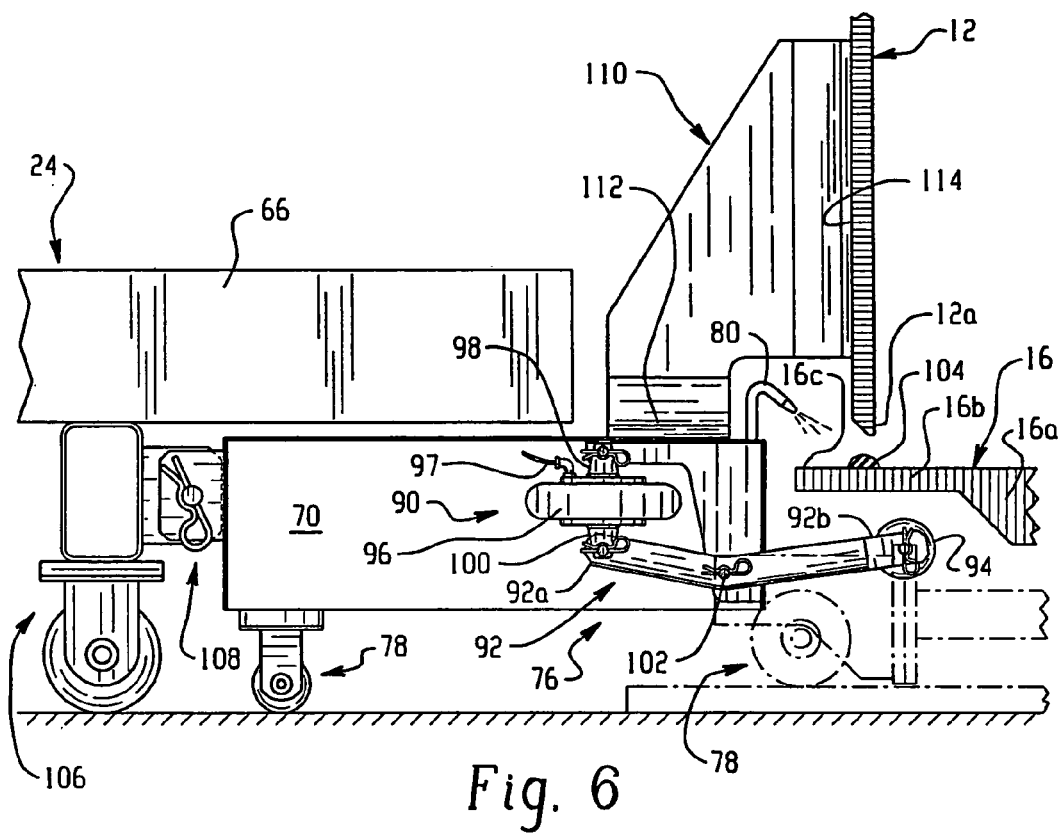
FIGS. 6 and 7 illustrate detail of a floor lift assembly for the spray booth, with the floor in the up and down positions respectively.
Figure 7:
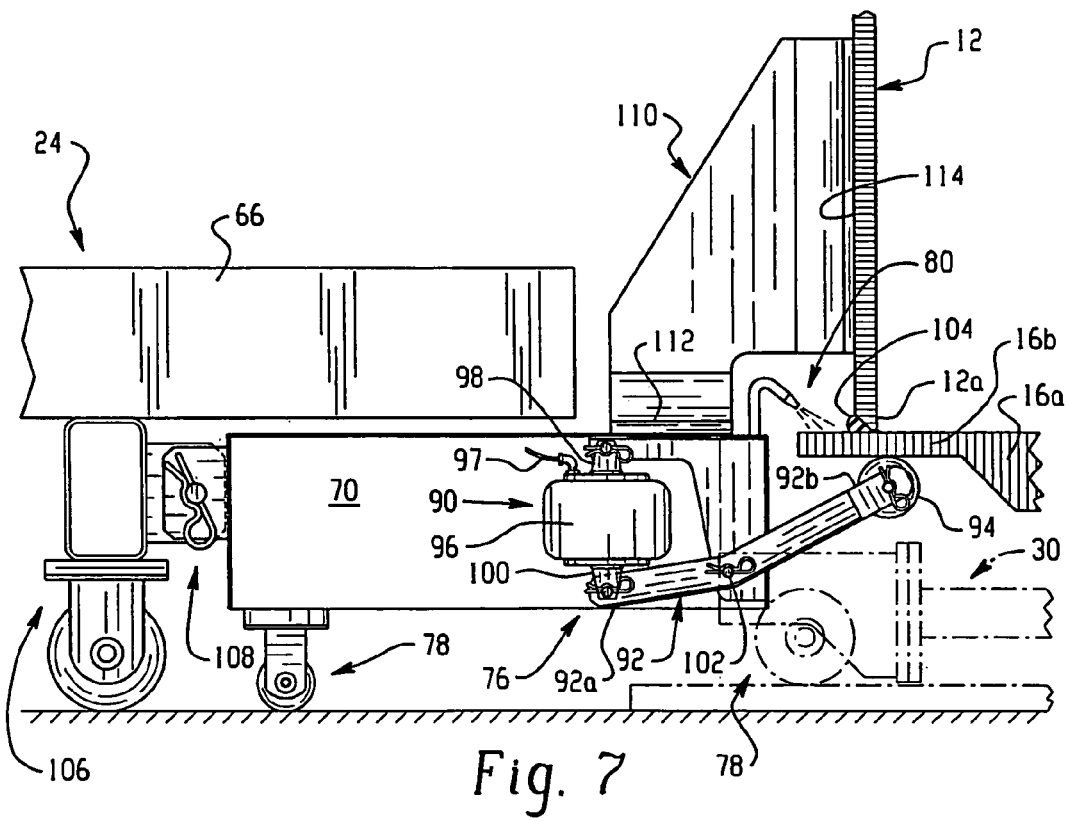

With reference next to FIGS. 6 and 7, the floor 16 includes a thicker middle section 16*a* and then at its periphery thins down to a rigid flange portion 16*b*. Four floor lifter units 76 are evenly spaced about the periphery of the floor 16 (see FIG. 5), and FIGS. 6 and 7 illustrate in detail one of the lifters 76, with the other three lifters being substantially the same. Although the lifter 76 design illustrated herein is a preferred design, those skilled in the art will readily appreciate that there are many available alternative ways to raise and lower the floor 16, especially since the displacement is rather short, on the order of about two inches or less. It is only necessary to lower the floor 16 from the canopy 12 to provide enough clearance so that the floor 16 can rotate freely. The smaller the gap between the floor 16 and the bottom of the canopy 12 wall 12*a*, the easier it is to contain powder from alighting beyond the canopy 12 wall periphery.

Each lifter 76 comprises three basic elements, namely a pneumatic actuator 90, a rocker arm 92 and a roller 94. In this embodiment, the pneumatic actuator 90 is realized in the form of a conventional air cushion shock commonly found in pneumatic suspension applications. The actuator 90 includes an inflatable bladder 96 that is supported by a pinned flange 98 on one of the trusses 70 of the frame 30. Pressurized air is supplied to the bladder 96 via an appropriate fitting and air hose assembly 97. The lower end of the bladder is attached or otherwise displaces a flange 100 that is pinned to a first end 92*a* of the rocker arm 92. The roller 94 is pinned to the opposite end 92*b* of the rocker arm and engages the underside of the floor 16 at the region of the floor flange portion 16*b*.

The rocker arm 92 is bent approximately at its middle and pinned at 102 to the frame 30 so as to be able to pivot about the axis of the pin 102. The control system 48 may be used to control the air pressure applied to the bladder 97, or this may be a manual control operation. In either case, all four lifters 76 are preferably but not necessarily actuated at about the same time in order to maintain the floor 16 generally level. When the bladder 96 is inflated by the application of pressurized air, the bladder 96 expands thus pushing down the flange 100 which pushes down the first end 92*a* of the rocker arm 92. This causes the rocker arm to pivot in a counterclockwise direction (as viewed from the illustration in FIG. 6). The counterclockwise pivoting action raises the roller 94 thus raising the floor 16. The floor 16 will be raised until it engages with the lower edge of the canopy wall 12*a*. This is the raised and sealed position of the floor 16 as shown in FIG. 6, and the floor is non-rotating when in the raised position. An elastomeric seal 104 or other suitable seal is disposed on the floor 16 and engages the lower end of the canopy 12*a* when the floor 16 is raised into sealing engagement with the canopy 12.

At least one air jet nozzle 80 is positioned on the frame 30 at the perimeter of the floor 16 to direct pressurized air at the seal 104 when the floor 16 is in its lowered position. This air jet 80 cleans the seal 104 of any overspray powder after cleaning activities inside the booth 10 are completed in preparation for a color changeover. The air jet 80 is not otherwise turned on as it is typically not needed. The nozzle 80 is preferably positioned near one end of the extraction duct 40 so as to blow powder from the seal 104 directly into the duct 40. The small air movement induced by the nozzle 80 will be sufficient to draw powder that has alighted on the floor 16 extension 16*c* outside the canopy 12 wall to be swept into the duct 40.

The circumferential elastomeric floor seal 104 is affixed to the floor 16 or carried on the bottom of the canopy 12 and forms an air tight seal between the floor 16 and the canopy 12 when the floor is in the raised position. Any suitable seal or gasket material may be used for the floor seal 104. This permits an operator to enter the booth 12 when the floor is in its raised position and use an air wand or other mechanism to blow powder off the canopy walls, ceiling and the extraction duct 40 without blowing powder out the booth between the floor 16 and the canopy 12 or having powder get trapped between the floor 16 and the canopy 12. This cleaning operation will typically be performed as part of a color change operation.

When the air pressure in the bladder 96 is relieved, the bladder 96 contracts and pulls up the first end 92*a* of the rocker arm, thus causing the rocker arm 92 to pivot clockwise (as viewed in FIG. 6). This rotation lowers the roller 94 and the floor 16 lowers under the force of gravity with the roller 94. The roller 94 lowers until it contacts the frame 30. As will be described herein shortly, the floor 16 is mounted on the hub assembly 84 that not only permits the floor to be rotated but also allow for this axial displacement of the floor 16 relative to the canopy 12.

FIG. 6 also illustrates that the gun mover base 66 may be supported on wheel assemblies 106 so that the gun movers 22 may be easily connected and disconnected from the booth frame 30. A pinned connection 108 may be used to releasably connect the gun mover base 66 to the frame 30.

FIG. 6 illustrates another aspect of the invention. Since the floor 16 is rotated during spraying and color change/cleaning operations, the canopy 12 and the ceiling 14 need to be supported separate from the floor 16. This is accomplished in the illustrated embodiment by the use of hanging knees 110 that are positioned around the frame 30. Each knee 110 includes a lower horizontal flange 112 that is bolted or otherwise secured to the frame 30. The knee 110 extends up then inward toward the booth 12. The knee further includes a vertically extending flange 114 that may be slightly curved to match the curvature of the canopy 12 wall. It is preferred although not required that the knees 110 are made of non-conductive composite materials, such as in accordance with the processes described in the above-referenced patent application. However, the knees 110 may be made from any non-conductive material provided that the knees 110 have enough rigidity and strength to support the canopy 12 and ceiling 14.

Each knee 110 is bonded to its respective portion of the canopy 12 outer wall surface. Any suitable bonding agent may be used and will be determined based on the materials of the knee 110 and the canopy 12. By this arrangement, the canopy 12 and ceiling 14 are fully supported just above the floor 16 (which extends under the canopy 12 wall as in FIG. 5) and there are no conductive bolts or plates or other elements that would attract the electrostatically charged powder. The use of the composite materials for the canopy 12 makes the canopy a fully self-supported structure that is cantilevered over the floor 16.

Figure 17:
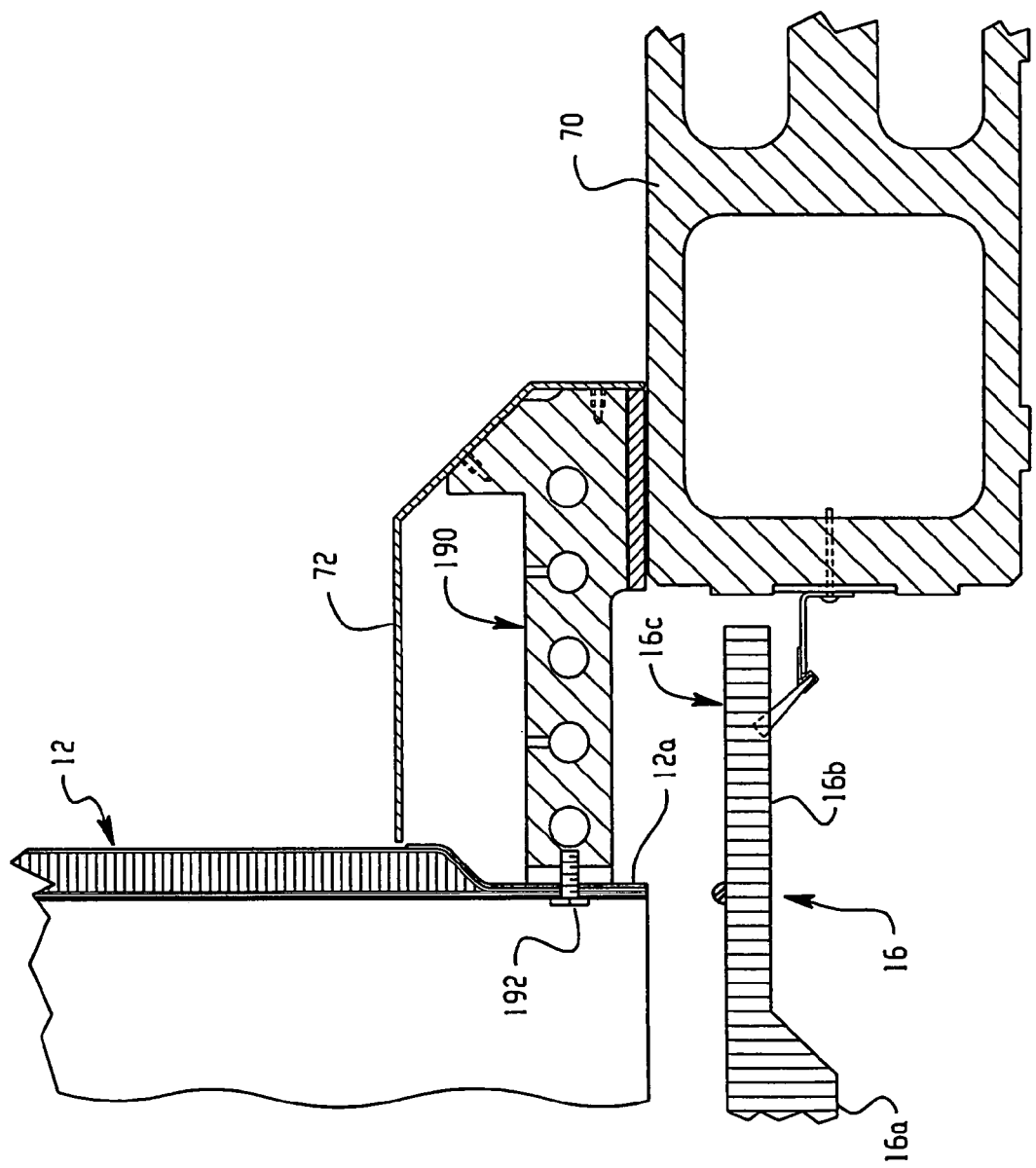
FIG. 17 is an alternative embodiment of a canopy support arrangement.

In an alternative embodiment illustrated in FIG. 17, the canopy 12 wall is attached to a plurality of hanging knees 190 by screws 192. In FIG. 17 the floor 16 is shown for reference purposes. Note in this embodiment that the lower end 12a of the canopy 12 wall is substantially reduced in thickness to provide a mounting flange that is attached to a flange on the hanging knee 190. Each knee 190 is also bolted to a corresponding support truss 70 or other firm structure on the booth support frame 30. FIG. 17 further illustrates the provision of the non-conductive plastic shroud 72 that overlays the frame 30 to keep dust out of the frame interior and for aesthetic value.

Figure 8:
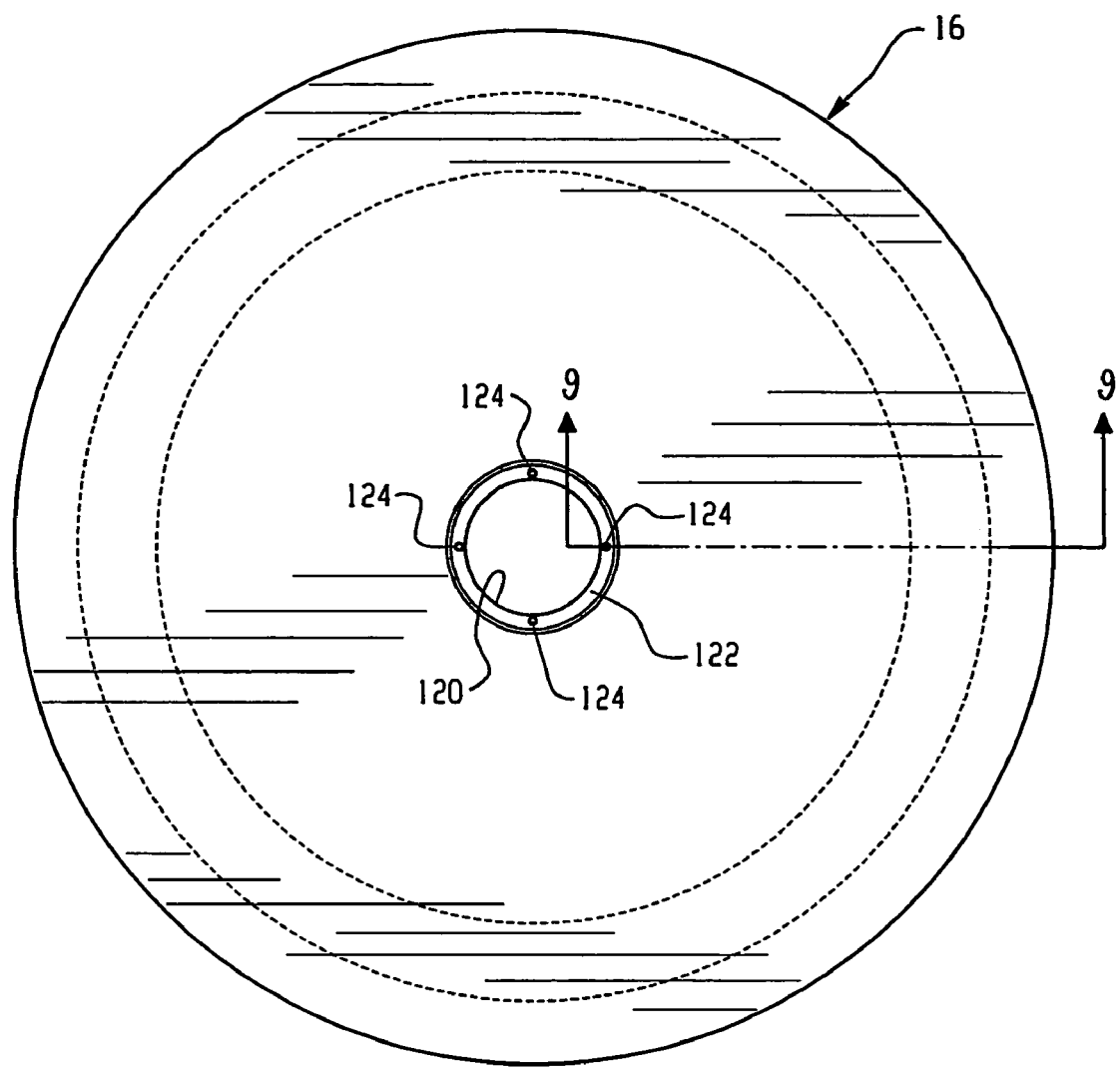
FIG. 8 is a plan view of the spray booth floor.
Figure 9:
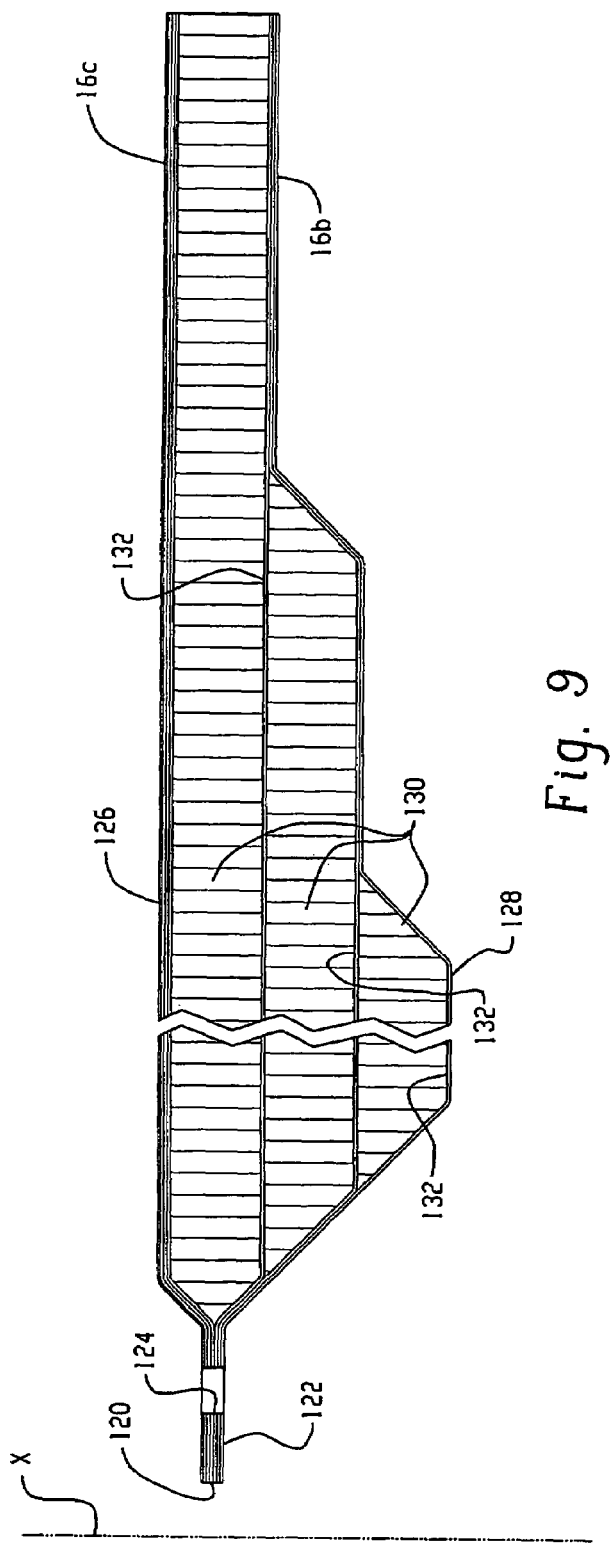
FIG. 9 is a cross-section of the floor taken along the line 9A—9A in FIG. 8.

With reference to FIGS. 8 and 9, the floor 16 is a multi-layer construction of composite materials. The floor 16 includes an inner hub hole 120 formed by an integral annular hub flange 122. As best shown in FIG. 9, the floor 16 is built up in a step-wise fashion so as to have its greatest thickness in the middle region of the floor 16. The layers are then step-wise eliminated such that the outer perimeter of the floor is formed by the flange 16b. With reference to FIGS. 8 and 9, the inner hub flange 122 includes four bolt holes 124 that receive mounting bolts to attach the floor 16 to the hub assembly 84. FIG. 9 further shows schematically the laid-up construction of the composite floor 16 when the floor is made in accordance with the processes described in the above-incorporated patent application. The floor 16 upper or active surface 126 is a layer of gelcoat while the underside surface 128 is a layer of epoxy barrier. In between these two layers are layers of PVC coring 130 and bi-directional fabric 132. The resulting floor 16 has very high strength and rigidity and very low conductivity, therefore, powder overspray will not easily adhere to the floor upper surface 126.

Figure 10:
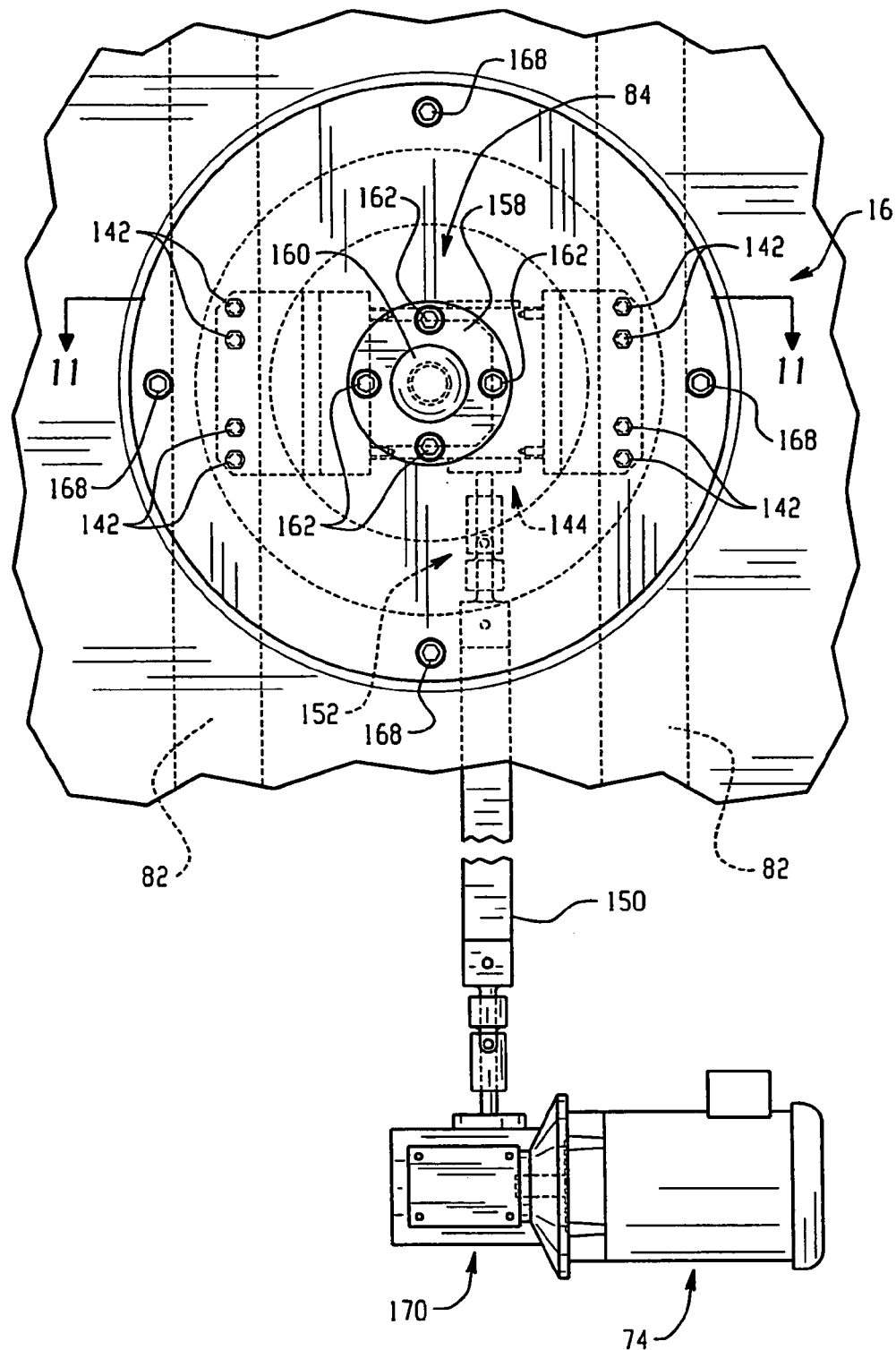
FIG. 10 is an embodiment of a floor hub assembly in plan.
Figure 11:
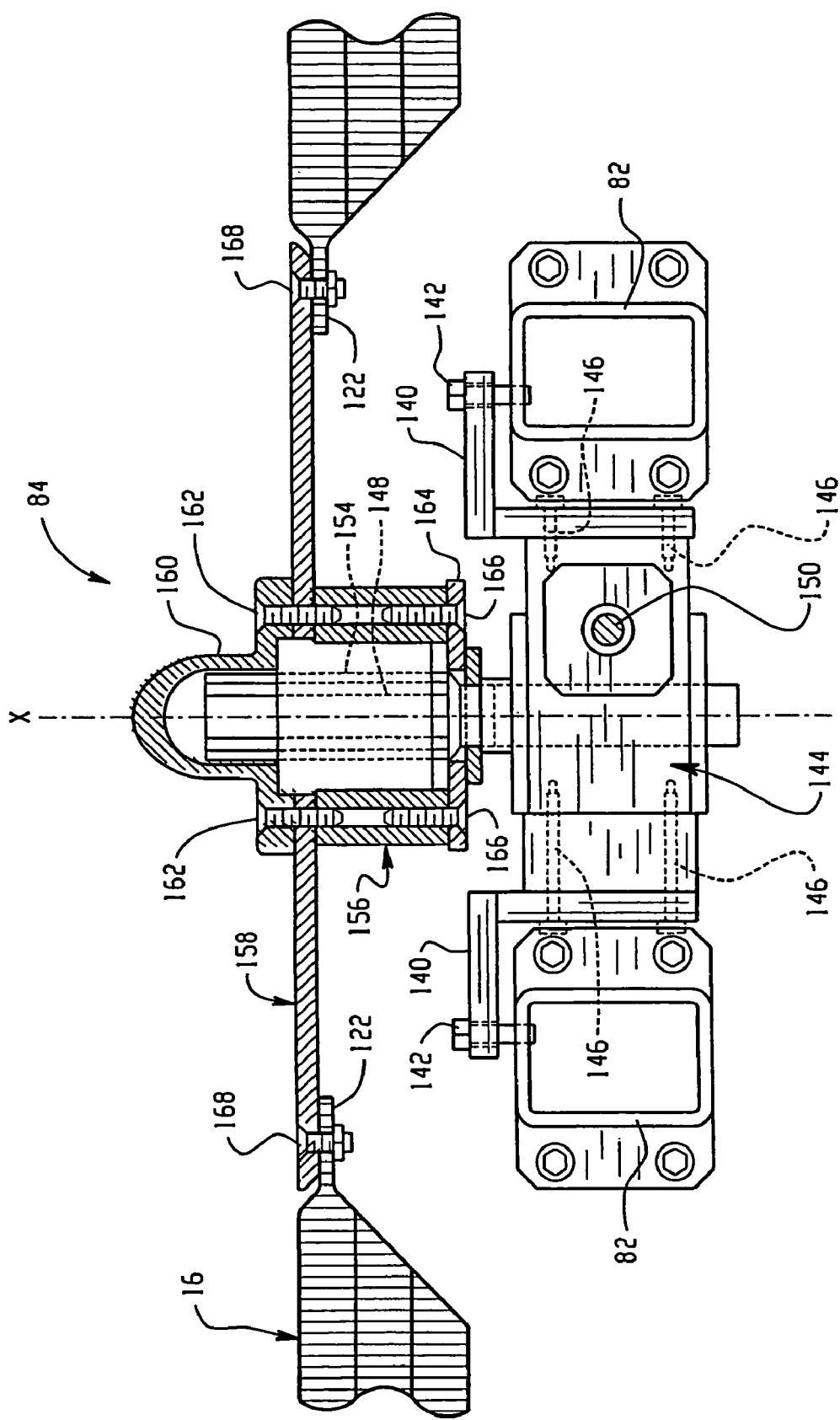
FIG. 11 is the hub assembly of FIG. 10 in vertical cross-section along the line 11—11 in FIG. 10.
Figure 12A:
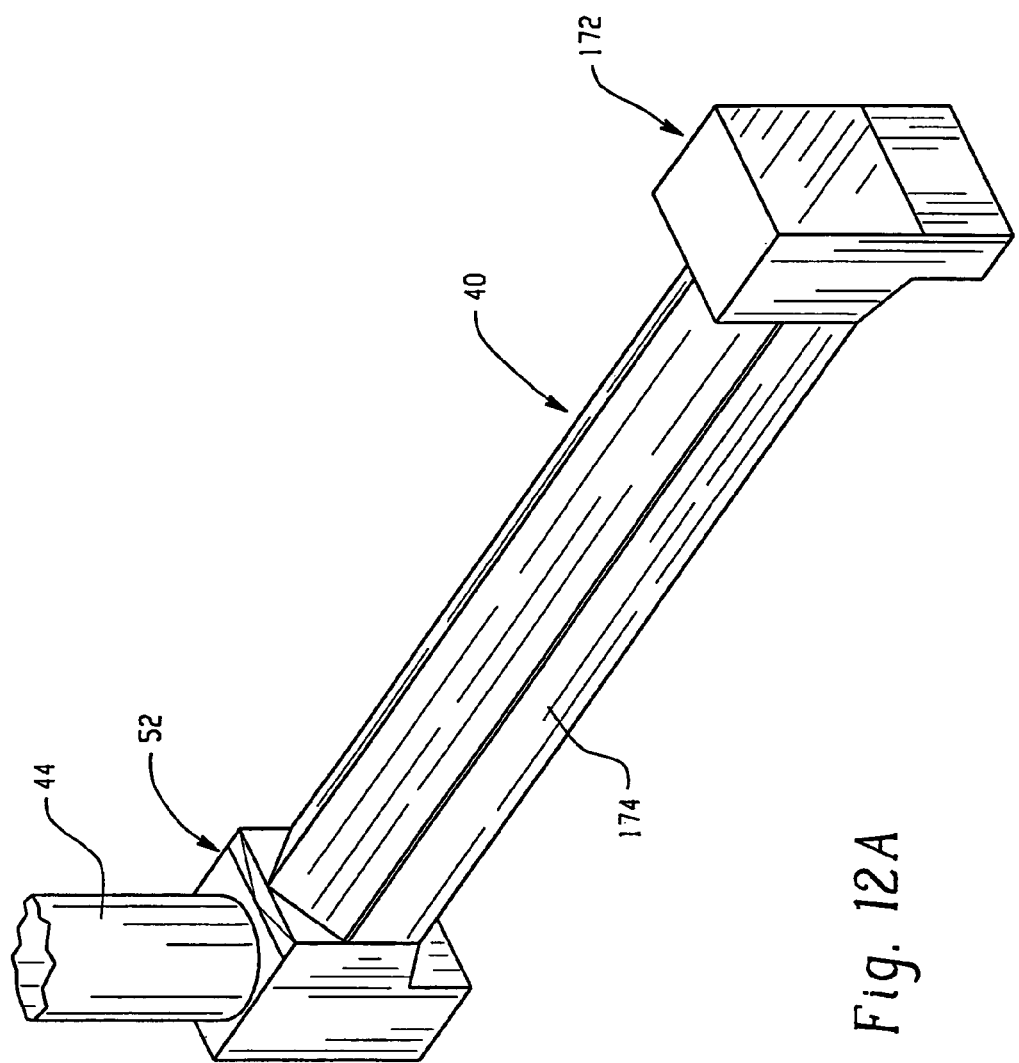

With reference to FIGS. 10 and 11, the hub assembly 84 is supported by the parallel hollow bar hub supports 82 which extend across the frame 30 (FIG. 5) and are mounted to the frame 30 by bolts or other suitable means (not shown). Mounted on each support bar 82 is a gear box support bracket 140. Each bracket 140 may be attached to its respective support bar 82 by bolts 142 for example. A gear reducer box 144 is mounted on the brackets 140 by bolts 146. The gear reducer 144 drives a spline shaft 148 in response to rotation of a drive shaft 150 that is coupled to the gear box 144 by a universal joint 152. The drive shaft 150 is turned by a ¼ horsepower motor 74 that is mounted on the frame 30 as described hereinbefore.

The spline shaft 148 meshes with a track hall spline 154 that has an inner spline for the spline shaft 148 and an outer spline that meshes with a coupling 156. The coupling 156 is mounted on an aluminum hub plate 158 by a cap 160 that is attached to the coupling 156 by bolts 162, and a collar 164 that is attached to the coupling 156 by bolts 166. The floor 16 is mounted on the hub plate by bolts 168 that pass through the floor hub flange 122 bolt holes 124 (FIG. 8).

By this arrangement, the motor 74 turns the drive shaft 150 through a gear reducer 170, with the drive shaft turning the spline shaft 148 through the gear reducer 144 that is mounted on the frame 30 via the support bars 82. The spline shaft 148 rotation thus rotates the floor 16 via the coupling 156. By use of the spline arrangement between the drive shaft 150 and the hub plate 158, the floor 16 can be axially translated along the axis X a limited distance as previously described herein under operation of the floor lifters 76. The control system 48 may be programmed to set or adjust the motor 74 speed and hence the floor 16 rotation speed.

With reference to FIGS. 12, 12A, and 13–14, the extraction duct 40 in this embodiment is a metal duct that is mounted on one end to the cyclone elbow duct 52 and at the other end to an access door duct 172. The cyclone elbow duct 52 and the access door duct 172 are both mounted on the frame 30 and support the extraction duct 40 just off the floor 16. For reference, the canopy 12 wall location is shown with dashed lines W in FIGS. 12 and 13, and the floor FL is also represented.

The extraction duct 40 includes a lower skirt 174 that tapers downwardly towards the floor 16 along the longitudinal axis of the duct 40. This taper is defined by an angle $\beta$. The extraction duct 40 is supported about two inches above the floor 16, and the small optional taper $\beta$ is used to maintain a constant air flow pattern through the duct 40. Without the taper, the higher negative air pressure closest to the cyclone inlet 52 would cause an uneven flow pattern within the booth. When the floor is in the raised position, there is only a very small or zero gap between the duct 40 and the floor 16 at the cyclone duct 52 end, and about two inches at the opposite end. Thus at its maximum when the floor 16 is lowered, the opposite end has about a four inch or less gap between the bottom of the duct 40 and the floor 16.

Figure 14:
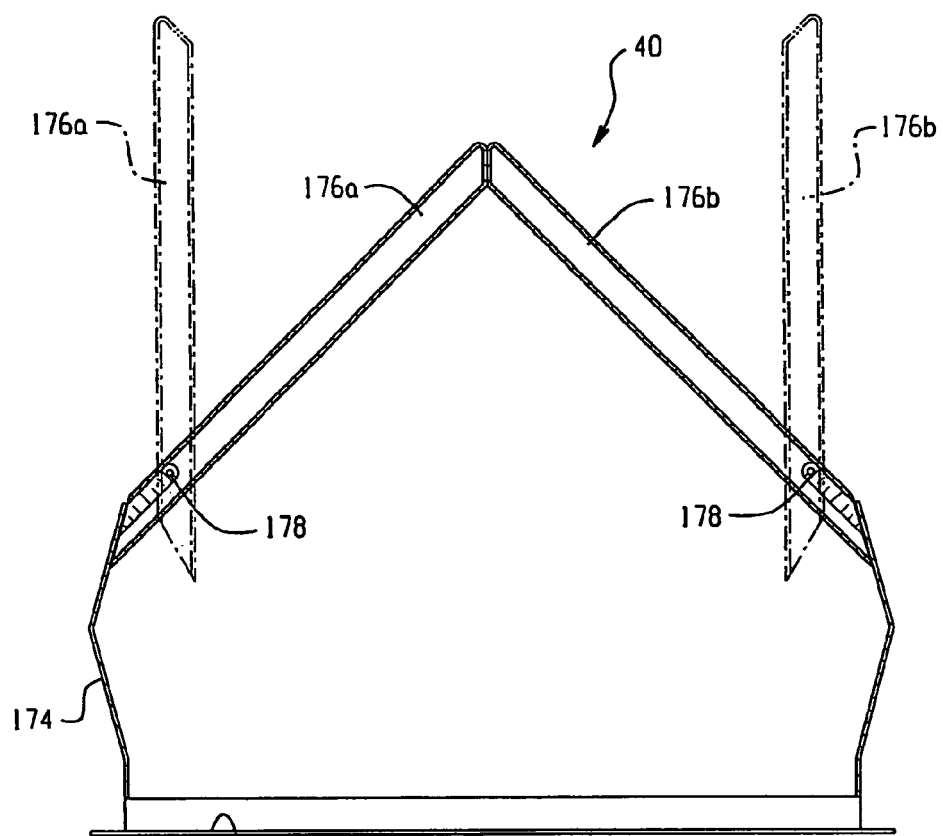
FIG. 14 is a cross-section of the extraction duct of FIG. 12 along the line 13—13 in FIG. 12.

As best illustrated in FIG. 14, the duct 40 further includes two doors 176a and 176b that are attached to the skirt 174 by suitable hinges 178. The hinges 178 allow the doors 176a,b to open as illustrated in phantom in FIG. 14 to prevent excessive pressure build-up in the duct 40. Pressure can build up inside the duct 40 when the floor 16 is in the raised position during booth cleaning and as part of a color change operation. But under normal operating conditions, the doors 176a,b are closed and held closed by the negative air pressure within the duct 40. As the floor rotates under the duct 40, powder on the floor 16 is drawn up into the air stream inside the duct 40 and carried out to the cyclone system 42.

Figure 15A:
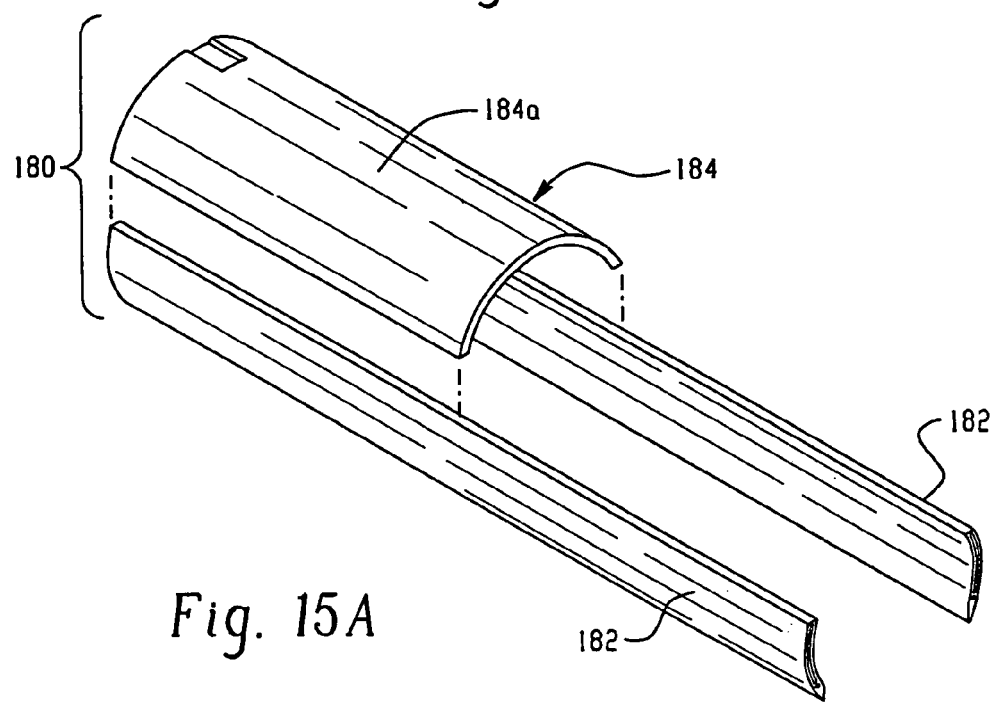
FIGS. 15A and 15B illustrate an alternative embodiment of an extraction duct, illustrated in exploded perspective in FIG. 15A and in perspective as assembled in FIG. 15B.
Figure 15B:
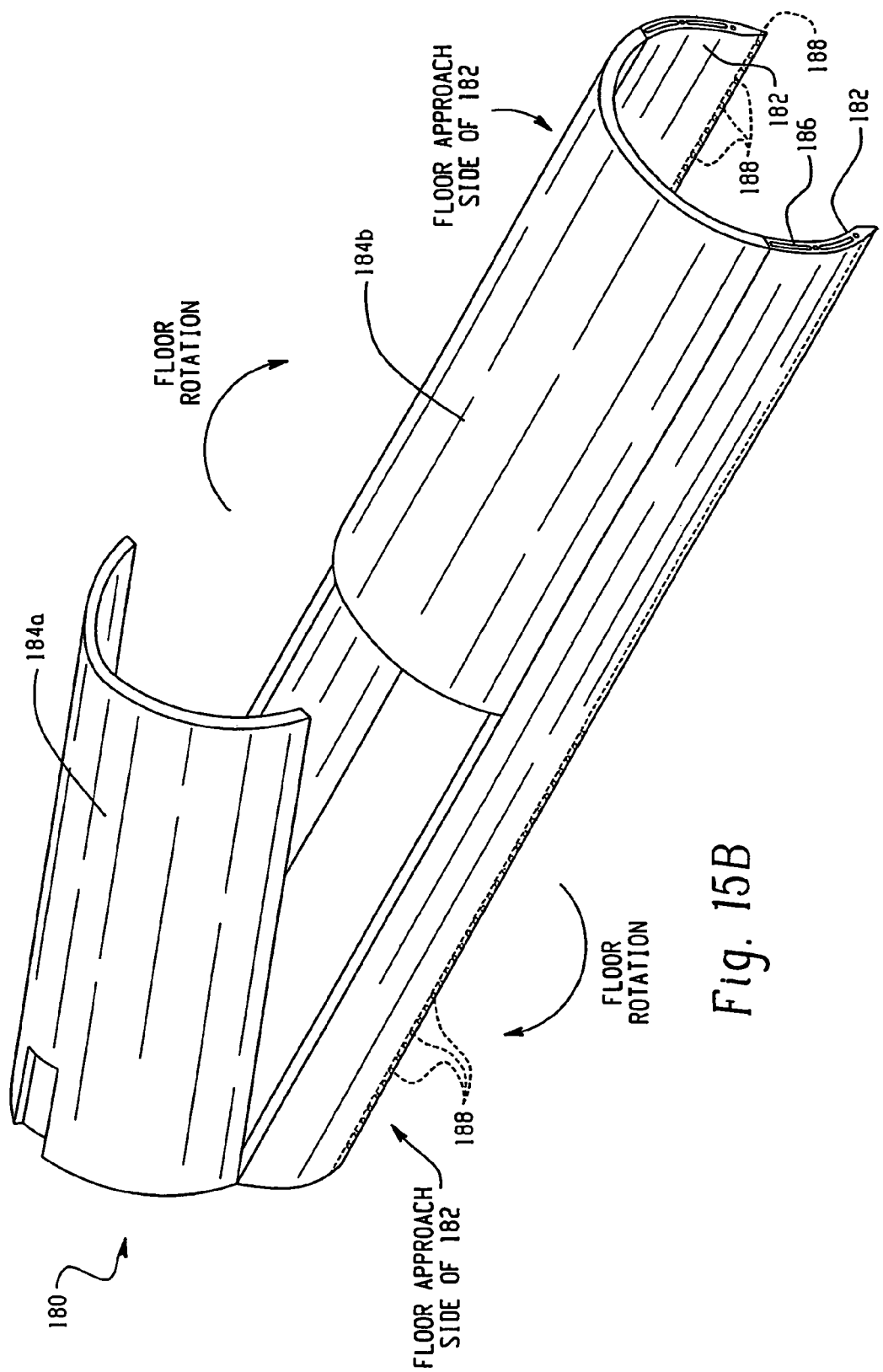
Figure 16:
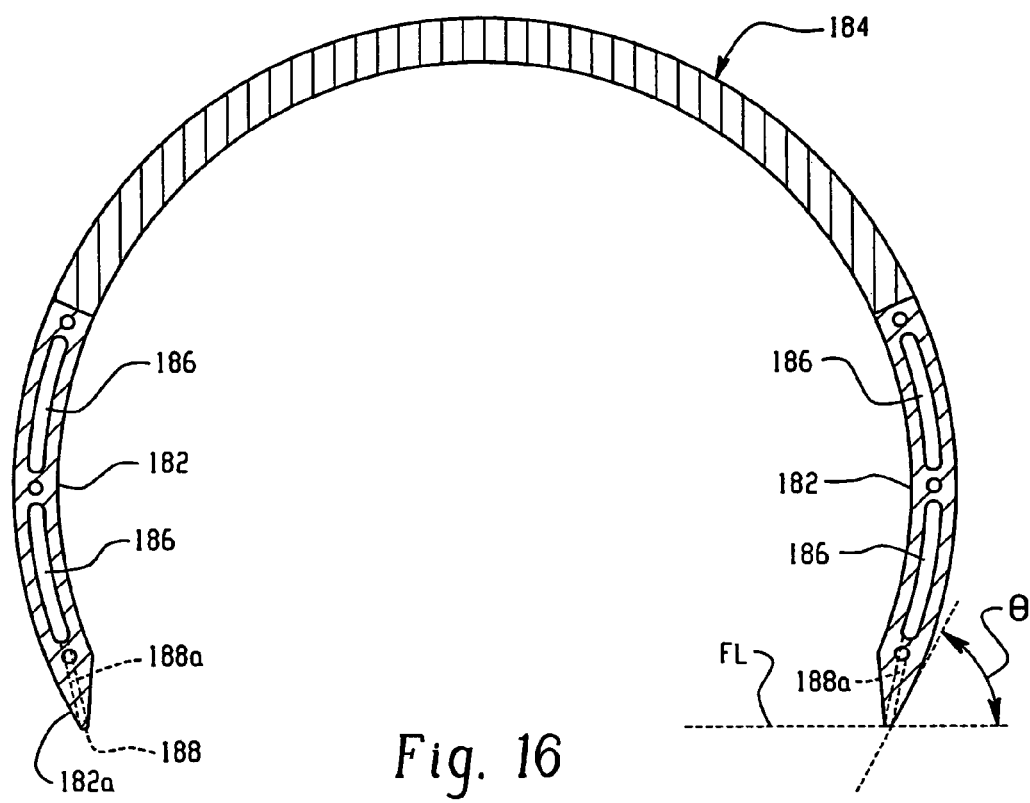
FIG. 16 is the extraction duct of FIG. 15 shown in lateral cross-section.
Figure 16A:
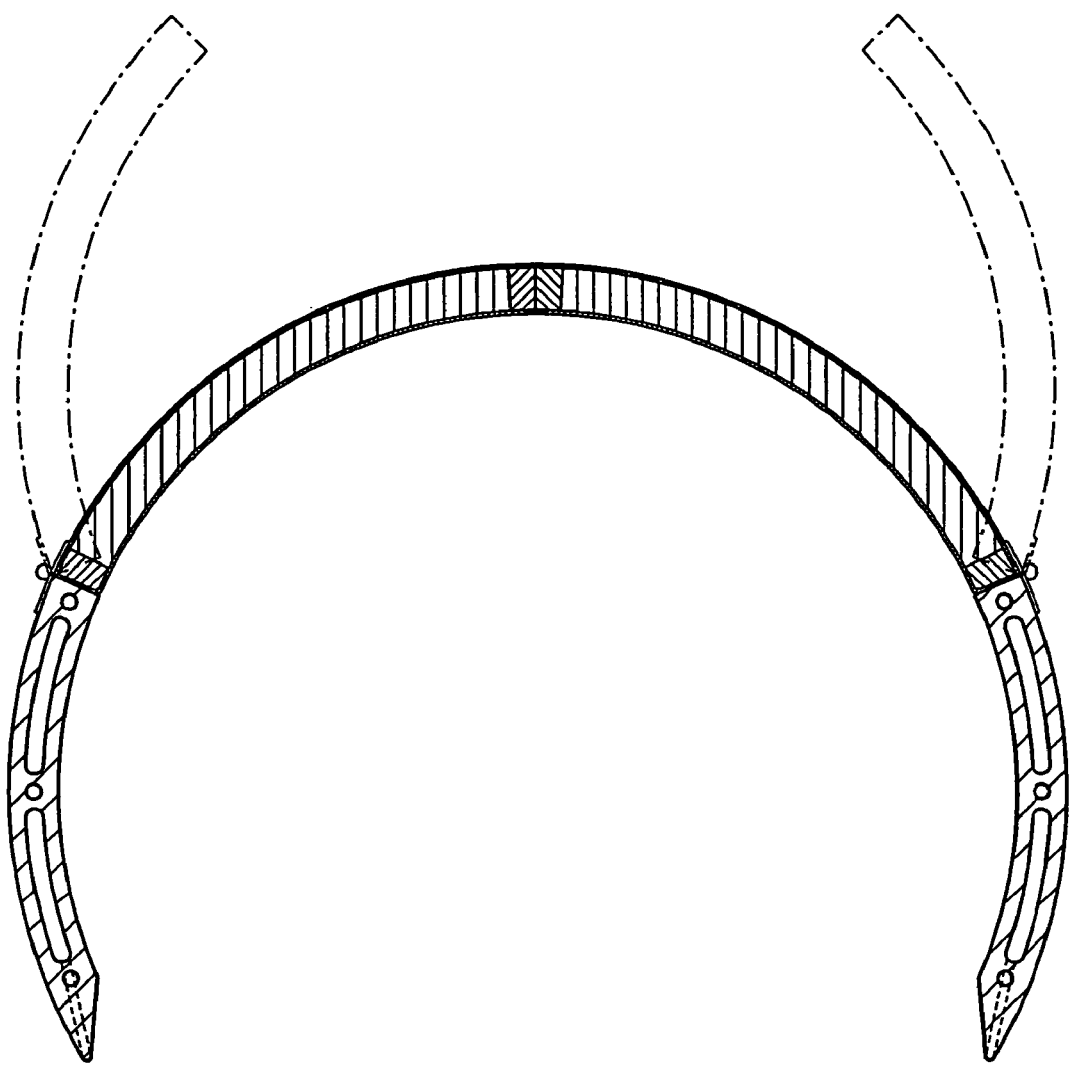
FIG. 16A is an alternative embodiment of the extraction duct of FIGS. 15A and 16 shown in lateral cross-section.

With reference to FIGS. 15A, 15B and 16, in an alternative embodiment the extraction duct 180 may be partially made of composite materials similar to the materials used for the booth 12. The duct 180 includes two longitudinal metal rails 182 that extend in parallel across the floor 16 and that are joined at the top by a cover 184. The rounded cover reduces powder buildup on the duct 180 and therefore is preferably but not necessarily made of composite very low conductivity materials. In contrast to the embodiment of the all metal duct 40, the cover 184 is a two piece cover 184a,b with each half hinged at the outer longitudinal ends thereof. The covers thus lift vertically from the lengthwise center point of the duct 180 when open as illustrated in phantom in FIG. 15B and extend up along the canopy wall. FIG. 16A illustrates another alternative embodiment in which the composite cover 184' comprises two halves 184a' and 184b' that are hinged lengthwise in a manner similar to the embodiment of FIG. 14. As in the embodiment of FIGS. 15A and 16, the composite duct cover 184' may, for example, be made using the processes for making the composite booth 12.

The duct 180 is mounted above the floor 16 and may be installed in a manner similar to the all metal duct 40 embodiment. In accordance with another aspect of the invention, in some applications it may be required to apply additional force to the powder residue that adheres to the floor 16 if the suction from the duct is insufficient to thoroughly dislodge the powder. In the embodiment of FIGS. 15 and 16, the composite duct 180 may be formed with internal air passageways 186 within the rails 182 through which pressurized air is supplied (not shown). Each rail 182 is arcuate in shape so as to include an end portion 182a that lies on a tangent T that forms an included angle θ with the floor 12. The angle θ is preferably less than ninety degrees.

A series of air jets or orifices 188 are formed in the bottom of each rail 182 and are in fluid communication via passageways 188a with the air passageways 186 such that pressurized air is directed out of each orifice 188 against the floor but at an angle that causes powder on the floor 12 to be blown into the extraction duct 180 interior. The orifices 188 are spaced along the lower edge of each rail 182 on the approach side of the extraction duct 180, thus for each rail 182 the orifices 188 are provided only on one half of each respective rail but a complete line of orifices extend across the entire booth floor 16. This positive pressure air from the jet slots 188 augments the powder removal suction caused by the negative air pressure flow within the duct 180. The pressurized air from the orifices 180 will tend to assist in dislodging powder overspray particles that may have adhered to the floor 12 and cannot be drawn up by the negative air pressure flow from the duct 180. The alternative duct 180 embodiment need not be made of the same materials as the booth 12, however, use of such materials will result in minimal collection of powder overspray on the duct 180.

Cyclone Bypass Valve

With reference again to FIG. 3, it is sometimes desired to be able to select whether the powder spraying system 1 operates in a powder reclaim or non-reclaim mode. For example, the system 1 may be operated in a non-reclaim mode when the powder overspray cannot be returned to the feed center for re-use. Since the reclaim powder mode of operation involves the use of the cyclone system 42, it is necessary to in effect take the cyclone 42 "off-line" for the non-reclaim mode.

Figure 18:
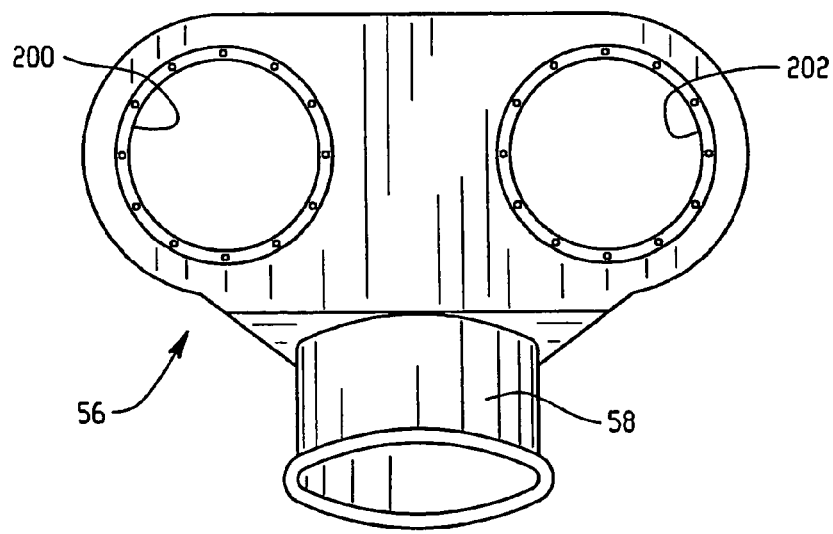
FIG. 18 is a bottom view of a bypass plenum.

FIG. 18 shows a bottom view of the bypass plenum 56. Each of the twin cyclones 42a,b have circular exhaust openings that align with openings 200 and 202 in the bypass plenum 56. In the reclaim mode, exhaust air from the cyclones 42a,b enters the bypass plenum 56 through the openings 200 and 202 and passes through the plenum outlet or exhaust opening 204 to the after-filter ductwork 58. In the non-reclaim mode, the openings 200, 202 are closed off by a bypass valve assembly 206.

With reference to FIG. 3, the vertical ductwork 44 that connects the extraction duct 40 to the cyclone system 42 is connected to a plenum manifold 207 that includes a first duct 208 that is connected to the cyclone inlet 54 (keeping in mind there are two such inlets when twin cyclones are used) and also includes a cyclone bypass duct 210. The bypass duct 210 extends over the top of the cyclone system 42 and is connected to the bypass plenum 56.

Figure 19B:
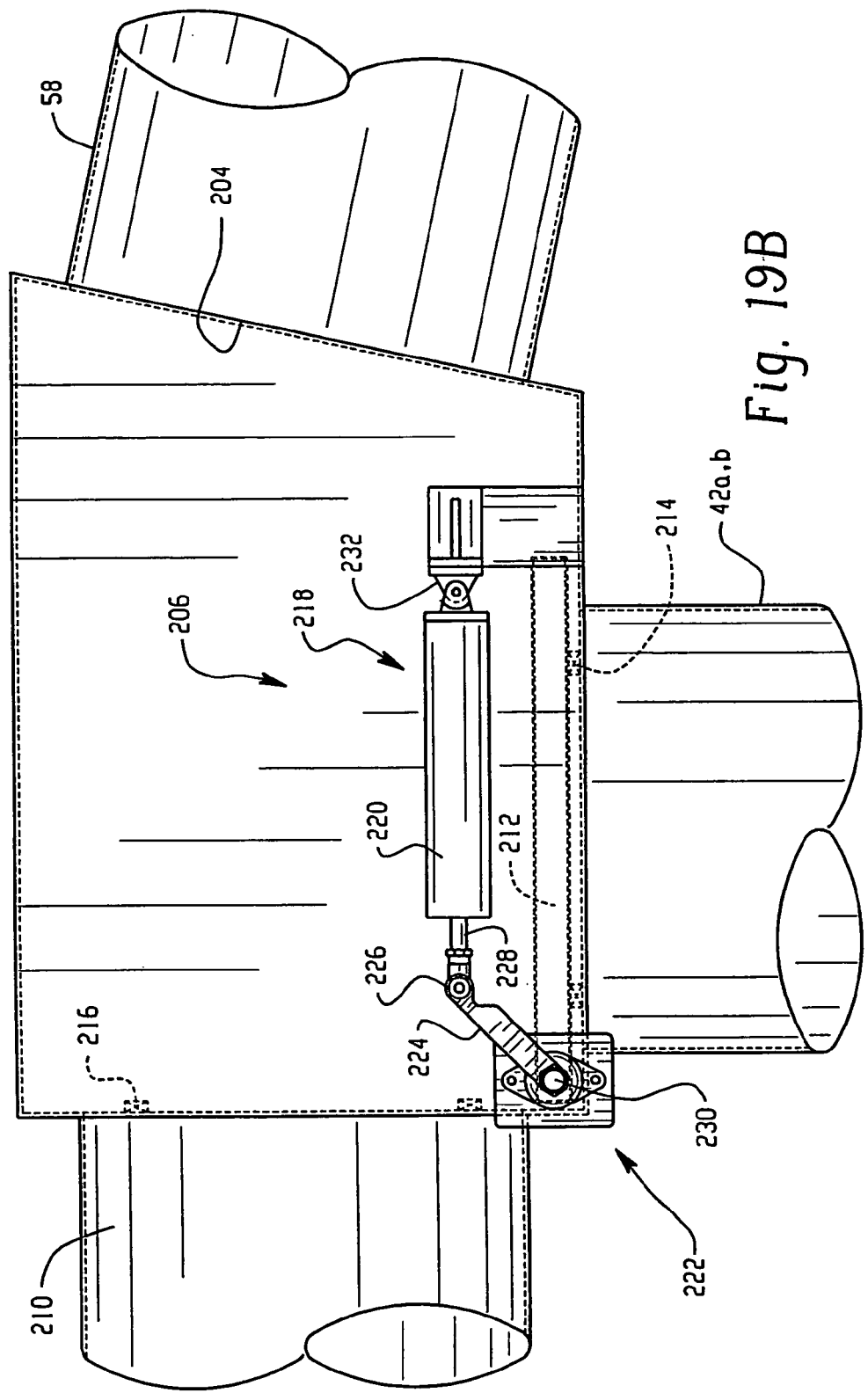

With reference to FIGS. 19A and 19B, the bypass valve 206 includes three basic components, namely a valve door 212, seals in the form of a pair of cyclone outlet seals 214 and a bypass duct seal 216, and a valve actuator mechanism 218. The valve door 212 is disposed within the bypass plenum 56 and is therefore shown in phantom in FIGS. 19A and B, whereas the valve actuator mechanism 218 is disposed outside the bypass plenum 56. In FIG. 19A the valve door 212 is shown in the cyclone open position and in FIG. 19B the valve door 212 is shown in the cyclone closed position which correspond in this embodiment to the reclaim and non-reclaim modes respectively.

The seals 214 and 216 are, for example, conventional D-seals. The cyclone seals 214 are installed on the plenum 56 around each of the cyclone openings 200, 202. Alternatively, the cyclone seals 214 may be installed on the valve door 212. The bypass plenum seal 216 may also be a D-seal and is installed in the plenum 56 around the opening between the bypass duct 210 and the bypass plenum 56. Again, alternatively, the duct seal 216 may be installed on the valve door 212 rather than the plenum 56 wall.

When the valve door 212 is in the upright or cyclone open position, the valve door 212 seals and isolates the bypass duct 210 from the bypass plenum 56. The cyclone exhaust outlets are also open to the bypass plenum 56 via the openings 200, 202. As a result, the powder overspray laden air from the extraction duct 40 passes into the cyclone inlets 54 whereby much of the powder is separated from the air stream and drops to the lower collection regions of the cyclones. The cyclone exhaust air, which may still contain powder fines, flows through the after-filter ductwork 58 to the after-filter assembly 60 (FIG. 4).

When the valve door 212 is in the down or cyclone closed position (FIG. 19B), the door 212 seals off and isolates the cyclone exhausts from the bypass plenum 56. The bypass duct 210 however is now open to the bypass plenum 56. When the cyclone exhausts are sealed off, the cyclone system 42 is non-operational and represents a high pressure impedance to the flow of air into the cyclone inlets 54. As a result, the powder laden air from the extraction duct 40 bypasses the cyclone inlets 54 and passes through the bypass duct 210, then straight through the bypass plenum 56 into the after-filter ductwork 58 and finally to the after-filter assembly or other waste receptacle.

The valve actuator mechanism 218 in this embodiment is realized in the form of a pneumatic piston type actuator 220 and a bell crank assembly 222. The bell crank assembly 222 is a lever 224 that is connected at its free end 226 to an actuator rod 228, and at its opposite or pivot end 230 is connected to the valve door 212 through the plenum 56 wall. The actuator 220 is pivotally connected to a mounting bracket 232 so that the actuator 220 is free to rotate slightly to avoid binding as it pushes and pulls on the bell crank lever 224. The actuator 220 may be controlled by the control system 48, or alternatively may be controlled by manual operation of a pressure valve. Still further, the valve door 212 could be manually moved, but an actuator is preferred to assure a good seal when the door 212 is in each position.

FIGS. 20 and 21 illustrate one embodiment of the valve door 212. The door 212 includes two faces 212a and 212b each of which will overlay respective openings 200, 202 to seal off the cyclone 42 when the door 212 is in the non-reclaim position, and cover the inlet from the bypass duct 210 when the door 212 is in the non-reclaim position. The door 212 is formed of a piece of sheet metal 232 that is bent around an actuator bar 234. One end of the actuator bar 234 is connected to the pivot end 230 of the bell crank lever 224

(FIG. 19). The door 212 is enclosed at its end and top with additional sheet metal and then injected with foam for strength and rigidity. In an alternative form of the door 212, a pair of doors may be used that individually pivot to close each cyclone exhaust opening. In this alternative, a separate third door may be needed to close off the bypass duct 210 when the system 1 is used in the reclaim mode.

It should be noted that the cyclone bypass valve concept may be used in any powder spraying system that utilizes a cyclone separator system. The bypass valve arrangement is therefore not limited to use in a system that uses other aspects of the system described herein such as, for example, the embodiments of the spray booth 10.

Powder Overspray Recovery System

Figure 22:
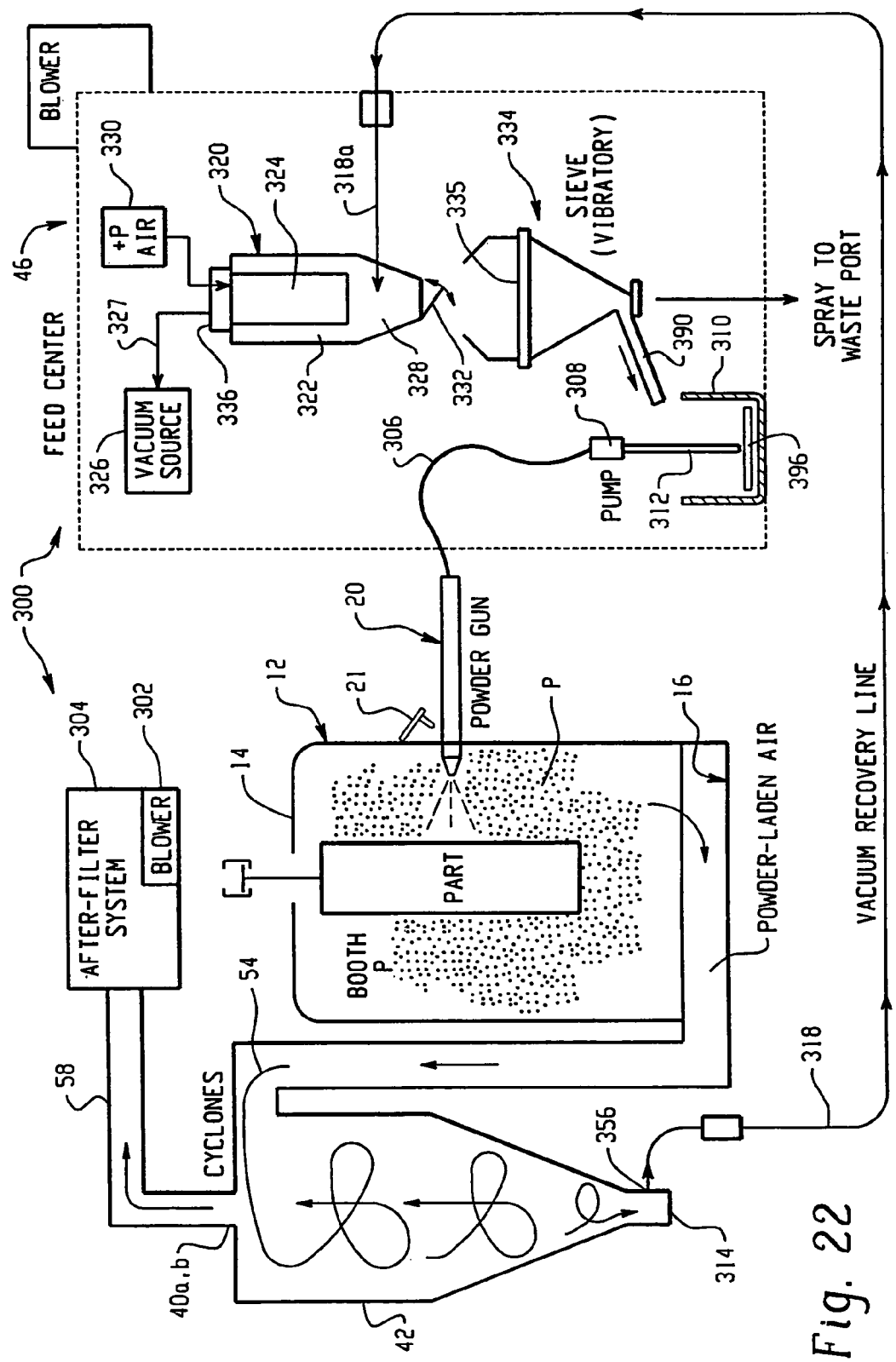
FIG. 22 is a simplified functional schematic of an embodiment of a powder overspray recovery system according to the invention.
Figure 23:
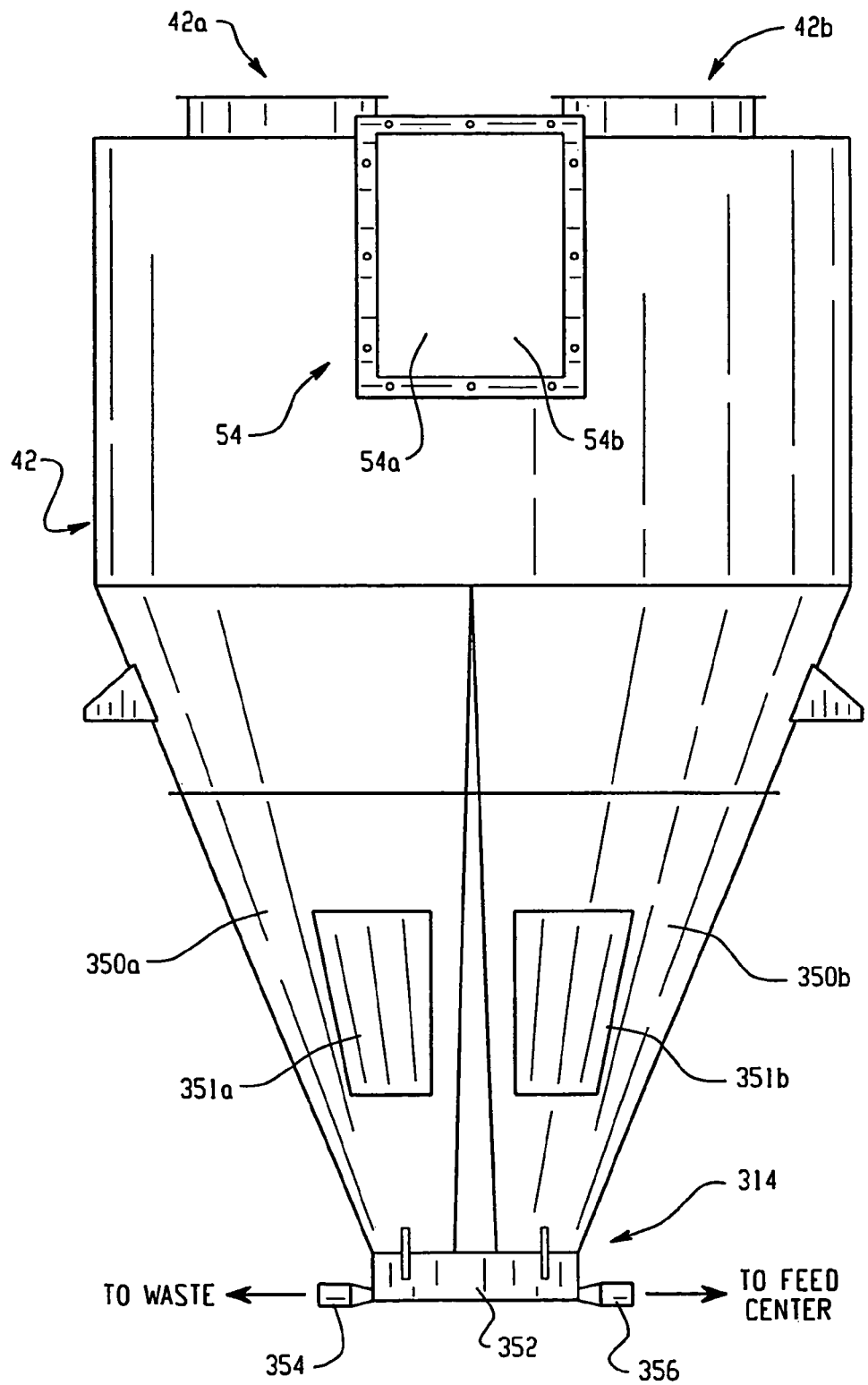
FIG. 23 is an elevation of a cyclone system in accordance with the invention.

With reference next to FIG. 22, the general concepts of a powder overspray recovery system 300 is illustrated in functional schematic form. A significant aspect of the invention is that most of the powder overspray P is extracted from the spray booth 10 and transferred back to the feed center 46 with as little residence or dwell time as possible within the various system 300 components, during a spraying operation. Thus when the need arises to changeover the color of the powder, there is little powder remaining in the system 300 that needs to be removed. In addition, the invention contemplates various components and subsystems within the recovery system 300 that facilitate fast cleaning and color change, as will be further explained herein.

Conceptually then, the powder recovery system 300 actually starts in the spray booth 10 wherein most of the powder overspray P falls onto the floor 16. As previously explained herein, the booth walls or canopy 12, the top 14 and the floor 16 are preferably although not necessarily made of non-conductive composite materials which exhibit very low adherence of the powder. A high capacity blower 302 which in this embodiment is installed in the after-filter system 304, produces a large suction and attendant air flow through the twin cyclone system 42 and hence the extraction duct 40 inside the spray booth 10. The round floor 16 is rotating underneath the extraction duct 40 and thus the powder overspray is drawn up into the extraction duct 40 and transported to the inlets 54 of the cyclones 42. Although twin cyclones are used in the embodiment as a first collection device, the invention may be realized with one or more cyclone structures. Due to the non-conductive materials of the booth 10 and the efficient arrangement of the rotating floor 16 and the extraction duct 40, most of the powder overspray during a spraying operation is extracted from the booth 10.

As part of the spraying system, FIG. 22 illustrates that one or more spray guns 20 are each connected by a powder feed hose 306 to a respective powder pump 308 in the feed center 46. Each powder pump 308 draws powder from a feed hopper 310 via a suction tube 312 that extends down into the hopper 310. The feed center 46 typically, although not necessarily, is a separate partially enclosed booth that houses the feed hopper 310, the various pumps 308, and a purging system (not shown in FIG. 22 but described hereinafter). Although various improvements in the pumps and purging arrangement are described herein as additional aspects of the invention, it will be readily appreciated by those skilled in the art that the basic powder recovery system of the present invention may be realized and practiced with conventional powder feed arrangements. The basic combination of a feed hopper or powder source, suction tubes, powder pump, powder feed hose and spray gun is referred to herein as a powder application system, and thus includes elements that physically are installed in the powder spray booth 10 and the feed center 46, with the feed hoses 306 being connected therebetween.

Continuing with the general description of the powder recovery system 300, the cyclone system 42 separates the powder overspray P from the extraction air stream, and most of the powder is discharged from the bottom of the cyclones 42. The air is exhausted through the cyclone outlets 42a,b and after-filter ductwork 58. This exhaust air is sent to the after-filter assembly 304 because the cyclones 42 cannot remove 100% of the powder, especially the very small low mass powder particles called fines. The after-filter system 304 is used to remove these fines before the air is exhausted to atmosphere.

A conventional cyclone system 42 typically would include a conical hopper and pinch valve arrangement at the bottom of the cyclone that collects powder and then is periodically emptied under positive pressure back to the feed center or to waste. In accordance with a significant aspect of the invention, negative pressure is used to convey powder from the cyclone system to the application system or feed center 46. In one embodiment, the conventional hoppers and valves are eliminated and replaced with a cyclone outlet vacuum interface 314. In one embodiment, the interface 314 is realized in the form of a simple sump or transfer pan with a smooth rounded interior that helps prevent powder from accumulating therein. The pan 314 is provided with at least one vacuum inlet connection port 356. A second outlet port 354 (not shown in FIG. 22) may also be provided for connecting the interface to housekeeping vacuum and disposal.

An appropriate fitting is used at the outlet port 356 to connect thereto a vacuum line 318. The vacuum line 318 is connected at its opposite end 318a to a vacuum receiver system 320. The vacuum receiver 320 is a canister-like arrangement 322 that houses a removable filter 324. A vacuum source or pump 326 is used to produce a vacuum inside the receiver 320 and the vacuum line 318. This vacuum draws the powder that enters the cyclone transfer pan 314 out of the pan 314 and transfers it to the vacuum receiver 320. A portion of the powder collects on the filter 324 while most of it falls to the receiver lower cone 328.

A positive air pressure source 330 is used to pulse the filter 324 during a discharge cycle. A discharge cycle of the vacuum receiver 320 is that time during which the vacuum source is shut-off for a short period of time, with the filter being pulsed at that time also. At the bottom of the canister 322 is a discharge valve arrangement 332 that opens under the force of gravity each time the vacuum pump 326 is turned off, allowing powder to fall into a sieve 334. In a typical system it is contemplated that the valve 332 will open about every 30 seconds or so during a spraying operation, but is only open for three to five seconds while the powder falls from the cone 328 into the optional sieve arrangement 334. The actual time periods and duty cycle may be varied as required for each system design. The sieve 334 may be a conventional vibrating sieve that filters the powder and discharges it back to the feed hopper 310. The short period of time, about thirty seconds, that powder accumulates in the vacuum receiver 320 is minimal compared to prior systems, and since it is at the end of the recovery process, has negligible impact on the efficiency of the recovery system 300. The short residence time of powder in the vacuum receiver 320 also prevents any significant accumulation of powder therein.

The vacuum receiver 320 is equipped with a releasable lid 336. The filter 324 is mounted on the top, so that during a color change operation the lid 336 is removed, what little powder is in the canister 322 is blown off, and the filer replaced with another filter for the next color. The use of color specific filters 324 speeds up the color change operation since such filters would be difficult to clean automatically. The filter in the sieve 334 is also typically a color specific filter that is replaced for a color change operation.

The powder recovery system 300 thus works as follows. The spray guns 20 receive powder from the pumps 308 and associated hoses 306. The powder overspray P laden air is extracted from the booth 10 and the powder is separated in the cyclones 42. As the powder descends to the cyclone vacuum interface pan 314 it is drawn out through the vacuum line 318 and conveyed to the vacuum receiver 320 where it is separated from the vacuum source and discharged to the sieve 334 and the back to the feed hopper 310. Thus, most of the powder overspray P is in near continual motion from the moment it leaves the gun 20 spray nozzle to the time it is returned to the feed hopper. The brief period of time that powder is accumulating in the vacuum receiver 320 permits the use of a powder conveyance arrangement having much less surface area, permitting much faster cleaning times than is realized by prior art systems that use surge hoppers, pinch valves and so forth that are connected to the cyclone. During a spraying operation, very little powder remains within the spray booth 10, the cyclones 42 or the receiver 320 subsystems.

It is noted that the various aspects of the vacuum recovery system and feed center in accordance with the invention may alternatively be used with other spray booth and powder extraction designs, and thus are not limited to use with the exemplary spray booth and extraction duct concepts. For example, various aspects of the recovery system and feed center may be used with a cartridge filter type extraction system.

Cyclone Vacuum Interface

Figure 24:
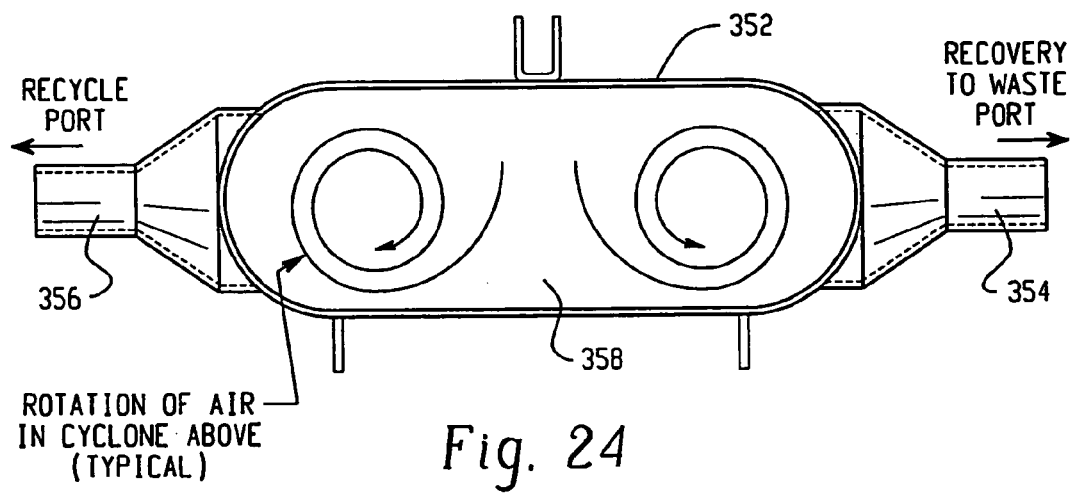
FIGS. 24 and 25 are plan and elevation views respectively of a cyclone vacuum interface device in accordance with the invention.

With reference to FIGS. 23, 24, 25 and 25A, the twin cyclone system 42 includes the side-by-side tangential inlets 54a,b and separate cyclone exhaust ports 42a,b. Each cyclone 42 also has a lower recovery cone 350a,b. The cyclone vacuum interface unit 314 in this embodiment is realized in the form of a sump or transfer pan 352 that is hinged onto the bottom of the twin cones 350a,b and secured by any suitable latch mechanism to allow easy opening of the pan 352 for cleaning. The directional arrows in FIG. 24 represent how the swirling powder generally moves within the interface 314 as the powder exits the cyclones. This swirling is a result of the air flow pattern in the cyclone and helps direct powder to the outlet ports 354, 356.

Figure 25:
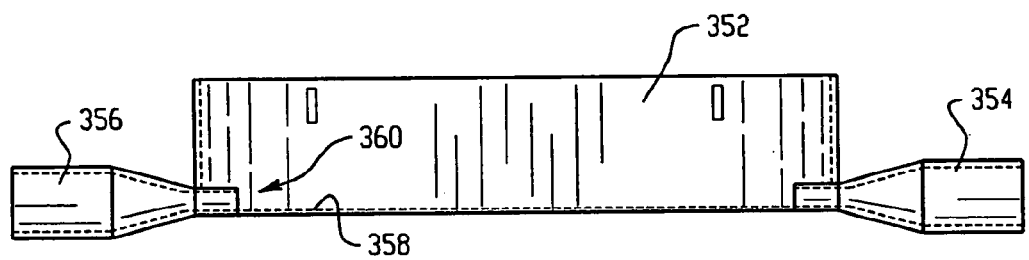
Figure 25A:
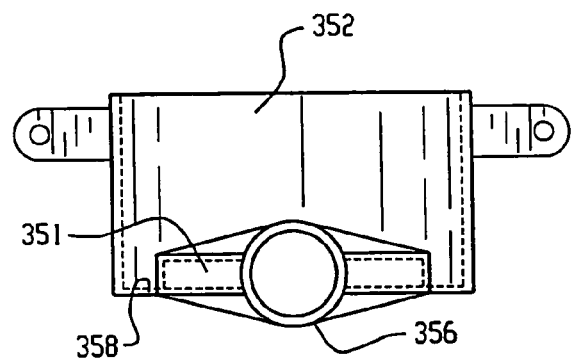
FIG. 25A is an end view of the vacuum interface device of FIGS. 24 and 25.

The vacuum interface 314 includes at least one outlet port 354, and preferably a second outlet port 356. Each port is a tubular structure that opens generally along or adjacent to the bottom surface 358 to form a smooth seamless outlet passageway 360 for the powder. As illustrated in FIG. 25A, each outlet port 354, 356 is generally circular in cross-section but at the opening to the pan 352 interior is formed into a wider rectangular cross-section 351. Other cross-sectional areas such as an ellipse could be used as required. The rectangular cross-sectional opening 351 has the same cross-sectional area as the round port 354, 356 but is more efficient in collecting powder from the pan 352 due to the swirling pattern of the powder as it enters the pan 352 from the cyclone lower cones 350a and 350b. This is because, as illustrated by the directional arrows in FIG. 24, the powder tends to sweep laterally across the pan 352 interior rather than coming straight down into the outlet ports 354, 356. Thus, a wider opening 351 with no less cross-sectional area of the opening as compared to the tubular port 354, 356 allows more time for the powder to be swept up by the same energy of the vacuum in the outlet port.

The lower cones 350a and 350b of the twin cyclones are provided with access doors 351a and 351b that facilitate cleaning of the cyclones during a color change operation.

One of the outlet ports 356 is connected to the vacuum line 318 by an appropriate compression fitting (not shown) or other suitable connection. Powder is thereby conveyed from the pan 352 to the feed center 46 by being drawn into the vacuum receiver 320. When used, the second port 354 may be connected to another suction line that sends the powder to a waste collection area.

Vacuum Receiver Unit

Figure 26:
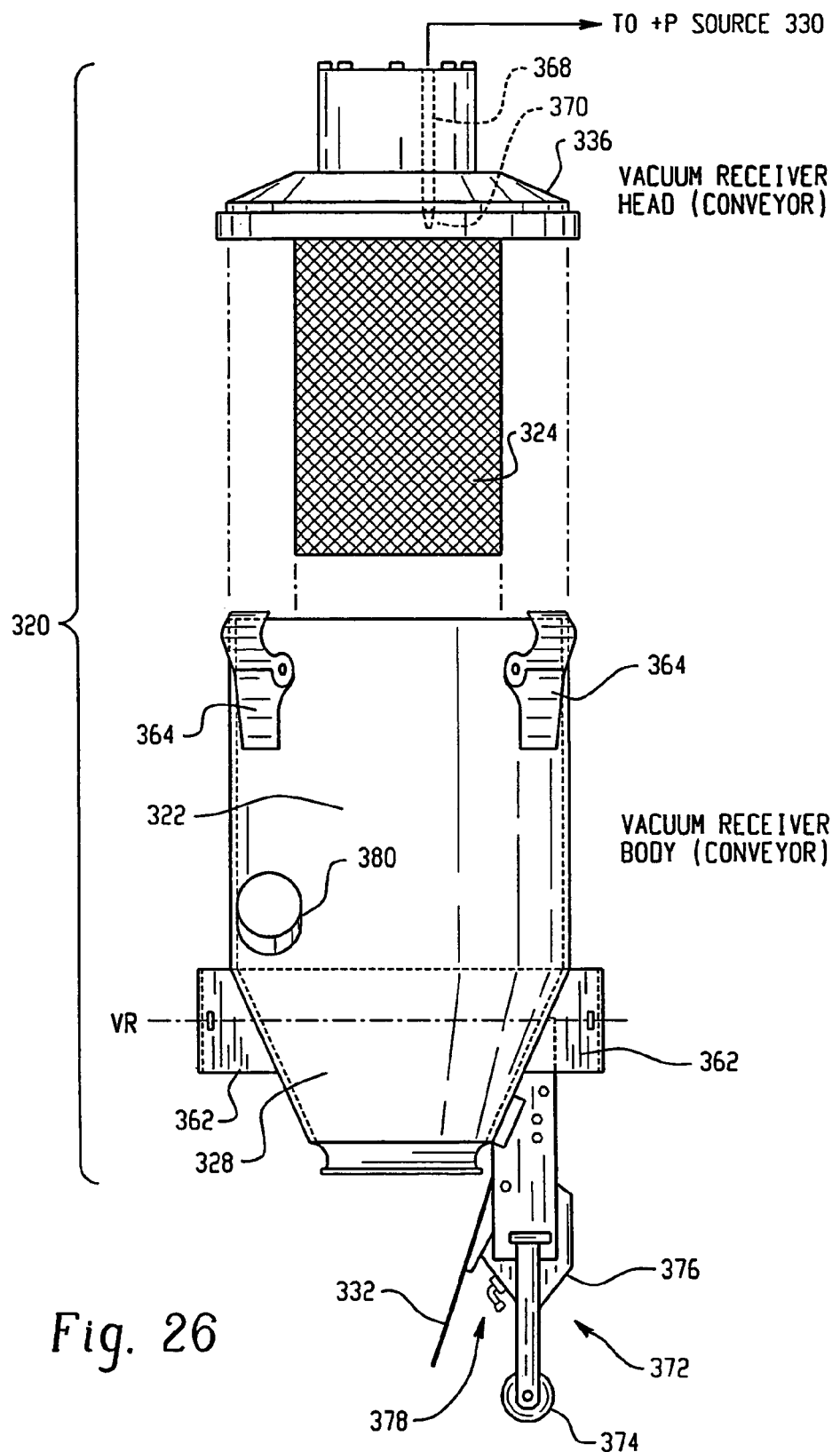
FIG. 26 is an exploded elevation of a vacuum receiver unit in accordance with the invention.
Figure 28:
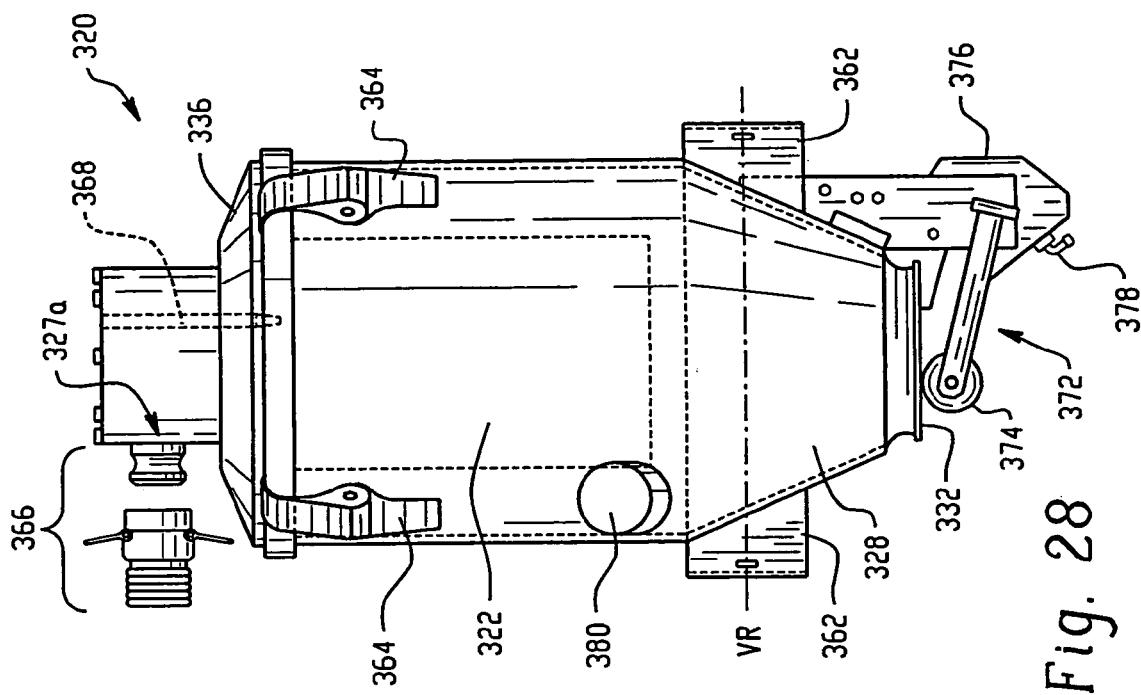
FIG. 28 is a side elevation of the vacuum receiver unit of FIG. 26 in an assembled condition.
Figure 27:
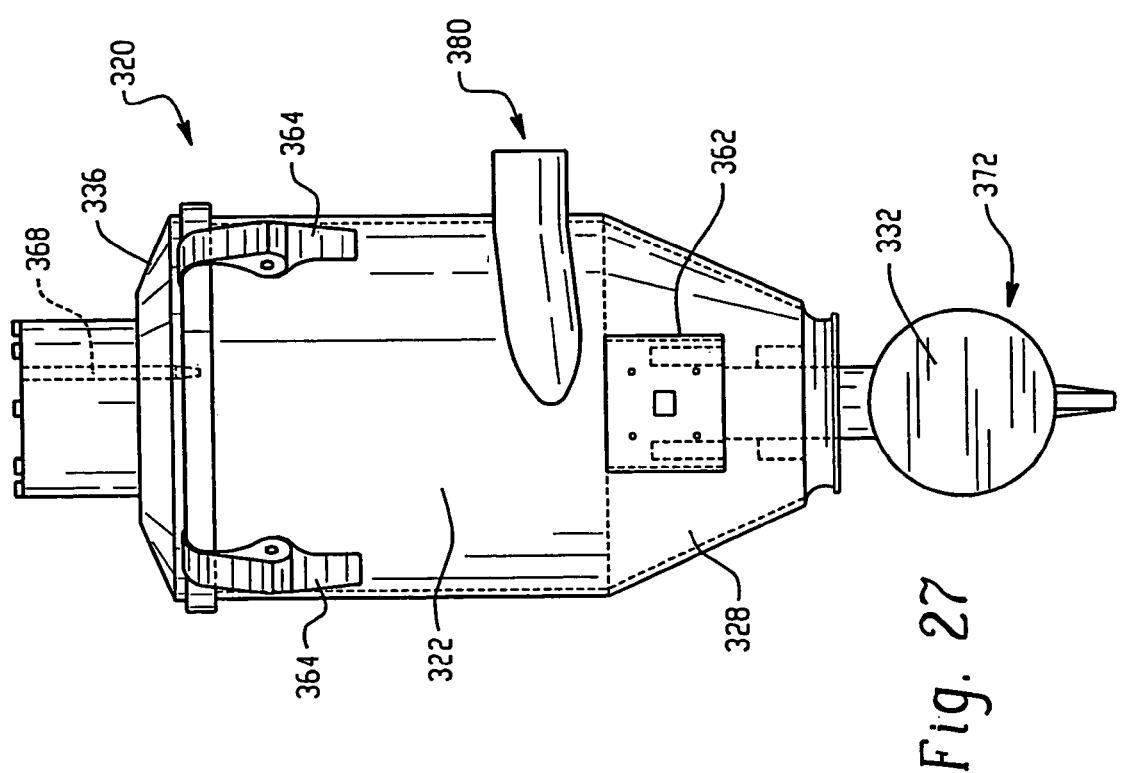
FIG. 27 is a side elevation of the vacuum receiver of FIG. 26 taken at a 90 degree rotation.

With reference to FIGS. 26–28, the vacuum receiver 320 includes the main canister body 322 having an integral lower conical collection portion 328. The vacuum receiver 320 is, in accordance with one aspect of the invention, installed in the feed center 46 (FIG. 22). In this embodiment, the canister 322 includes opposed trunion-style transverse mountings 362. The tunnions 362 are pivotally mounted in the feed center 46 to allow the vacuum receiver to be rotated about an axis VR at least 90 degrees such that the top end of the receiver 320 is about at shoulder facing height with the canister oriented in a generally horizontal position. This allows an operator, after removing the canister lid 336, to blow off powder through the inside of the canister 322 towards a powder collection diffuser wall (382a) in the feed center 46 structure.

The canister 322 includes a series of latches 364 that secure the canister lid 336 to the canister body 322. The lid 336 also supports a powder filter 324 so that the filter can easily be changed by simply lifting off the lid 336 from the canister 322. The lid 336 further includes a connection 366 for the vacuum line 327 (FIG. 22). An air line connection 368 is also provided. The lid 336 further retains a pulse valve 370 that is used to apply high pressure air from the positive pressure source 330 to the filter 324 during a powder discharge period to dislodge powder from the filter 324.

At the lower end of the canister 322 is a valve actuator assembly 372. FIG. 27 shows the valve plate 332 open and FIG. 28 shows the valve plate 332 closed. The valve plate 332 is held closed when the plate 332 is in its raised or closed position whenever there is a vacuum within the receiver 320. When the vacuum is periodically interrupted, the valve plate 332 drops down by gravity into the open position illustrated in FIG. 27 and powder inside the receiver 320 is discharged to the sieve 334.

An air actuated cam wheel 374 engages the underside of the valve plate 332. This wheel 374 is moved into engagement with the valve 332 by an air actuator 376. The air actuator 376 has an appropriate fitting 378 connected to a positive pressure air line (not shown). When pressurized air is supplied, the wheel 374 is rotated up into engagement with the valve 332 and closes the valve 332 against the bottom of the canister 322. When the vacuum is present in the receiver 320, the air pressure at the actuator 376 may be released as the vacuum alone will maintain the valve 332 shut and tightly sealed. An appropriate seal may be used around the bottom of the receiver 320 or other sealing mechanisms may be used as required. Periodically the vacuum is interrupted and the valve 322 falls open under the force of gravity, discharging any powder in the canister 322 into the sieve assembly 334. The control system 48 may be used to automatically time the vacuum interruption cycle and the actuator 376.

The canister 322 also includes a tangential opening 380. The outlet end 318a of the vacuum line 318 (FIG. 22) is connected to this opening 380 by any suitable device such as a re-usable compression fitting (not shown). With the rather rigid vacuum line 318 connected to the receiver 320, the receiver 320 will remain in its vertical orientation without a separate latching device, although a separate latching device may be used if required.

Cyclone Efficiency

With reference to FIG. 22 and the above discussion relating to the cyclone vacuum interface and the vacuum receiver unit, an important aspect of the present invention relates to the influence or effect that the negative pressure has at the cyclone outlet port 356. It is important to note that this aspect of the invention is not necessarily dependent on the particular vacuum interface arrangement at the cyclone outlet nor on the particular embodiments described herein with respect to the vacuum receiver 320, the vacuum source 326, the sieve 334 or the hopper/container 310. In other words, the concept of improving cyclone efficiency may be realized in many different ways of applying a negative pressure to a cyclone or twin cyclones or multiple cyclones having a single common outlet. By outlet is simply meant an area or region where the negative pressure can be presented to an extraction point to recover powder separated by the cyclone. The cyclone outlet may be a conventional truncated cone arrangement that is commonly found with cyclonic separators, or may be the realized in the form of the transfer pan 352 described herein. Other cyclone outlet vacuum interface arrangements may be conveniently used as required. The important aspect is that the interface arrangement permit a negative pressure and induced air flow to be presented at the outlet area of the cyclone to convey powder back to a container.

As noted in the Background of the Invention herein, some customers cannot or do not want to use larger cyclones, particularly tall cyclones. Heretofore, such customers would sacrifice cyclone efficiency in order to be able to use a shorter cyclone. In accordance with the invention, apparatus and method are provided to influence cyclone efficiency so that high cyclone efficiency is realized even with cyclone arrangements having smaller aspect ratios.

Cyclone efficiency is related to the aspect ratio, static pressure and air volume at the inlet to the cyclone. Shorter, lower aspect ratio cyclones produce a higher static pressure for a given air volume and have a lower efficiency due in part to the lower aspect ratio. In accordance with one aspect of the invention, by applying a negative pressure at the cyclone outlet, powder that is separated from the air stream by cyclonic activity can be conveyed to a container, such as the receiver 320. The negative pressure induces an air volume that entrains powder at the cyclone outlet and conveys it to the container. Powder at the cyclone outlet is of course swirling and moving. The negative pressure is characterized by a "zone of influence" or a finite region in which powder can be "captured" out of the cyclonic flow and entrained into the induced air volume for conveyance to the container. It is not simply a matter, however, of connecting a vacuum source to the cyclone outlet. In order to convey powder from the cyclone 42 to the container (such as the receiver 320 for example), there must be a sufficient air volume or flow to entrain the powder and draw it away from the cyclone outlet and convey it to the container. If the induced air flow is too low relative to the static pressure in the cyclone, then powder will not be conveyed to the container, and in some cases the cyclone can actually draw powder back from the container (keeping in mind that the cyclone is actually also a source of negative pressure within the system).

It is noted that prior art cyclone efficiency is typically on the order of 90–92%. By implementing the present invention, efficiency of the recovery system can be realize on the order of 97–98% or higher and this can represent a tremendous savings in terms of recovered powder. As used herein the term "cyclone efficiency" refers to the ratio of powder yielded from the cyclone versus the amount of powder that enters the cyclone inlet.

Accordingly, it is an important aspect of the invention that the vacuum induced air volume complement the static pressure profile of the cyclone. In other words, the induced air volume should have a predetermined relationship with respect to the static pressure profile of the cyclone. This predetermined relationship may be empirically determined for each cyclone recovery system having a set of operating parameters (i.e. cyclone size and exhaust air volume). For each system configuration, empirical analysis may be used to determine an optimal relationship between the cyclone static pressure and the vacuum pump induced air volume so that the negative pressure presented at the cyclone outlet recovers powder from the outlet and conveys the powder to the container. This assures a maximum yield of powder in the container recovered from the cyclone that otherwise would be lost out the cyclone exhaust. As a general example, when a cyclone is used that has a higher static pressure such as occurs with a lower aspect ratio cyclone, the vacuum source is selected to produce a related increase in the induced air volume. It should be noted that this enhanced recovery approach is derived from the pressure capabilities of the vacuum pump that generate the induced air volume. In general the induced air volume in most cases will not exceed 1% of the cyclone exhaust air volume.

As an example, when a shorter, smaller aspect ratio cyclone is used, the static pressure may increase from about 6 inches of water column (typical of a higher aspect ratio cyclone) to about 8 or 9 inches of water column. In such a case, a vacuum source 326 should be used that can provide an induced air volume of at least 100 cfm (cubic feet per minute) at the location where the negative pressure is presented to the cyclone outlet. In the exemplary pump (model no. MLL 400 available from PIAB), 100 cfm corresponds to about 3 inches of mercury. This will assure that powder will be drawn away from the cyclone outlet and conveyed to the container so as to significantly increase the yield of powder in the container that would otherwise be lost through the cyclone exhaust. As another example, an induced air volume of 40 cfm at 0.9 inches of mercury would be just as effective as 70 cfm at 6 inches of mercury when applied against a cyclone exhaust volume of 11,250 cfm at 7 inches water column static pressure. Using an appropriate predetermined relationship between induced air volume from the vacuum source and the cyclone static pressure, cyclone efficiency as measured by yield of product at the container can be on the order of about 97–98%. Again in this example the induced air volume is no greater than 1% of the exhaust air volume of the cyclone. The remaining 2% or so is loss primarily due to fines and other very small particles that routinely do not travel all the way to the bottom of the cyclone prior to being taken up through the exhaust core. The exemplary numbers herein should not be construed in a limiting sense but rather are used to illustrate what is meant by a predetermined relationship between a characteristic of the cyclone (in this example the static pressure) and a characteristic of the vacuum source (in this example the induced air flow). Other parameters for a predetermined relationship may be available to establish sufficient induced air volume to recover powder from a particular cyclone.

In the specific exemplary embodiments herein, it is important that the receiver 320 be periodically emptied, because if it fills with too much powder, the induced air volume may drop too low and actually cause a stall in the conveyance of powder from the cyclone 42 to the receiver 320.

Because maximum efficiency is realized with a good match between the cyclone static pressure and the vacuum source induced air volume, it is preferred that the vacuum source be couple to the cyclone outlet by an air-tight coupling arrangement. In the exemplary embodiment this is realized by way of the receiver 320, the vacuum line 318 and the air tight coupling between the vacuum line 318 and the cyclone outlet 356 of the pan 352. Again, the particular outlet configuration of the cyclone is not a critical feature to realize the benefits of the present invention.

Thus, with use of a negative pressure at the outlet of a cyclone separator, cyclone efficiency and yield of product conveyed from the cyclone to a container can actually be maintained and compares very favorably to a high efficiency cyclone (e.g. one with a higher aspect ratio) even in a lower aspect ratio cyclone arrangement. A customer therefore can use smaller cyclones that reduce noise and energy consumption and have a lower profile without an attendant loss in efficiency.

Feed Center

Figure 29:
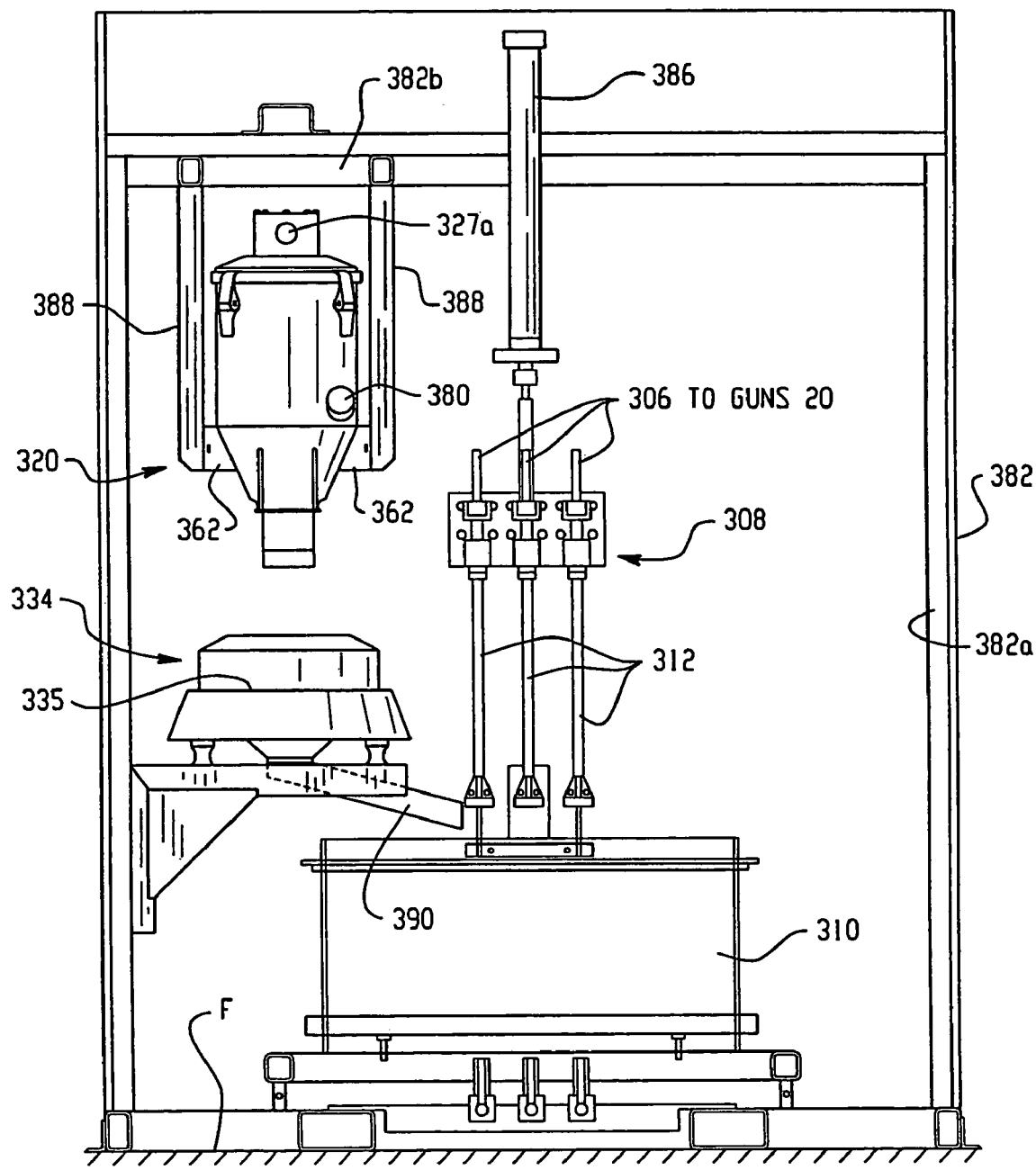
FIG. 29 illustrates part of a powder feed center in elevation in accordance with the invention.

With reference to FIG. 29, the feed center 46 includes a wall structure 382 that partially encloses the feed hopper 310. The back wall 382a is preferably a diffuser wall that has a series of through holes (not shown). The wall forms part of a suction plenum behind the feed center 46, and a blower 340 draws powder from the interior of the feed center 46 through the back wall 382a and into a collection device or a powder waste disposal. In this manner, various components within the feed center 46, such as, for example, the suction tubes 312, the receiver 320 interior, the receiver lid 336, the pumps 308 and so forth, may be cleaned with air wands to remove excess powder during a color change operation, usually after the hopper 310 has been withdrawn from the feed center 46.

In FIG. 29 the pump suction tube array 312 (in the embodiment described herein there are a plurality of pumps and guns, however, any number of pumps and guns may be used as required) is illustrated in a raised position such as would be the case initially during a powder changeover. The pumps 308 and suction tubes 312 are supported on a pump frame 384 (FIG. 30) that is raised and lowered by operation of a pneumatic cylinder 386 or other suitable linear translator. The frame 384 slides along a set of rails 392. A feed hose manifold 385 is used to connect all the feed hoses to their respective pumps 308 by installing the hose manifold on top of the pump frame 384.

The vacuum receiver 320 is mounted on the trunnions 362 which are pivotally supported on two legs 388 which are mounted on and extend downward from the ceiling or top 382b of the feed center wall structure 382. The sieve assembly 334 includes a powder filter 335 typically in the form of a screen mesh. The sieve 334 is mounted just below the vacuum receiver 320 and includes a discharge chute 390 that discharges filtered powder from the sieve to the feed hopper 310. The screen filter 335 is typically color specific and changed for each color changeover operation, as is the vacuum receiver 320 filter.

Figure 30:
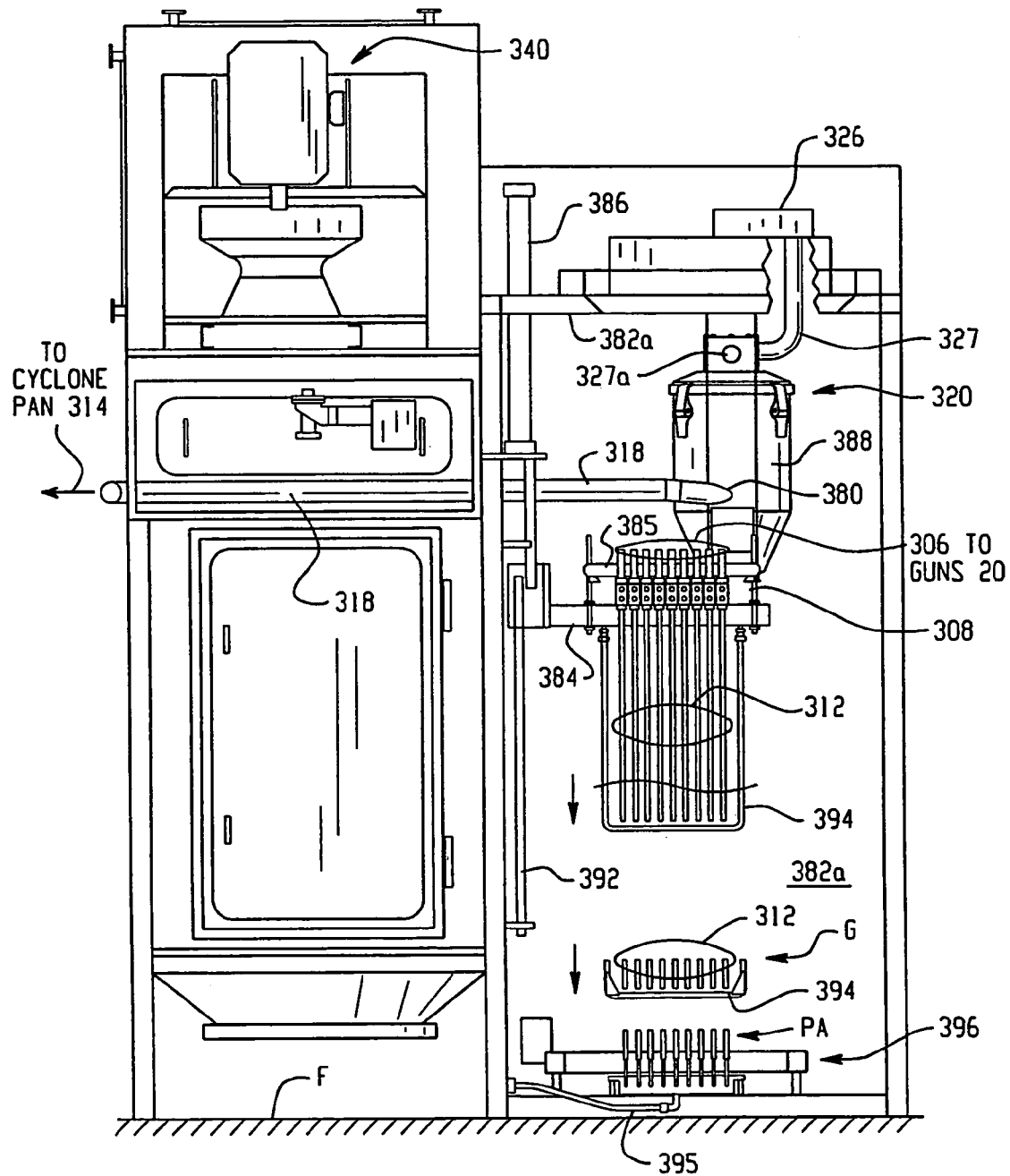
FIG. 30 is a partial front elevation of the feed center with the feed hopper removed.

FIG. 30 illustrates additional features of the powder feed center 46 arrangement. The pump frame 384 is supported on a pair of rails or carriage 392 under the control of the actuator 386. An air tube diffuser 394 is supported below the bottom ends of the suction tubes 312 and supplies fluidizing air into the feed hopper 310 during a spraying operation. It should be noted that the term "feed hopper" should be broadly construed as including any suitable container for the powder, including but not limited to the powder bag. By providing a fluidizing air mechanism with the suction tubes, there is no need for a fluidizing hopper, and powder may be pumped directly from the original powder container. The vacuum connection 327 between the vacuum receiver 320 and the vacuum pump 326 is also illustrated in FIG. 30. A vacuum inlet 327a (see FIG. 29) is provided in the receiver top cover 336.

Figure 32:
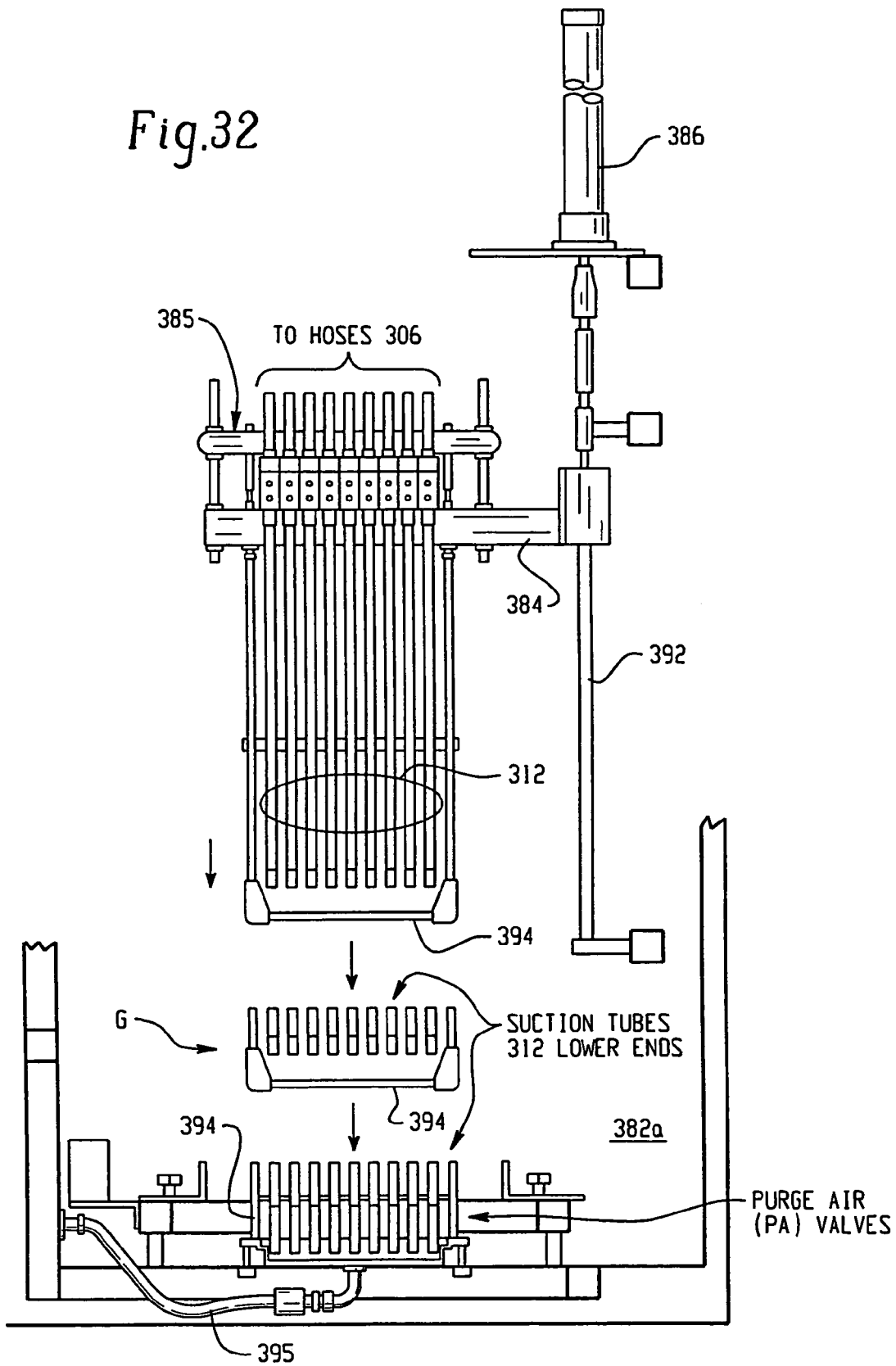
FIG. 32 is an enlarged view of the purge manifold arrangement of FIG. 30.

FIGS. 30 and 32 also schematically show a pump and gun purge manifold system 396. The purge manifold system 396 is an array of air nozzles or valves "PA" that are installed in the lower portion of the feed center 46 and may, for example, fit under the hopper 310 even when the hopper 310 is positioned in the feed center 46. These nozzles correspondingly engage the lower end of the suction tubes 312 when the tubes 312 are lowered into purge position by the operation of the pneumatic cylinder 386. This is done as part of the color change operation and/or a gun and pump purge operation. In either case, the pumps 308 and suction tubes 312 are lowered into engagement with the purge system 396. FIG. 30 shows an intermediate lowered position G of lower portion of the tube array 312 as it is lowered into engagement with the purge system 396. FIG. 32 illustrates the suction tubes 312 lower ends engaged with the purge manifold 396. Once the suction tubes 312 are connected to the purge system 396, pressurized air through an air line 395 is forced through the pumps 308, and the guns 20 to purge them of powder. Although the purge operation may also purge the feed hoses 306, it is also a common practice to change the feed hoses for a light to dark or dark to light color changeover as the hoses can be difficult to completely purge.

Figure 31:
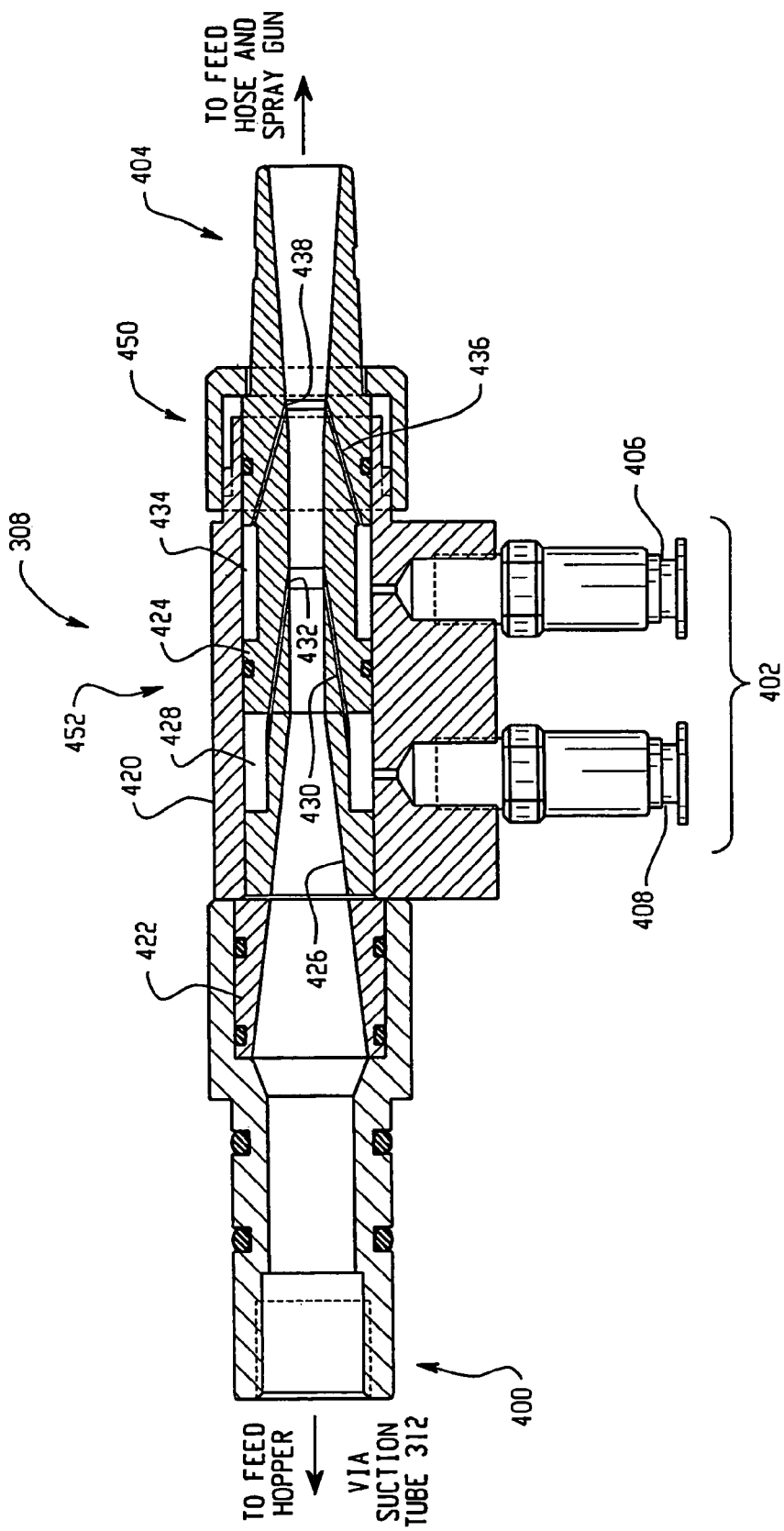
FIG. 31 is one embodiment of a powder pump illustrated in longitudinal cross-section.

In accordance with another aspect of the invention, a powder pump 308 provides a powder flow path therethrough that is straight and "in-line", thereby eliminating any ninety degree or other turns within the pump 308. By "in-line" is meant that powder flows straight through the pump 308 from inlet to outlet on a single axis. FIG. 31 illustrates a preferred embodiment of the powder pump 308 in accordance with this aspect of the invention. In this embodiment, each pump 308 has an in-line pump. Each pump 308 includes a suction tube end 400 that slides into the top end of its respective suction tube 312. Each pump 308 also includes appropriate fittings 402 for atomizing and flow air. When pressurized air enters the pump 308, a suction is created in the suction tube 312 that draws powder from the hopper 310 into the pump 308. The pump 308 discharges the powder through an outlet 404 which may be, for example, a nipple that receives one end of a powder feed hose 306. The other end of the feed hose is connected to the corresponding spray gun 20 in the spray booth 10. The preferred design of the pump is optimal for color change operations. Because of the "in-line" structure, the powder flow does not have to make a ninety degree turn within the pump as would occur in a conventional powder pump. This permits the pump to be purge cleaned by compressed air of any residual powder much more quickly and easily than in prior pump designs. Although this preferred embodiment of the in-line pump is highly advantageous, the present invention is not limited to the use of this in-line pump and any pump may be used as required.

Figure 33:
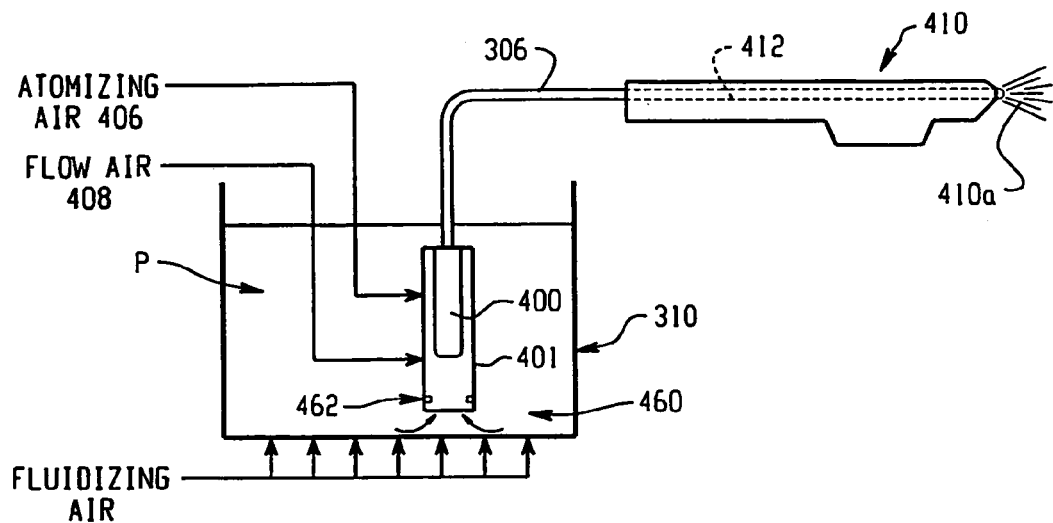
FIGS. 33 and 34 are schematic illustrations of exemplary powder coating application systems using an in-line powder pump and spray gun.
Figure 34:
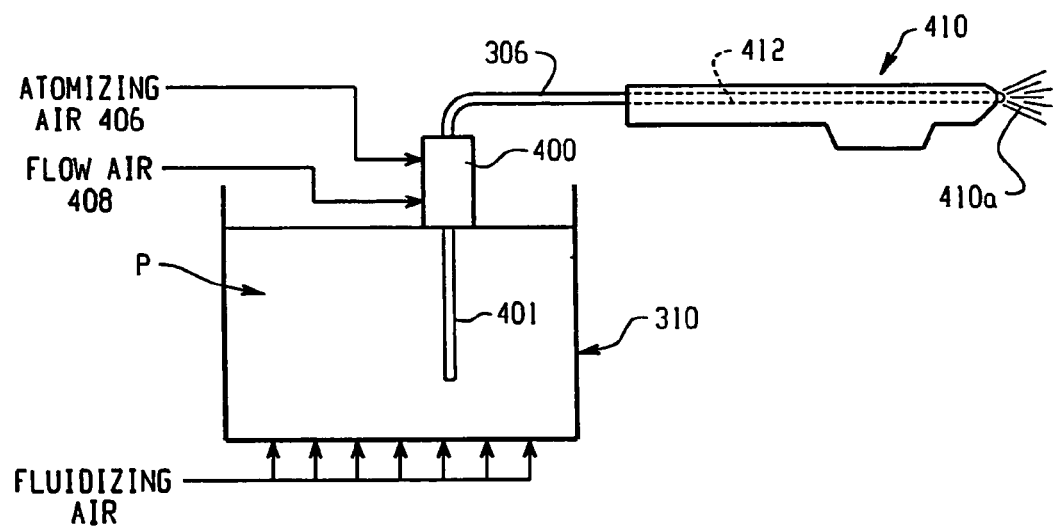

With reference to FIGS. 33 and 34, the in-line pump concept exemplified in FIG. 31 may be used in combination with a straight through in-line spray gun concept. By providing a powder pump that has a straight through powder flow path, especially without any ninety degree or other significant turns in the flow path, and a straight through spray gun, an application system in accordance with this aspect of the invention achieves a flow of powder from the feed hopper 310 to a spray gun (410) spray nozzle (410*a*) without any sharp turns in the flow path. In prior systems, the powder pump and/or spray gun typically include one or more ninety degree turns.

In the embodiment of FIG. 33, an in-line pump 400 is submerged in the powder P within a feed hopper 310. The pump 400 is, for example, positioned within a tube 401 that extends down into the hopper 310. The tube 401 includes appropriate fittings connected to an atomizing air supply 406 and a flow air supply 408. Powder is drawn up into the tube 401 from the bottom thereof. Fluidizing air may be supplied as required, or supplied via the tube 401 as described hereinbefore.

A powder feed hose 306 is connected at one end to the outlet of the pump 400 and at an opposite end to a powder inlet such as a feed tube of a spray gun 410. In one embodiment of the straight through spray gun 410, a gun such as described in co-pending U.S. patent application Ser. No. 09/667,663 filed on Sep. 22, 2000 for POWDER SPRAY GUN and Ser. No. 09/490,099 filed on Jan. 31, 2000 for POWDER SPRAY GUN, may be used, the entire disclosures of which are both fully incorporated herein by reference. Such a gun design is characterized in part by a single axis in-line powder flow path 412 from the gun inlet end through the nozzle 410*a*.

FIG. 34 illustrates an alternative embodiment of this aspect of the invention. In this embodiment, the pump 400 may be mounted on top of the feed hopper 310, rather than within the feed hopper. A suction tube 414 extends from the pump 400 down into the powder P. All other aspects of the embodiment of FIG. 34 may be the same as in FIG. 33.

Figure 36:
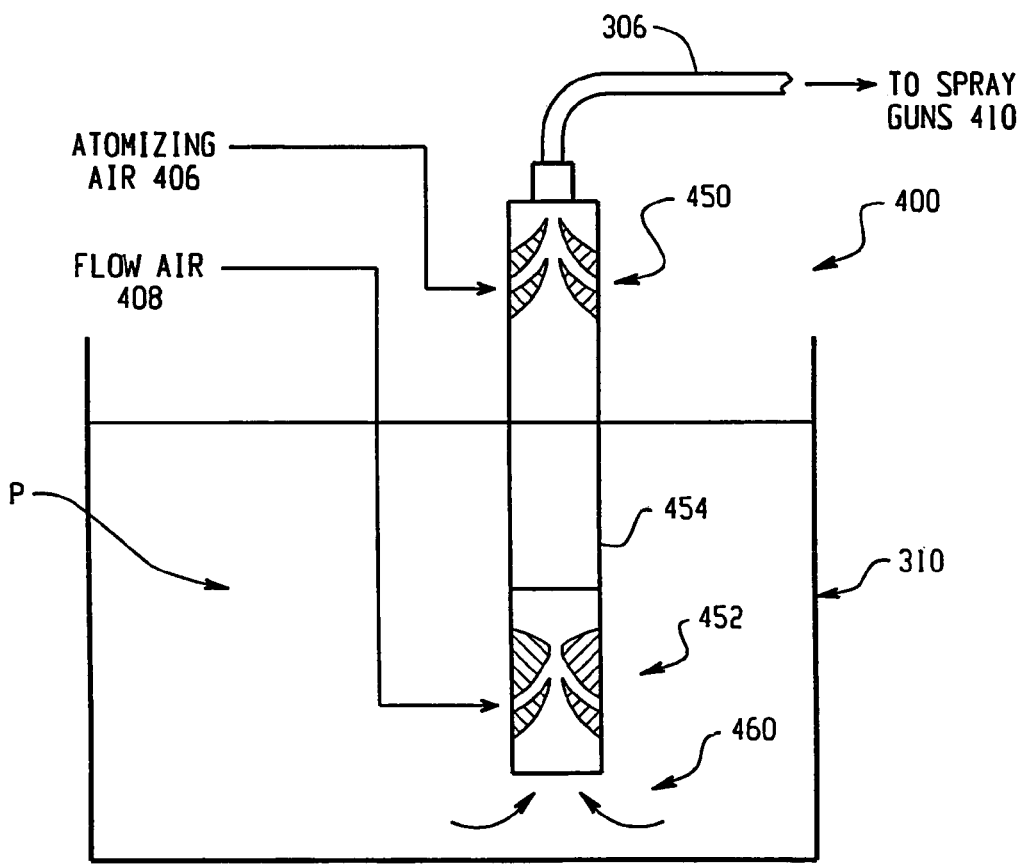
FIG. 36 is a schematic illustration of an application system using an alternative embodiment of the in-line pump arrangement of FIG. 33.

FIG. 36 illustrates another alternative embodiment of the in-line pump 400. In this example, the atomizing section 450 is axially separated from the flow air section 452 by a tubular extension 454. This permits the atomizing air function to be performed outside of the powder supply or at the spray gun.

Note in FIG. 31 that powder may be drawn axially up into the pump 400 as illustrated by the arrows 460 (FIG. 33). Alternatively, or in addition to the axially in flow of powder, the tube 401 may be provided with lateral openings 462 that allow the powder to enter the tube 401 from the side. This alternative arrangement may in some applications allow the submerged pump to be installed closer to the bottom of the feed hopper 310 or bag to pump out most of the powder therein.

The pump design 400 of FIG. 31 is one example of an in-line pump design that is suitable for the embodiments of FIGS. 33 and/or 34. The pump 400 includes a housing 420 within which are slip-fit inserts 422 and 424. These inserts 422, 424 define an axially tapered powder flow path 426. The inserts 422, 424 also define an air annulus 428 that is in flow communication with the flow air inlet 408. The flow air passes into an angled and constricted air jet 430 that is angled forwardly toward the pump outlet 404. The air jet 430 opens to the powder flow path 426 at an opening 432.

When pressured air is supplied to the flow air inlet 408, the resultant high velocity air flow into the flow path 426 creates a substantial negative pressure relative to the fluidized powder in the feed hopper 310. Powder is therefore drawn up into the pump 400 and transferred out to the feed hose 306 and spray gun 410,20.

The forward insert 424 defines an atomizing air passageway 434 that is in flow communication with the atomizing air inlet 406. The atomizing air passes into an angled and constricted air jet 436. The atomizing air jet 436 opens to the powder flow path 426 at an opening 438 that is downstream of the flow air opening 432. The atomizing air assists in further breaking up of the powder into smaller particles. Atomizing air is not always required, however. Still further, atomizing air may be provided at the spray gun rather than at the pump.

Figure 35:
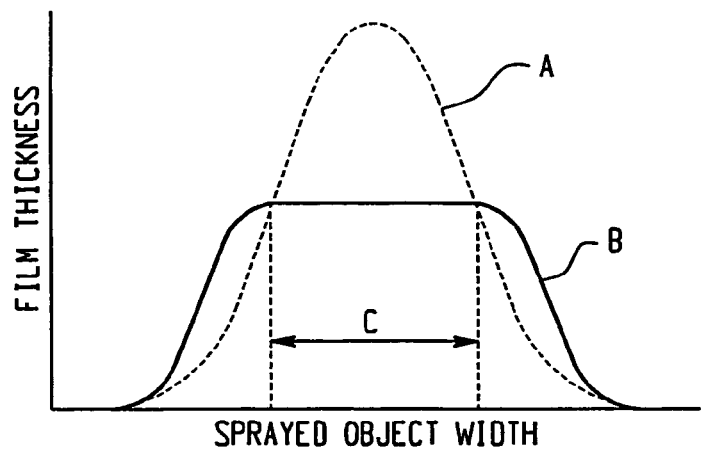
FIG. 35 is a representative graph comparing spray pattern characteristics between application systems using a conventional powder pump and an in-line powder pump of the present invention.

We have discovered that the use of an in-line pump, such as a pump illustrated in FIG. 31 for example, produces a more consistent film thickness across a wider area of the object being sprayed, as contrasted with a conventional powder pump that forces the powder to turn ninety degrees or so within a pump. This effect is illustrated in a representative manner in the graph of FIG. 35. This graph illustrates the relationship between film thickness across a width of the sprayed object for a conventional right angle pump (Graph A) and an in-line pump (Graph B) in accordance with the invention. Note that the thickness is more uniform over a wider area "C" for the in-line pump application system. This effect is further pronounced when the application system uses an in-line pump and a straight through gun as described hereinbefore.

The exemplary system 1 (FIG. 22) thus provides an arrangement by which powder overspray is scavenged on a real-time continuous basis from the spray booth 14 to a first collection device in the form of a cyclone system 42, and conveyed back to the feed center/application system 46 on a real-time near continuous basis. The powder is continually scavenged from a cyclone transfer pan so that the powder does not dwell within the recovery system until it reaches a vacuum receiver near application system feed hopper. The powder has a minimal dwell time within the vacuum receiver 320, and the vacuum receiver 320 presents a minimal surface area and volume to clean compared to prior art systems that use positive air pressure to reclaim powder through a cyclone surge hopper and pinch valve arrangement.

Color Changeover Procedure

A description of an exemplary color change procedure will now be provided. The specific order of the steps and the number and procedure of the steps are not necessarily required in all cases depending on the overall spraying system 1 design. For the exemplary spraying system 1 embodiment described herein, it is contemplated that a complete color changeover can be effected with only two operators, one primarily cleaning the booth 10 and cyclone 42, while the other primarily cleans the feed center 46. A single operator could alternatively be used or more operators if so required. In a prototype system, two operators are able to do a complete color change procedure in only about five minutes. Typical known systems are on the order of 15 minutes or more, with some as long as 45 minutes, and these other systems require much more cumbersome and less reliable clean out procedures.

When a color change procedure is to be performed, the oscillators 26 are stopped and the gun movers 24 move the guns 20 to the home position. The feed center sieve 334 stops vibrating and the fluidizing air to the hopper 310 is also stopped. The suction tubes 312 are raised out of the hopper 310 and the gun movers 24 retract the guns to a position outside the booth 10. The gun bodies are blown off as they are retracted. Positive air pressure directs the powder into the booth 10 where it passes into the extraction duct 40. All of these steps may be performed automatically under control of the main control system 48. One of the operators removes the feed hopper 310 from the feed center 46.

The feed center operator disconnects the vacuum line 318 from the cyclone collection pan 314, and blows off what little powder remains in the pan 314. Note that at all times the after-filter 304 system is operational so that any powder blown off the pan 314 is drawn up into the cyclone and exhausted to the after-filter 304. When the pan 314 is open, any powder from the extraction duct 40 also passes straight into the cyclone exhaust to the after-filter 60, because with the pan open the cyclones 42 are non-operational as separators.

With the vacuum pump 326 still on, the operator inserts one or more cleaning devices into the cyclone end of the vacuum line 318. For example, a foam cylinder or other spongy or soft body may be used. The cleaning device is pulled through the vacuum line 318 by the vacuum suction and exits inside the vacuum receiver 320. Several cleaning devices can be sent through the line 318 to assure thorough cleaning. Preferably the line 318 is a smooth walled seamless structure such as stainless steel or aluminum tubing.

Next the guns 20 and pumps 308 are purged. The control system 48 lowers the suction tube array 312 via the pump support frame 384 onto the purge manifold 396, sends purge air pulses through the suction tubes 312, the pumps 308, the hoses 306 and the guns 20. This powder from the purging is swept up into the extraction duct 40. After purging the suction tubes 312 and pump support frame 384 are raised. The outsides of the suction tubes 312 are blown off and the booth operator blows off the door 150 seams from outside the booth 10. The control system 48 is then instructed to stop the floor 16 rotation and raise the floor 16 to its sealed position against the bottom of the canopy 12. The booth operator can enter the booth 10 and walk on the floor. Using a pressurized air wand, the operator blows what little powder is on the booth walls and ceiling down onto the floor 16. The operator also blows powder off the extraction duct 40. After complete blow-off, the operator exits the booth 10, and the control system 48 is instructed to lower the floor 16 to its rotation position, and the blown-off powder is extracted to the cyclone system 42. At this time the seal blow-off valve 80 is also activated to completely blow powder off the seal 104 and draw powder off the floor 16 portion that extends outside the perimeter of the canopy 12 walls. The booth is thus completely purged of powder.

The vacuum receiver 320 is designed so as to rotate about the axis VR whereby the top of the canister 322 is about shoulder height and facing the feed center operator. The vacuum pump line 327 is disconnected from the canister top 336, as is the pulse air line from the positive pressure source 330. In this position, the operator can easily rotate the receiver 320 so that the lid 336 is facing the operator (i.e. facing the front of the feed center 46). The operator unlatches and removes the lid 336 and removes the color specific filter 324. The cleaning sponges are also removed. The operator then blows off the canister 322 interior, the lid 336 and related parts.

The sieve 334 top section is removed and the color specific filter screen 335 is removed. If a similar shade (light to light or dark to dark) color will be next used, the sieve screen 335 is blown off. If a different shade will be used next, the screen is set aside for later cleaning. The sieve 334 is then cleaned and the proper screen 335 installed. Another color-specific filter 324 specific to the next color being sprayed is then mounted on the lid 336 and inserted into the canister 322. The lid 336 is re-latched and the canister 322 swung back to its vertical position (as shown in FIG. 22).

The vacuum lines 318 and 327 are then reconnected to the receiver 320 and the pulse air line is also reconnected. While the feed center sieve and vacuum receiver are being cleaned, the other operator has opened access doors in the cyclone lower cones 350*a* and 350*b* and blows off all interior surfaces of the cyclones and any powder remaining in the pan 314.

Next the feed hose manifold 385 is removed and another manifold installed for the next color. The other ends of the new feed hoses are connected to the spray guns 20.

Another feed hopper 310 that contains the next color powder coating to be sprayed is then installed into the feed center 46 and the suction tubes and pumps 308 lowered into operational position. Lastly, the cyclone doors are closed, the collection pan 314 closed and the vacuum line 318 reattached to the collection pan 314. This completes the exemplary color change operation.

It will be readily appreciated that the color change procedure is greatly facilitated by the efficiency and thoroughness by which powder overspray is removed in a real-time manner from the booth 10 during a spraying operation due to the interaction between the rotating floor 16 and the overlaying extraction duct 40. However, the vacuum conveyance feature of the present invention, which conveys powder from the cyclone system 42 to the feed center/application system, may be used with any powder extraction and spray booth arrangement, including a cartridge filter type collection system.

It is intended that invention not be limited to the particular embodiments and alternative embodiments disclosed as the best mode or preferred mode contemplated for carrying out the invention, but that the invention will include all embodiments falling within the scope of the appended claims.

Having thus described the invention, we claim:

1. Powder recovery apparatus for a powder coating spray system, comprising:
   a powder spray booth;
   a cyclone having an inlet thereto that receives powder entrained in air from said spray booth wherein said cyclone operates to separate powder from the air; said cyclone having an outlet for recovering said separated powder and an exhaust for air;
   a conduit with first and second ends that connect the cyclone outlet to a container; and
   a negative pressure source coupled to said cyclone outlet by said conduit;
   said negative pressure source producing a negative pressure within said conduit from said first end thereof to said second end thereof with an induced air volume that causes a flow of powder from said cyclone outlet to said container to reduce powder lost through said cyclone exhaust.

2. The apparatus of claim 1 wherein said cyclone operates at a static pressure and said negative pressure source produces an induced air volume that is sufficient to draw powder from said cyclone outlet to optimize powder recovery.

3. The apparatus of claim 1 wherein said negative pressure source comprises a vacuum pump.

4. The apparatus of claim 3 wherein said vacuum pump is coupled to said container; said container being coupled to said cyclone outlet.

5. The apparatus of claim 4 wherein said container comprises a receiver having a filter that separates powder from said induced air flow.

6. The apparatus of claim 5 wherein said receiver is coupled to said cyclone outlet by a pipe.

7. The apparatus of claim 6 wherein said vacuum pump, receiver and pipe provide a closed air-tight system coupling the cyclone outlet to said negative pressure source.

8. The apparatus of claim 1 comprising a blower coupled to said exhaust to draw said powder entrained air into said cyclone at said cyclone inlet, said blower comprising a filter that separates powder from exhaust air.

9. The apparatus of claim 1 wherein said cyclone operates at a static pressure of at least 7 inches water column and said negative pressure source produces an induced air volume of at least 95 cfm.

10. A method for influencing efficiency of a cyclonic separator of the type having an inlet that receives powder coating particles entrained in an air flow, an outlet for recovering powder separated from the air flow, and an exhaust coupled to a blower that produces the powder entrained air flow into the cyclone at the cyclone inlet; the method comprising:
   applying negative pressure at the cyclone outlet to convey powder particles from the cyclone outlet through a conduit under negative pressure to a container, said negative pressure being sufficient to yield powder particles in said container that would otherwise pass through the cyclone exhaust in the absence of said negative pressure.

11. The method of claim 10 wherein said negative pressure produces an induced air volume sufficient to entrain powder particles at the cyclone outlet and transfer said entrained particles to said container.

12. The method of claim 10 wherein the cyclone operates at a static pressure defined between an inlet region and exhaust region thereof said induced air flow having a predetermined relationship with respect to said static pressure to recover powder from the cyclone outlet and convey said powder to said container.

13. The method of claim 10 wherein said negative pressure is provided by a vacuum pump that is coupled to the conveyor outlet via a closed air-tight system.

14. The method of claim 13 wherein said vacuum pump produces an induced air volume of at least 90 cfm.

15. The method of claim 14 wherein the cyclone is operated at a static pressure of at least 6 inches water colunm.

16. Apparatus for increasing efficiency of a cyclone separator used to recover powder from a powder coating system, comprising:
   a cyclone having an inlet thereto that is adapted to receive powder entrained air wherein said cyclone operates to separate powder from the air; said cyclone having an outlet for recovering said separated powder and an exhaust for air; and
   a negative pressure source coupled to said cyclone outlet;
   said negative pressure source producing an induced air volume that causes a substantial flow of powder from said cyclone outlet through a conduit under negative pressure to a container to reduce powder lost through said cyclone exhaust.

17. The apparatus of claim 16 wherein said cyclone operates at a static pressure and said negative pressure source produces an induced air volume that is sufficient to draw powder from said cyclone outlet to optimize powder recovery.

18. The apparatus of claim 16 wherein said negative pressure source comprises a vacuum pump.

19. The apparatus of claim 18 wherein said vacuum pump is coupled to said container; said container being coupled to said cyclone outlet.

20. The apparatus of claim 19 wherein said container comprises a receiver having a filter that separates powder from said induced air flow.

21. The apparatus of claim 20 wherein said receiver is coupled to said cyclone outlet by a pipe.

22. The apparatus of claim 21 wherein said vacuum pump, receiver and pipe provide a closed air-tight system coupling said cyclone outlet to said negative pressure source.

23. The apparatus of claim 16 wherein said cyclone operates at a static pressure of at least 7 inches water column and said negative pressure source produces an induced air volume of at least 95 cfm.

24. The apparatus of claim 16 wherein said negative pressure source produces an induced air flow based on the static pressure of said cyclone.

25. The apparatus of claim 24 wherein said negative pressure source is selected to produce an increased induced air flow in relation to an increase in said static pressure.

26. Apparatus for increasing efficiency of a cyclone separator used to recover powder from a powder coating system, comprising:
   a cyclone having an inlet thereto that is adapted to receive powder entrained air wherein said cyclone operates to separate powder from the air; said cyclone having an outlet area for recovering said separated powder and an exhaust for air; said cyclone having a static pressure value associated therewith;
   a conduit with first and second ends that connect the cyclone outlet to a container; and
   a negative pressure source coupled to said cyclone outlet area by said conduit;
   said negative pressure source producing a negative pressure within said conduit from said first end to said second end thereof with an induced air volume that causes a flow of powder from said cyclone outlet area under negative pressure to said container to reduce powder lost through said cyclone exhaust;
   said induced air flow having a predetermined relationship with respect to said static pressure.

27. A method for increasing efficiency of a cyclonic separator of the type having an inlet that receives powder coating particles entrained in an air volume, an outlet area for recovering powder separated from the cyclone air, and an exhaust; the method comprising:
   applying negative pressure at the cyclone outlet area to recover powder particles from the cyclone outlet area and to convey the recovered powder particles through a conduit under negative pressure to a container, said negative pressure producing an induced air volume having a predetermined relationship with respect to a static pressure characteristic of the cyclone to yield powder particles that would otherwise pass through the cyclone exhaust in the absence of said negative pressure.

* * * * *